United States Patent [19]

Toshida et al.

[11] Patent Number: 5,613,232

[45] Date of Patent: Mar. 18, 1997

[54] RECEIVER APPARATUS COMPRISING DISPLAY MEANS FOR DISPLAYING SIGNAL STRENGTHS OF SIGNALS HAVING A PLURALITY OF FREQUENCIES, AND DISPLAY APPARATUS FOR USE IN RECEIVER APPARATUS

[75] Inventors: Youichi Toshida, Suita; Kazuko Nakagawa, Nara; Toshihide Kuroda, Takatsuki; Kazuyuki Nakayama, Katano; Tomotsugu Taki, Osaka, all of Japan

[73] Assignee: Alinco Incorporated, Osaka, Japan

[21] Appl. No.: 208,841

[22] Filed: Mar. 11, 1994

[30] Foreign Application Priority Data

| Mar. 12, 1993 | [JP] | Japan | 5-010732 U |
| Mar. 12, 1993 | [JP] | Japan | 5-051958 |
| Apr. 21, 1993 | [JP] | Japan | 5-094273 |
| Apr. 21, 1993 | [JP] | Japan | 5-094281 |
| Sep. 13, 1993 | [JP] | Japan | 5-226977 |
| Sep. 13, 1993 | [JP] | Japan | 5-227013 |

[51] Int. Cl.$^6$ .................................. H04B 17/00
[52] U.S. Cl. ............... 455/226.4; 455/67.7; 455/154.2; 455/226.2
[58] Field of Search ..................... 455/73, 84, 89, 455/77, 154.1, 154.2, 155.1, 157.1, 158.1, 158.2, 158.4, 161.1, 161.2, 161.3, 226.1, 226.2, 226.3, 226.4, 67.7

[56] References Cited

U.S. PATENT DOCUMENTS

| 2,972,108 | 2/1961 | Stone | 455/226.4 |
| 3,890,574 | 6/1975 | Nakano et al. | 455/154.2 |
| 4,476,579 | 10/1984 | Ito et al. | 455/226.4 |
| 5,268,712 | 12/1993 | Hilpert et al. | 455/154.2 |

OTHER PUBLICATIONS

"Thorough Technical Information, All About ICOM IC-780, by ICOM Corporation", HAM Journal No. 54, Mar. and Apr. 1988.

"Wide Band Receiver, CCR708A, Service Manual", Marantz Japan Inc. 1993.

*Primary Examiner*—Reinhard J. Eisenzopf
*Assistant Examiner*—Nguyen Vo
*Attorney, Agent, or Firm*—McDermott, Will & Emery

[57] ABSTRACT

A receiver apparatus includes a display apparatus for displaying signal strengths of signals of a plurality of reception frequencies. In the receiver apparatus, a receiver circuit of one system receives a high-frequency signal having a predetermined reception frequency, and a detection storage circuit detects and stores the signal strengths of the signals having a plurality of reception frequencies received by the receiver circuit by selectively switching over among the reception frequencies of the receiver circuit according to a predetermined order of the switching. The display apparatus has a plurality of display sections, and displays on the plurality of display sections the signal strengths of the signals having a plurality of reception frequencies stored in the detection storage circuit according to the order of the switching. Further, a demodulator circuit demodulates a high-frequency signal having at least one reception frequency received by the receiver circuit.

14 Claims, 42 Drawing Sheets

( Display Data Replace Process in Higher Frequency direction )

S321

Overwrite data stored in Addresses 10—13 of VRAM 40 into Addresses 00—03 thereof, and Display Signal Level on Liquid Crystal Pixels LM00—LM03 of LCD 61 in Vertical Direction

S322

Overwrite data stored in Addresses 20—23 of VRAM 40 into Addresses 10—13 thereof, and Display Signal Level on Liquid Crystal Pixels LM10—LM13 of LCD 61 in Vertical Direction

S323

Overwrite data stored in Addresses 30—33 of VRAM 40 into Addresses 20—23 thereof, and Display Signal Level on Liquid Crystal Pixels LM20—LM23 of LCD 61 in Vertical Direction

S324

Overwrite data stored in Addresses 40—43 of VRAM 40 into Addresses 30—33 thereof, and Display Signal Level on Liquid Crystal Pixels LM30—LM33 of LCD 61 in Vertical Direction

S325

Overwrite data stored in Addresses 50—53 of VRAM 40 into Addresses 40—43 thereof, and Display Signal Level on Liquid Crystal Pixels LM40—LM43 of LCD 61 in Vertical Direction

S326

Overwrite data stored in Addresses 60—63 of VRAM 40 into Addresses 50—53 thereof, and Display Signal Level on Liquid Crystal Pixels LM50—LM53 of LCD 61 in Vertical Direction ( Return )

( Display Data Replace Process in Lower Frequency direction )

S331

Overwrite data stored in Addresses 50—53 of VRAM 40 into Addresses 60—63 thereof, and Display Signal Level on Liquid Crystal Pixels LM60—LM63 of LCD 61 in Vertical Direction

S332

Overwrite data stored in Addresses 40—43 of VRAM 40 into Addresses 50—53 thereof, and Display Signal Level on Liquid Crystal Pixels LM50—LM53 of LCD 61 in Vertical Direction

S333

Overwrite data stored in Addresses 30—33 of VRAM 40 into Addresses 40—43 thereof, and Display Signal Level on Liquid Crystal Pixels LM40—LM43 of LCD 61 in Vertical Direction

S334

Overwrite data stored in Addresses 20—23 of VRAM 40 into Addresses 30—33 thereof, and Display Signal Level on Liquid Crystal Pixels LM30—LM33 of LCD 61 in Vertical Direction

S335

Overwrite data stored in Addresses 10—13 of VRAM 40 into Addresses 20—23 thereof, and Display Signal Level on Liquid Crystal Pixels LM20—LM23 of LCD 61 in Vertical Direction

S336

Overwrite data stored in Addresses 00—03 of VRAM 40 into Addresses 10—13 thereof, and Display Signal Level on Liquid Crystal Pixels LM10—LM13 of LCD 61 in Vertical Direction ( Return )

Fig.38
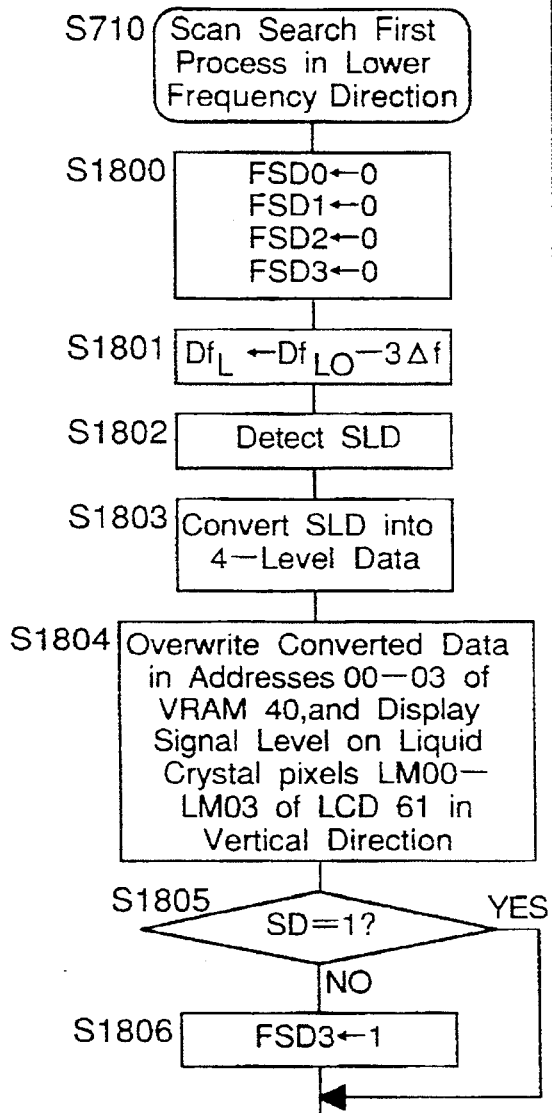
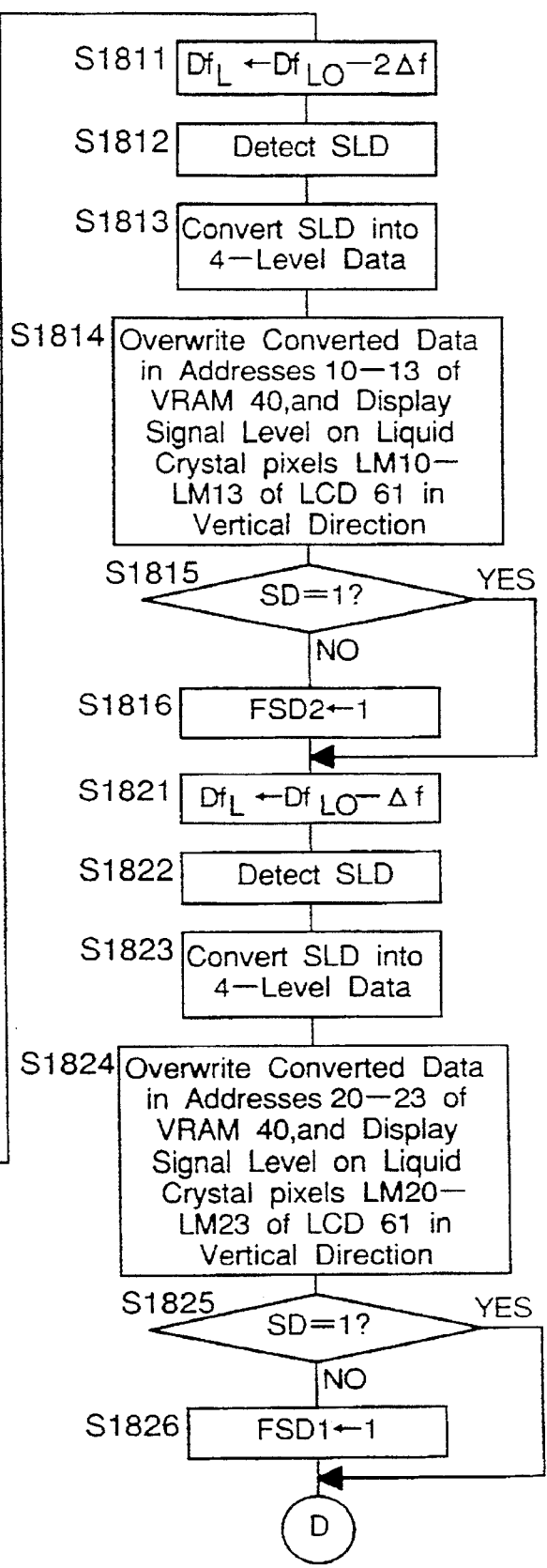

RECEIVER APPARATUS COMPRISING DISPLAY MEANS FOR DISPLAYING SIGNAL STRENGTHS OF SIGNALS HAVING A PLURALITY OF FREQUENCIES, AND DISPLAY APPARATUS FOR USE IN RECEIVER APPARATUS

BACKGROUND OF THE INVENTION

1. Field of the Invention

The present invention relates to a receiver apparatus comprising display means for displaying signal strengths of signals having a plurality of reception frequencies, and a display apparatus for use in a receiver apparatus, such as a radio receiver, a radio transceiver, a radio FM transceiver or the like.

2. Description of the Related Art

FIG. 2 shows a conventional radio receiver having a spectrum display function. Referring to FIG. 2, a high-frequency signal received by an antenna 100 is input through a high-frequency amplifier (referred to as an "RF amplifier" hereinafter) 101 to a mixer 102, and then, is mixed with a local oscillation signal so as to be converted into an intermediate frequency signal (referred to as an "IF signal" hereinafter). The IF signal is input through an intermediate-frequency amplifier (referred to as an "IF amplifier" hereinafter) 104 to an FM demodulator 105, which frequency-demodulates the input IF signal and then outputs the resulting low-frequency signal or voice signal. Thereafter, the resulting low-frequency signal obtained through the FM demodulation is output through a low-frequency amplifier (referred to as an "AF amplifier" hereinafter) 106 to a speaker 107. The IF signal output from the IF amplifier 104 is subjected to envelope detection in a detector circuit 108, and then, the detected signal is output to a signal level meter 109, so that the signal level of the received high-frequency signal is displayed on the signal level meter 109.

Meanwhile, the IF signal is input to a mixer 110 and then mixed with a sweep local oscillation signal generated with a predetermined sweep frequency width by a sweep local oscillator 111, and then, the IF signal is converted into a sweep IF signal having the above-mentioned sweep frequency width. The sweep IF signal is amplified by a scope IF amplifier 112, and then, the amplified sweep IF signal is subjected to envelope detection in a detector circuit 113, which outputs the resulting detection signal. The resulting detection signal is input to a vertical axis input terminal of a CRT display 114. The sweep local oscillation signal output from the sweep local oscillator 111 is further input to a horizontal sweep signal generator 115 including a PLL (Phase Locked Loop) circuit. The horizontal sweep signal generator 115 generates a horizontal sweep signal for the CRT display 114 in synchronous with the input sweep local oscillation signal, and then outputs the generated signal to a horizontal axis input terminal of the CRT display 114. With the above-mentioned arrangement, the frequency spectrum of the signal received by the antenna 100 is displayed on the CRT display 114, wherein the frequency spectrum has the predetermined sweep frequency width around the center frequency of the received high-frequency signal.

Therefore, the circuits and apparatuses denoted by the reference numerals 110 through 115 constitute so-called a spectrum analyzer for displaying a frequency spectrum, which allows the operator to observe the frequency spectrum including not only the high-frequency signal having the frequency but also signals having frequencies adjacent thereto, while hearing the demodulated low-frequency signal contained in the received high-frequency signal, which is output from the speaker 107.

However, the conventional radio receiver having a spectrum display function is provided with two receiver circuit systems for receiving a first reception frequency and a second reception frequency: one system composed of original signal receiver circuits extending from the RF amplifier 101 to the IF amplifier 104 which are provided for receiving a high-frequency signal at the first reception frequency; and another system composed of the receiver circuits for spectrum display extending from the RF amplifier 101 to the scope IF amplifier 112 including the other local oscillator 111, which are provided for receiving a high-frequency signal at the second reception frequency. The above-mentioned fact has been resulted in the problems of a complicated circuit and an expensive manufacturing cost.

Furthermore, since the local oscillator 111 and the local oscillator 115 are interlocked in operation in the conventional radio receiver having a spectrum display function, the signal strengths of frequencies continuously adjacent to the output signal of the mixer 102 can be observed. However, it has been impossible to observe the signal strengths of signals having a plurality of discrete frequencies which are previously determined.

Furthermore, the conventional radio receiver having a spectrum display function has such a disadvantageous problems that the signal strength at the frequency obtained prior to changing the frequency is displayed until the signal strength of the reception frequency corresponding to the display position is measured in spite of the fact that the display position of the spectrum obtained after changing the frequency is required to be displayed when the reception frequency is changed.

SUMMARY OF THE INVENTION

An essential object of the present invention is therefore to provide a receiver apparatus capable of displaying signal strengths of signals having a plurality of reception frequencies, using one system of receiver circuit which is constituted integrally by the first original receiver circuit and the second receiver circuit for displaying signal strengths of signals having a plurality of frequencies, and capable of being constituted with a structure simpler than that of the conventional example and with an inexpensive manufacturing cost as compared with that of the conventional example.

Another object of the present invention is therefore to provide a receiver apparatus capable of selectively displaying either one of one signal strength of a signal having one reception frequency and signal strengths of signals having a plurality of reception frequencies, using one system of receiver circuit which is constituted integrally by the first original receiver circuit and the second receiver circuit for displaying signal strengths of signals having a plurality of frequencies, and capable of being constituted with a structure simpler than that of the conventional example and with an inexpensive manufacturing cost as compared with that of the conventional example.

A further object of the present invention is therefore to provide a display apparatus for use in a receiver apparatus, capable of displaying signal strengths of signals having a plurality of reception frequencies, and capable of changing display positions of the signal strengths of the signals by shifting the same in accordance with change of the reception frequency.

A still further object of the present invention is therefore to provide a display apparatus for use in a receiver apparatus, capable of displaying signal strengths of signals having a plurality of reception frequencies, capable of automatically changing the reception frequency, and capable of changing display positions of the signal strengths of the signals by shifting the same in accordance with automatic change of the reception frequency.

A still more further object of the present invention is therefore to provide a display apparatus for use in a receiver apparatus, capable of displaying signal strengths of signals having a plurality of reception frequencies, in a predetermined order, such as an order of channel numbers previously stored or the like, and capable of changing display positions of the signal strengths of the signals by shifting the same in accordance with change of the reception frequency.

A still further object of the present invention is therefore to provide a display apparatus for use in a receiver apparatus, capable of displaying signal strengths of signals having a plurality of reception frequencies, with a predetermined center reception frequency, and capable of changing display positions of the signal strengths of the signals by shifting the same in accordance with change of the reception frequency.

In order to achieve the aforementioned objective, according to one aspect of the present invention, there is provided a receiver apparatus comprising:

reception means of one system for receiving a high-frequency signal having a predetermined reception frequency;

detection storage means for detecting and storing signal strengths of signals having a plurality of reception frequencies received by said reception means by selectively switching over among the reception frequencies of said reception means according to a predetermined order of said switching;

display means, having a plurality of display sections, for displaying on said plurality of display sections the signal strengths of the signals having a plurality of reception frequencies stored in said detection storage means according to said predetermined order of said switching; and demodulation means for demodulating a high-frequency signal having at least one reception frequency received by said reception means.

In the above-mentioned receiver apparatus, said detection storage means preferably switches over among the reception frequencies with a predetermined step frequency in a predetermined ascending or descending order of the reception frequencies.

The above-mentioned receiver apparatus preferably further comprises frequency storage means for previously storing a plurality of reception frequencies of high-frequency signals, in correspondence with predetermined channel numbers;

wherein said predetermined order of switching is an order designated with said channel numbers.

The above-mentioned receiver apparatus preferably further comprises:

control means for controlling said detection storage means and said demodulation means to time-sharingly enable the operations of said detection storage means and the demodulation means; and change means for changing a time rate of the time-sharing operation which is a ratio of a time interval in the operation of said detection storage means to another time interval in the operation of said demodulation means, according to the signal strength of the high-frequency signal received by said reception means.

The above-mentioned receiver apparatus preferably further comprises:

control means for controlling said detection storage means and said demodulation means to time-sharingly enable the operations of said detection storage means and the demodulation means; and setting means for setting the time interval of the operation of said demodulation means which is controlled by said control means.

According to another aspect of the present invention, there is provided a receiver comprising:

reception means for receiving a high-frequency signal having a predetermined reception frequency;

detection storage means for detecting and storing signal strengths of signals having a plurality of reception frequencies received by said reception means by selectively switching over among the reception frequencies of said reception means according to a predetermined order of said switching;

display means having a plurality of display sections aligned;

mode setting means for selectively setting either one of a first mode in which a signal strength of a signal having a predetermined reception frequency is displayed on said display means, and a second mode in which signal strengths of signals having a plurality of predetermined reception frequencies are displayed on said display means; and display control means for displaying the signal strength of the signal of the reception frequency stored said detection storage means on said display means when the first mode is set by said mode setting means, and displaying the signal strengths of the signals having a plurality of reception frequencies stored in said detection storage means on said plurality of display sections of said display means according to said order of said switching when the second mode is selected.

According to a further aspect of the present invention, there is provided a display apparatus for use in a receiver apparatus for receiving a high-frequency signal having a predetermined reception frequency, comprising:

detection storage means for detecting and storing signal strengths of signals having a plurality of reception frequencies received by selectively switching over among the reception frequencies according to a predetermined order of said switching;

display means, having a plurality of display sections, for displaying on said plurality of display sections the signal strengths of the signals of said plurality of reception frequencies stored in said detection storage means according to said order of said switching; and control means for shifting display positions of the signal strengths of the signals having a plurality of reception frequencies displayed on said display means by shifting the signal strengths of the signals having said plurality of reception frequencies stored in said detection storage means according to change of said reception frequency.

In the above-mentioned display apparatus, said detection storage means preferably switches over among said plurality of reception frequencies with a predetermined step frequency in a predetermined ascending or descending order of said reception frequencies.

According to a still further aspect of the present invention, there is provided a display apparatus for use in a receiver apparatus for receiving a high-frequency signal having a predetermined reception frequency, comprising:

detection storage means for detecting and storing signal strengths of signals having a plurality of reception frequencies received by selectively switching over among said plurality of reception frequencies according to a predetermined order of said switching;

display means, having a plurality of display sections, for displaying the signal strengths of the signals having a plurality of reception frequencies stored in said detection storage means according to said order of said switching; and control means for shifting the display positions of the signal strengths of the signals having a plurality of reception frequencies displayed on said display means by automatically changing the reception frequency in a predetermined direction of change and shifting the signal strengths of the signals having a plurality of reception frequencies stored in said detection storage means according to said automatically changed reception frequency.

In the above-mentioned display apparatus, said detection storage means preferably switches over among said plurality of reception frequencies with a predetermined step frequency in a predetermined ascending or descending order of said plurality of reception frequencies.

According to a still more further aspect of the present invention, there is provided a display apparatus for use in a receiver apparatus for receiving a high-frequency signal having a predetermined reception frequency, comprising:

detection storage means for detecting and storing signal strengths of signals having a plurality of reception frequencies received by selectively switching over among said plurality of reception frequencies according to a predetermined order of said switching;

display means, having a plurality of display sections, for displaying on said plurality of display sections said plurality of reception frequencies stored in said detection storage means according to said order of switching said signal strengths; and control means for shifting the display positions of the signal strengths of the signals having a plurality of reception frequencies displayed on said display means in a direction corresponding to a predetermined direction of change of a plurality of reception frequencies, by automatically changing said plurality of reception frequencies in said predetermined order of said switching and in said predetermined direction of said change, and shifting the signal strengths of the signals having a plurality of reception frequencies stored in said detection storage means according to said changed reception frequency.

The above-mentioned display apparatus preferably further comprises channel storage means for storing a plurality of reception frequencies in correspondence to predetermined channel numbers, wherein said predetermined order of said switching is an ascending or descending order of said channel numbers of a plurality of reception frequencies stored in said channel storage means.

According to a further aspect of the present invention, there is provided a display apparatus for use in a receiver apparatus for receiving a high-frequency signal having a predetermined reception frequency, comprising:

detection storage means for detecting and storing signal strengths of signals having a plurality of reception frequencies received by selectively switching over among said plurality of reception frequencies according to a predetermined order of said switching around a predetermined center reception frequency;

display means, having a plurality of display sections, for displaying on said plurality of display sections the signal strengths of the signals having a plurality of reception frequencies stored in said detection storage means, around said center reception frequency according to said predetermined order of said switching;

first control means for shifting the display positions of the signal strengths of the signals having a plurality of reception frequencies displayed on said display means, in a direction corresponding to a predetermined direction of change, by automatically changing said reception frequencies including said center reception frequency in said predetermined direction of said change and in said predetermined direction of said change thereof, and shifting the signal strengths of the signals having a plurality of reception frequencies stored in said detection storage means according to said change of the reception frequency; and second control means, after the process of said first control means is completed, for controlling said detection storage means to detect and store the signal strength of the signal having the reception frequency corresponding to the display section located at the end of said display means for which the signal strengths is not detected, and for controlling said display means to display said stored signal strength on the display section located at the end of said display means.

In the above-mentioned display apparatus, said predetermined order of said switching is preferably an order of switching over among said plurality of reception frequencies with a predetermined step frequency in a predetermined ascending or descending order of said plurality of reception frequencies.

The above-mentioned display apparatus preferably further comprises channel storage means for storing a plurality of reception frequencies corresponding to predetermined channel numbers;

wherein said predetermined order of said switching is a predetermined ascending or descending order of said channel numbers of a plurality of reception frequencies stored in said channel storage means.

According to a still further aspect of the present invention, there is provided a receiver apparatus comprising:

reception means for receiving a high-frequency signal having a predetermined reception frequency;

detection storage means for detecting and storing signal strengths of signals having a plurality of reception frequencies received, by selectively switching over among said plurality of reception frequencies around a predetermined center reception frequency according to a predetermined order of said switching;

display means, having a plurality of display sections, for displaying on a plurality of display sections the signal strengths of the signals of said plurality of reception frequencies stored in said detection storage means, around the predetermined center reception frequency according to said predetermined order of said switching;

first control means for shifting the display positions of the signal strengths of the signals having said plurality of reception frequencies displayed on said display means in a direction corresponding to a predetermined direction of change, by automatically changing said reception frequencies including the center reception frequency in said predetermined direction of said switching and in said predetermined direction of said change thereof, and shifting the signal strengths of the signals of said plurality of reception frequencies stored in said detection storage means according to said change of the reception frequency;

second control means, after the process of said first control means is completed, for controlling said detection storage means to detect and store the signal strength of the signal having the reception frequency corresponding to the display section located at the end of said display means for which the signal strengths is not detected, and for controlling said display means to display said stored signal strength on the display section located at the end of said display means; and demodulation means for demodulating said high-frequency signal received by said reception means and outputting the demodulated low-frequency signal.

In the above-mentioned receiver apparatus, said demodulation means preferably outputs said demodulated low-frequency signal when the level of the high-frequency signal to be demodulated is greater than a predetermined threshold level in the process performed by the second control means.

In the above-mentioned receiver apparatus, said demodulation means preferably outputs said demodulated low-frequency signal for a predetermined time interval when the level of the high-frequency signal to be demodulated is greater than a predetermined threshold level in the process performed by the second control means.

In the above-mentioned receiver apparatus, said predetermined order of said switching is preferably an order of switching over among a plurality of reception frequencies with a predetermined step frequency in a predetermined ascending or descending order of said reception frequencies.

The above-mentioned receiver apparatus preferably further comprises channel storage means for storing a plurality of reception frequencies in correspondence with predetermined channel numbers, wherein said predetermined order of said switching is a predetermined ascending or descending order of said channel numbers of a plurality of reception frequencies stored in said channel storage means.

According to a further aspect of the present invention, there is provided a receiver apparatus comprising said above-mentioned display apparatus.

According to a still further aspect of the present invention, there is provided a radio receiver apparatus comprising said above-mentioned display apparatus.

According to a still more further aspect of the present invention, there is provided a transceiver comprising:

said above-mentioned display apparatus; and transmission means for transmitting a high-frequency signal having a transmission frequency which is the same as either one of said reception frequency, said center reception frequency, and a frequency shifted by a predetermined shift frequency from said reception frequency.

According to a further aspect of the present invention, there is provided a radio transceiver comprising:

said above-mentioned display apparatus; and transmission means for transmitting through an antenna a high-frequency signal having a transmission frequency which is the same as either one of said reception frequency, said center reception frequency, and a frequency shifted by a predetermined shift frequency from said reception frequency.

According to a still further aspect of the present invention, there is provided a transceiver comprising:

said above-mentioned receiver apparatus; and transmission means for transmitting a high-frequency signal having a transmission frequency which is the same as either one of said reception frequency, said center reception frequency, and a frequency shifted by a predetermined shift frequency from said reception frequency.

According to a still more further aspect of the present invention, there is provided a radio transceiver comprising:

said above-mentioned receiver apparatus; and transmission means for transmitting through an antenna a high-frequency signal having a transmission frequency which is the same as either one of said reception frequency, said center reception frequency, and a frequency shifted by a predetermined shift frequency from said reception frequency.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 20 is a flowchart of a display data replace process in the higher frequency direction of a subroutine shown in FIGS. 18, 23 and 37;

FIG. 21 is a flowchart of a display data replace process in the lower frequency direction of a subroutine shown in FIGS. 19, 24 and 40;

FIG. 38 is a flowchart of a first part of a scan search first process in the lower frequency direction of a subroutine shown in FIG. 34;

DETAILED DESCRIPTION OF THE PREFERRED EMBODIMENTS

The preferred embodiments according to the present invention will be described below with reference to the attached drawings.

First preferred embodiment

Figure 1:
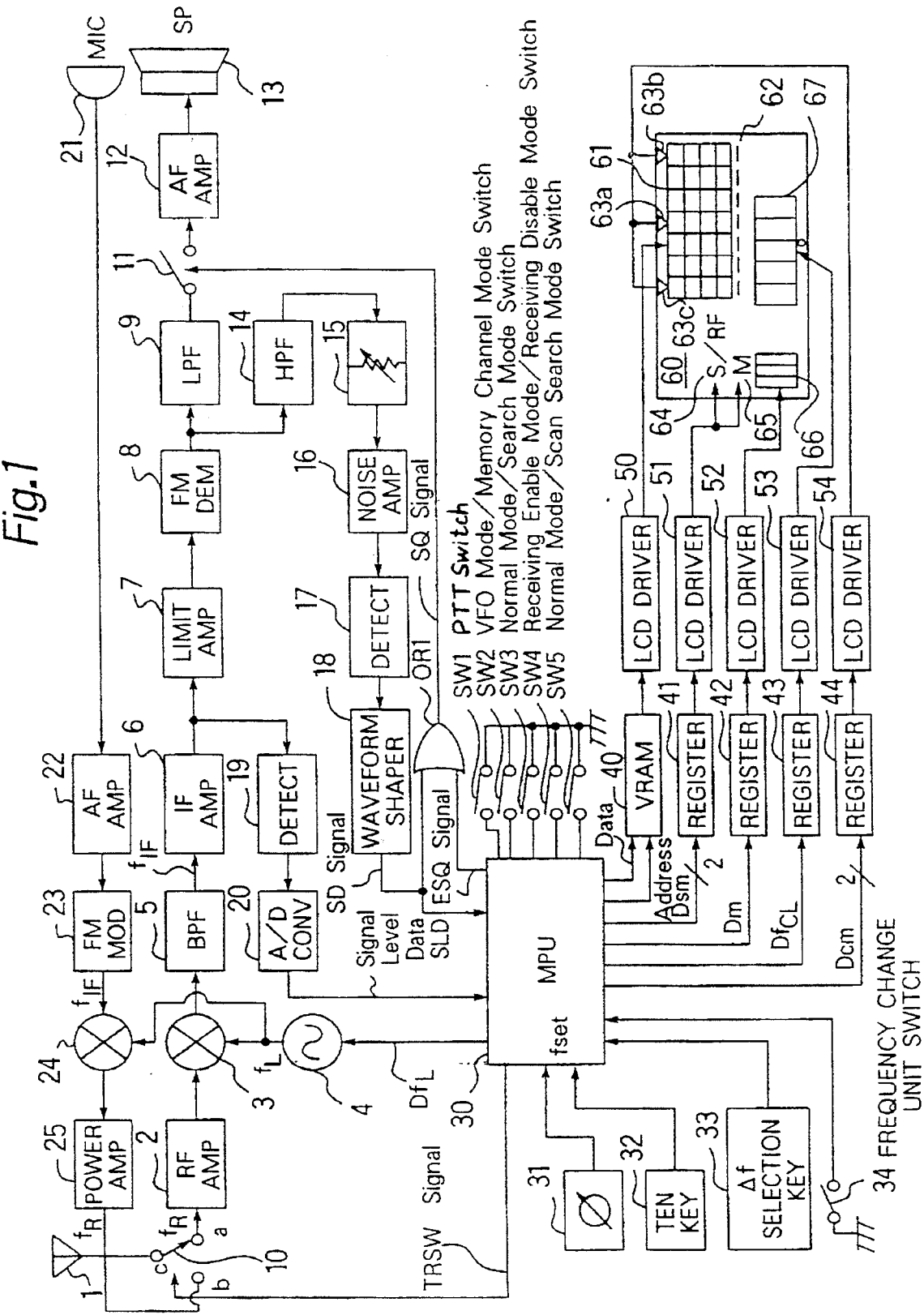
FIG. 1 is a block diagram of an FM radio transceiver having a function of displaying signal levels of signals having a plurality of frequencies in accordance with a first preferred embodiment of the present invention.

FIG. 1 is a block diagram of an "FM radio transceiver having a function of displaying the signal levels of signals having a plurality of frequencies" in accordance with a first preferred embodiment of the present invention, wherein the FM radio transceiver of the present preferred embodiment is provided for use in, in particular, amateur radio communications. The radio transceiver of the present preferred embodiment has the following operation modes.

(a) VFO mode/memory channel mode

The "VFO mode" is an operation mode in which a transmission and reception frequency is set up in a manner as follows. When a transmission and reception frequency fset =$f_R$ is set up by rotating a dial of a rotary encoder 31, a local oscillation signal having a local oscillation frequency $f_L$ corresponding to the transmission and reception frequency $f_R$ set up in the above-mentioned manner is generated by means of a VFO (Variable Frequency Oscillator which is practically a local oscillator 4 in the present preferred embodiment). When the dial of the rotary encoder 31 is rotated clockwise, the local oscillation frequency $f_L$ changes in the direction of increase in frequency every step frequency Δf which is previously set up by means of a step frequency selection key 33, with change of the transmission and reception frequency $f_R$. When the dial of the rotary encoder 31 is rotated counterclockwise, the local oscillation frequency $f_L$ changes in the direction of decrease in frequency every step frequency Δf previously set up, with change of the transmission and reception frequency $f_R$. When the transmission and reception frequency is directly input by means of a ten key 32 instead of using a dial of the rotary encoder 31, a local oscillation signal having a local oscillation frequency $f_L$ corresponding to the input transmission and reception frequency $f_R$ is generated in the local oscillator 4 so as to set up the transmission and reception frequency fset =$f_R$.

In contrast to the above-mentioned VFO mode, the "memory channel mode" is an operation mode in which a plurality of transmission and reception frequencies are previously stored in a memory of an MPU 30 in correspondence with predetermined memory channel numbers, and through designation of one channel number by means of the rotary encoder 31 or the ten key 32, a corresponding transmission and reception frequency fset =$f_R$ is set up.

(b) Normal mode/search mode

The "normal mode" is an operation mode in which transmission and reception is executed by means of a speaker 13 and a microphone without displaying the levels of signal strengths of signals having a plurality of frequencies. In contrast to the above, the "search mode" is an operation mode in which the signal levels of signals having a plurality of reception-signal frequencies are displayed on a matrix liquid crystal display section 61 of an LCD unit 60. It is noted that the signal strength level is referred to merely as a "signal level".

(c) Receiving enable mode/receiving disable mode

Each of these modes is an operation mode which is effective only when the search mode is set up. The "receiving enable mode" is an operation mode in which a reception signal can be monitored with the speaker 13, while the "receiving disable mode" is an operation mode in which no reception signal can be monitored with the speaker 13.

(d) Normal mode/scan search mode

The "normal mode" is the same operation mode as the normal mode of (c) in which transmission and reception is executed by means of the speaker 13 and the microphone 21 without displaying the levels of signal strengths of signals having a plurality of frequencies.

In contrast to the above-mentioned normal mode, the "scan search mode" in the "VFO mode" is an operation mode in which an operation of repeating automatic changing of the transmission and reception frequency in the direction of increase in frequency (referred to as "the higher frequency direction" hereinafter) or in the direction of decrease in frequency (referred to as "the lower frequency direction" hereinafter) every step frequency, which is set up by means of the step frequency selection key 33, until the "scan search mode" is released in the "search mode" in which the signal levels of signals having a plurality of reception signal frequencies are displayed on the matrix LCD section 61 of the LCD unit 60. With the above-mentioned operation, the signal level data of reception signals at a plurality of frequencies stored in a VRAM 40 are shifted according to the change of the transmission and reception frequency so as to display the display positions of the reception signals at the plural number of frequencies on the matrix LCD section 61 of the LCD unit 60 by successively shifting the display positions in the higher or lower frequency direction. When setting up the scan search mode in the higher or lower frequency direction, the operator is required to turn on a normal mode/scan search mode switch SW5 and then rotate the rotary encoder (abbreviated to "RE" in the drawings hereinafter) 31 clockwise (in the higher frequency direction) or counterclockwise (in the lower frequency direction) as the rotary encoder is viewed from the upper side of the rotary encoder 31. It is noted that the rotation direction of the rotary encoder 31 is shown as it is viewed from the upper side of the rotary encoder 31.

When the "scan search mode" is set up in the "memory channel mode", an operation of changing the transmission and reception frequency automatically in the ascending (increasing) or descending (decreasing) order of the memory channel numbers according to the transmission and reception frequency previously stored in the memory of the MPU 30.in correspondence with the memory channel numbers is repeated until the "scan search mode" is released. With the above-mentioned operation, the signal level data of reception signals at a plurality of frequencies stored in the VRAM 40 are shifted so as to display the display positions of the reception signals at the plural number of frequencies on the LCD section 61 of the LCD unit 60 by successively shifting the display positions in the ascending or descending order of the memory channel numbers. When setting up the scan search mode according to the ascending or descending order of the memory channel numbers, the operator is required to turn on the normal mode/scan search mode switch SW5 in the "memory channel mode" and then rotate the rotary encoder 31 clockwise (in the ascending or increasing order of the memory channel numbers) or counterclockwise (in the descending or decreasing order of the memory channel numbers) when the rotary encoder is viewed from the upper side.

The radio transceiver having a function of displaying signal levels of signals having a plurality of frequencies of the present preferred embodiment detects an IF signal output from an IF amplifier 6 by means of a detector circuit 19 and then converts the resulting signal into digital data by means of an analog-to-digital converter (referred to as an "A/D converter" hereinafter) 20 so as to take the converted data as a signal level data SLD in a microprocessing unit (referred to as an "MPU" hereinafter) 30 which serves as a control circuit. Furthermore, in the search mode and the reception state, the signal level data SLD is taken in the CPU, while successively varying the local oscillation frequency $f_L$ of the local oscillator 4 so as to write the corresponding level display data into the VRAM 40. With the above-mentioned operation, the signal levels at the plural number of frequencies around the signal level of the transmission and reception frequency $f_R$ is displayed on the matrix LCD section 61 of the LCD unit 60, while allowing the low-frequency signal demodulated from the modulated wave of the high-frequency signal at the transmission and reception frequency $f_R$ to be heard from the speaker 13.

In the VFO mode and the search mode, the step frequency in the horizontal direction of the LCD unit 60 when displaying the signal levels of signals having a plurality of frequencies is the step frequency $\Delta f$ in the VFO mode previously set up by means of the step frequency selection key 33 in the radio transceiver. In the present preferred embodiment, the signal levels at the frequency $(f_R-3\Delta f)$, frequency $(f_R-2\Delta f)$, the frequency $(f_R-\Delta f)$, the transmission and reception frequency $f_R$, the frequency $(f_R+\Delta f)$, the frequency $(f_R+2\Delta f)$, and the frequency $(f_R+3\Delta f)$ are displayed in the above-mentioned order from the left end of the matrix LCD section 61 of the LCD unit 60 when viewed from the front of the display unit. In the memory channel mode and the search mode of the present preferred embodiment, assuming that the current set-up channel number is m, the signal levels at the frequency of the channel number (m–3), the frequency of the channel number (m–2), the frequency of the channel number (m–1), the frequency of the channel number m, the frequency of the channel number (m+1), the frequency of the channel number (m+2), and frequency of the channel number (m+3) are displayed in the above-mentioned order from the left end of the matrix LCD section 61 of the LCD unit 60 as viewed from the front of the display unit.

In the reception state, there is executed display of the signal levels of signals having a plurality of frequencies representing the signal levels of the seven high-frequency signals, wherein the signal levels change in the vertical direction of the matrix LCD section 61 of the LCD unit 60 in a manner as described above in the search mode. Meanwhile, in the normal mode, there is executed display of the signal levels of the high-frequency signals currently being received, wherein the signal levels change in the horizontal direction at the pixels in the lowermost two rows and seven columns in the matrix LCD section 61.

Figure 7:
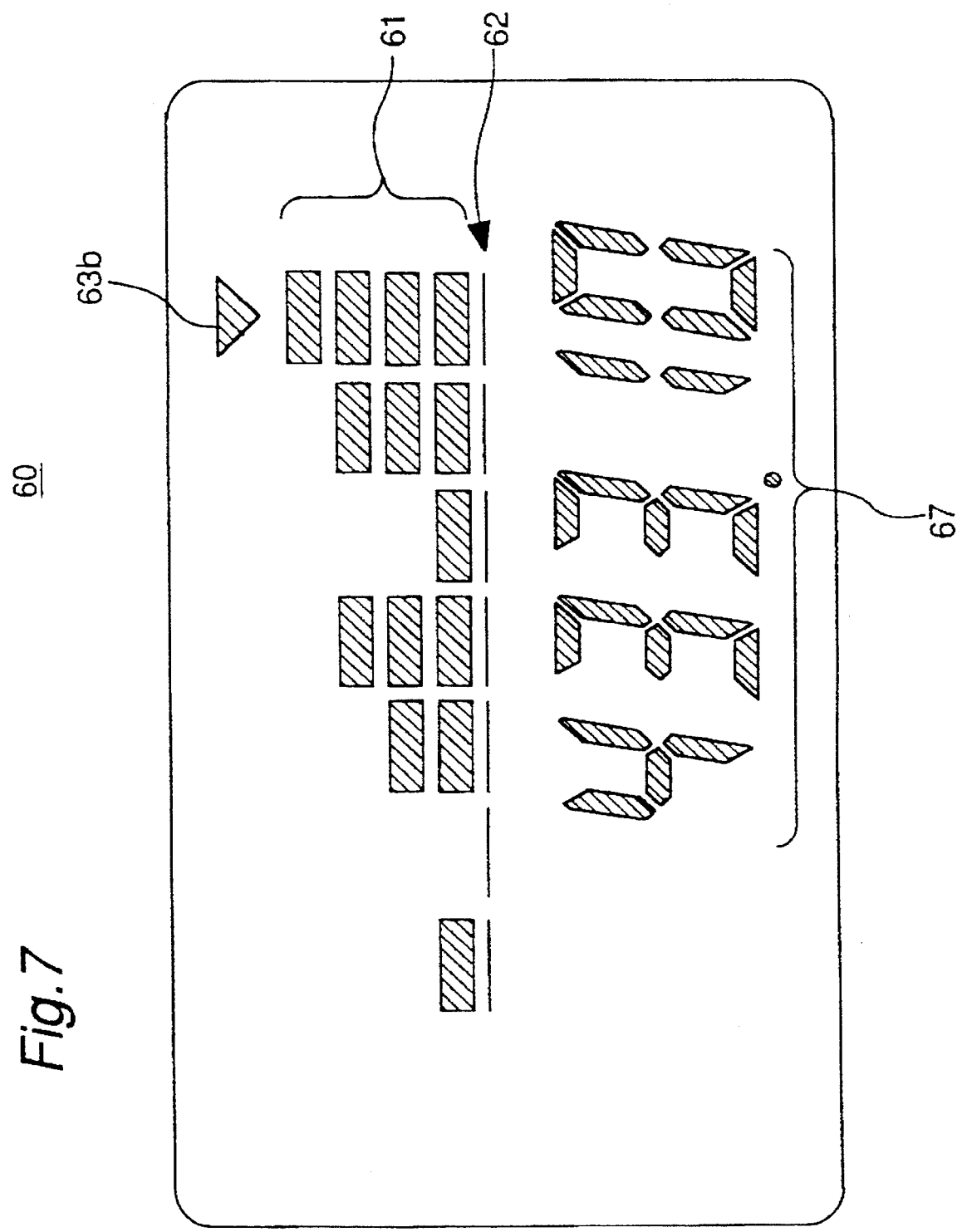
FIG. 7 is a front view of the LCD when signal levels of signals having a plurality of frequencies are displayed in the VFO mode and the scan search mode in which the transmission and reception frequency is scanned in a higher frequency direction in the radio transceiver shown in FIG. 1.
Figure 8:
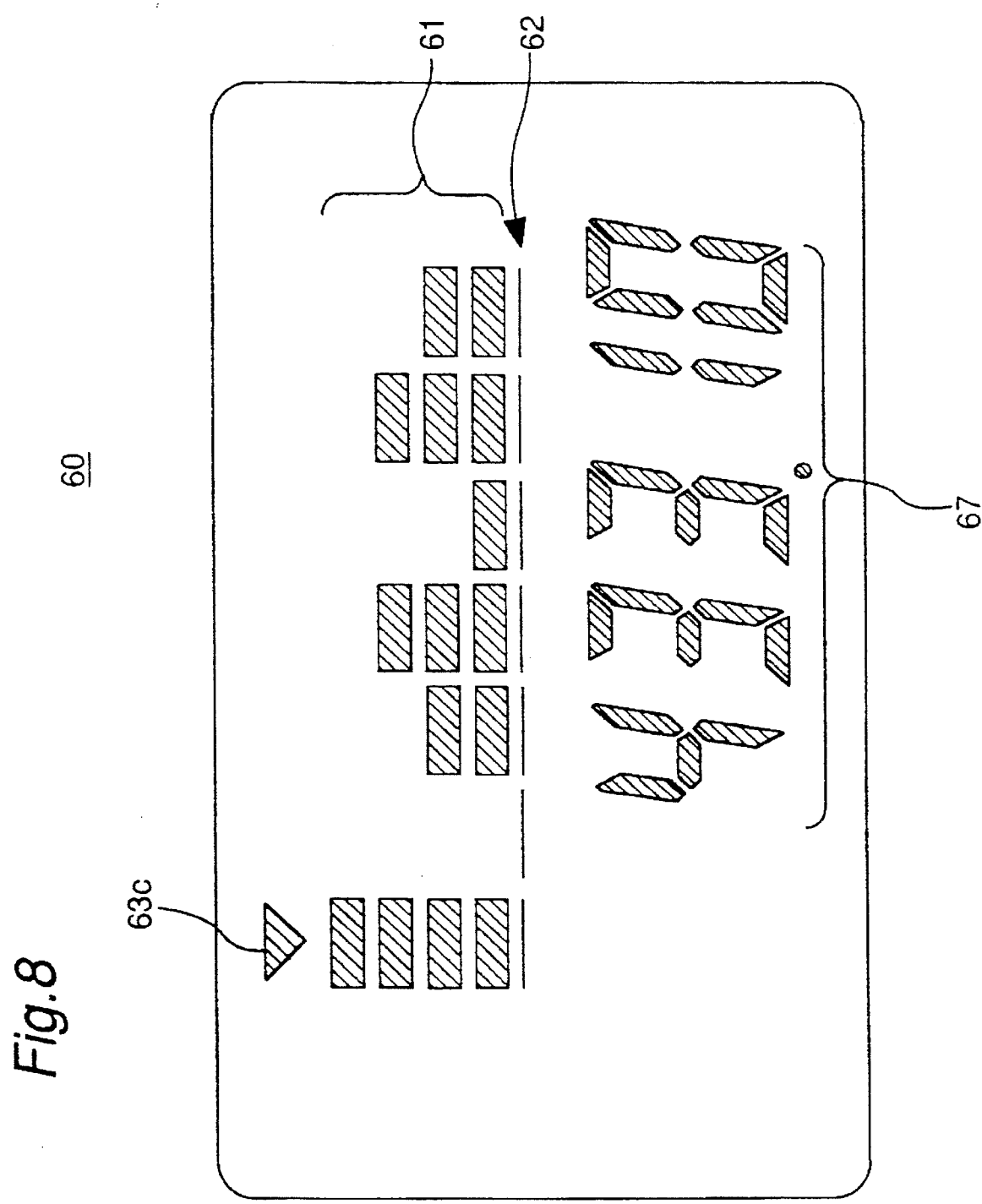
FIG. 8 is a front view of the LCD when signal levels of signals having a plurality of frequencies are displayed in the VFO mode and the scan search mode in which the transmission and reception frequency is scanned in the lower frequency direction in the radio transceiver shown in FIG. 1.
Figure 27:
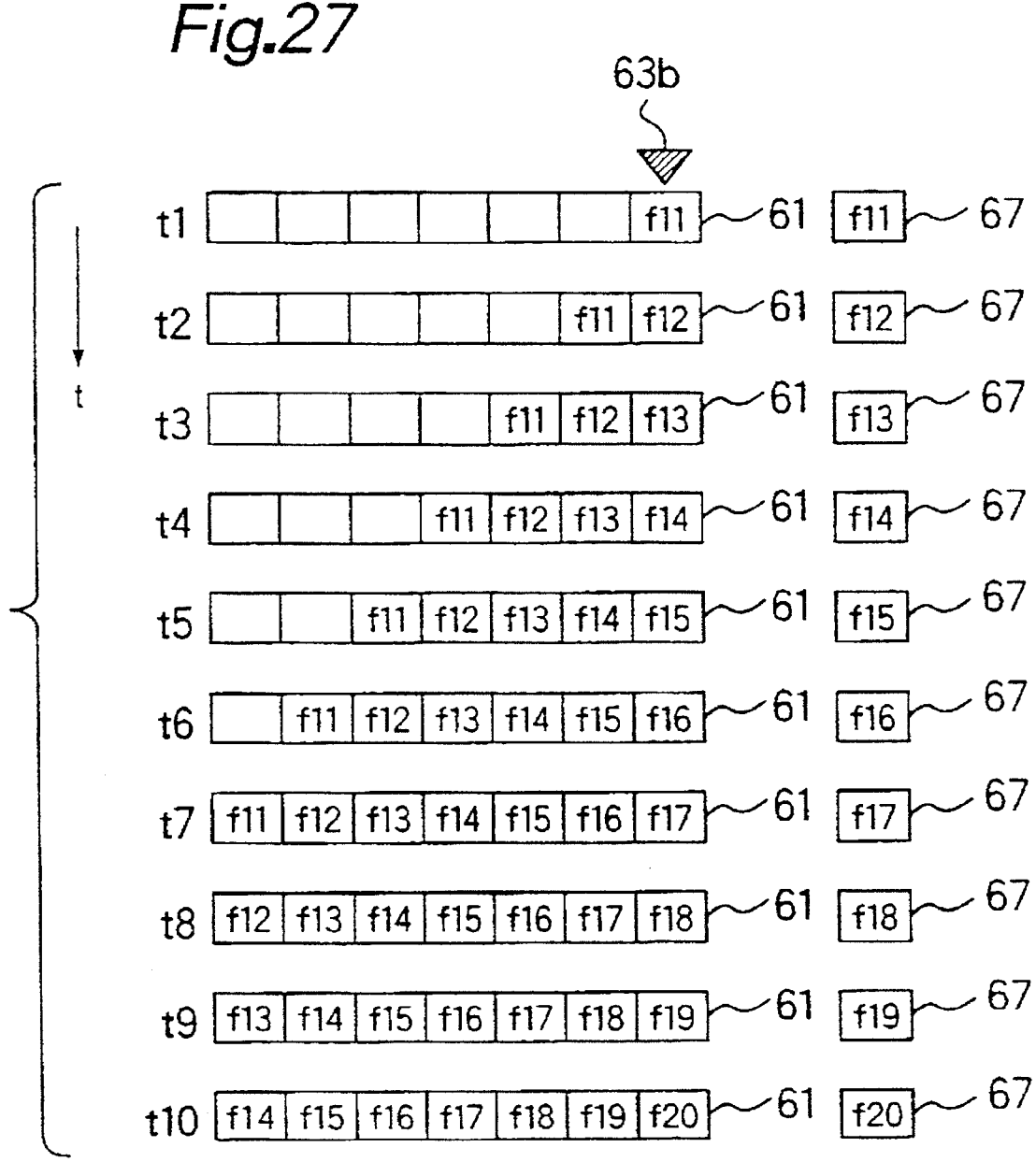
FIG. 27 is a front view showing frequencies of seven signal levels displayed on the matrix LCD section 61 of the LCD section when the transmission and reception frequency is scanned by automatic scan search in the first preferred embodiment in which the transmission and reception frequency is scanned in the higher frequency direction, and the transmission and reception frequency displayed on the seven-segment LCD section 67.
Figure 28:
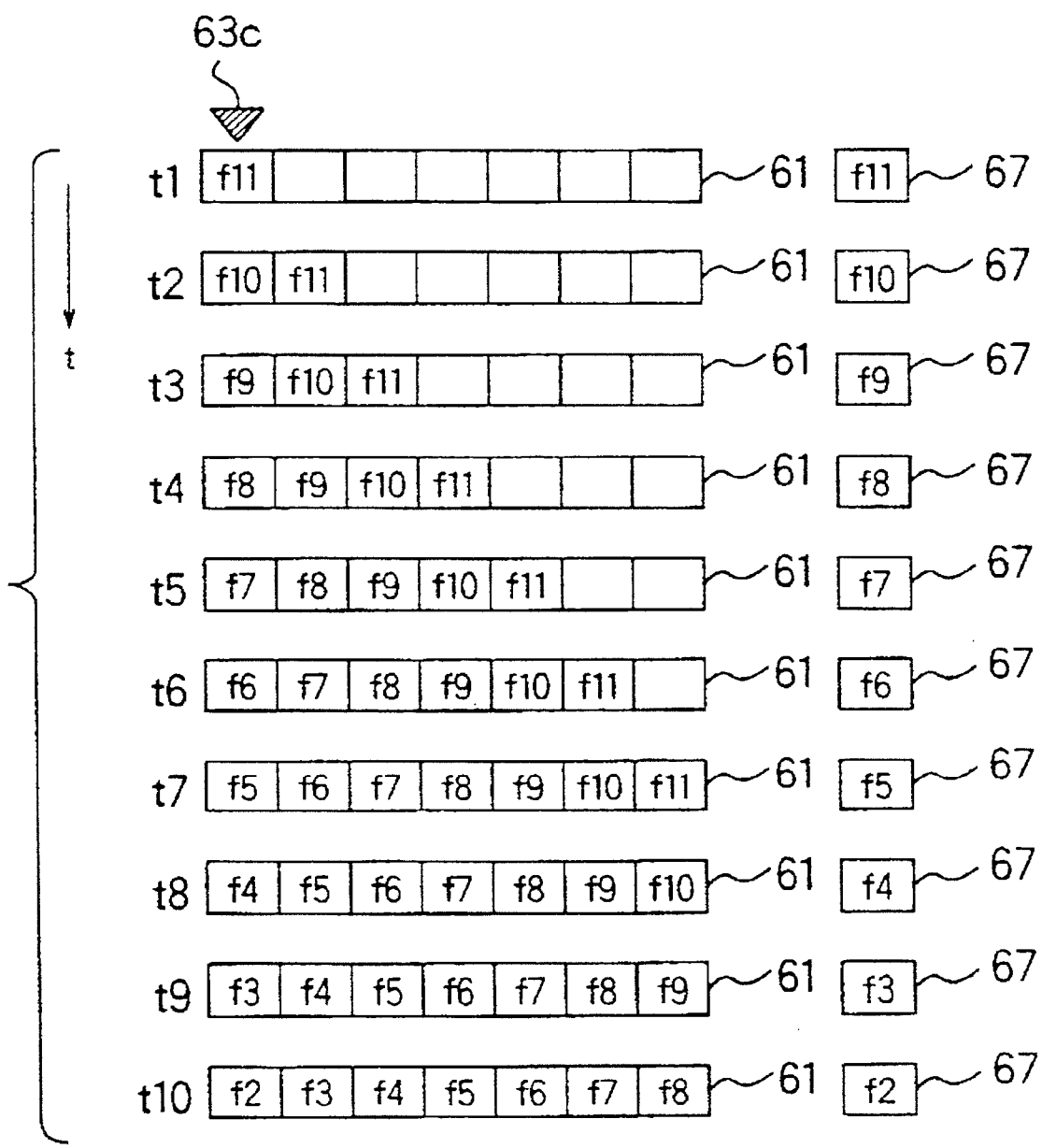
FIG. 28 is a front view showing frequencies of seven signal levels displayed on the matrix LCD section 61 of the LCD section when the transmission and reception frequency is scanned by automatic scan search in the first preferred embodiment in which the transmission and reception frequency is scanned in the lower frequency direction, and the transmission and reception frequency displayed on the seven-segment LCD section 67.

In the transceiver of the present preferred embodiment, by setting up the scan search mode, an operation of automatically changing the transmission and reception frequency $f_R$ in the higher or lower frequency direction every step frequency set up by means of the step frequency selection key 33 is repeated until the scan search mode is released. In this state, by shifting the signal level data of the reception signals at a plurality of frequencies in the VRAM 40, the display positions of the signal levels of the reception signals at the plural number of frequencies are displayed by successively shifting the display positions in the higher or lower frequency direction according to the change of the transmission and reception frequency $f_R$. When changing the transmission and reception frequency in the higher frequency direction in the scan search mode, the signal level of the transmission and reception frequency is displayed in a manner that it is shifted so as to be located at the right end of the matrix LCD section 61 indicated by a center pointing LCD section 63*b* as shown in FIG. 7, and then the display position of the signal level is sequentially shifted leftward as shown in FIG. 27 since the transmission and reception frequency is scanned sequentially in the higher frequency direction. When changing the transmission and reception frequency in the lower frequency direction, the signal level of the transmission and reception frequency is displayed in a manner that it is shifted so as to be located at the left end of the matrix LCD section 61 indicated a center pointing LCD section 63*c* as shown in FIG. 8, and then, the display position of the signal level is sequentially shifted rightward as shown in FIG. 28 since the transmission and reception frequency is sequentially scanned in the lower frequency direction.

By setting up the scan search mode in the memory channel mode, an operation of automatically changing the transmission and reception frequency $f_R$ in the ascending (increasing) or descending (decreasing) order of the memory channel numbers according to the transmission and reception frequency previously stored in the memory of the MPU 30 in correspondence with the memory channel numbers is repeated until the scan search mode is released. In this state, by shifting the signal level data of the reception signals at a plurality of frequencies in the VRAM 40, the display positions of the signal levels of the reception signals at the plural number of frequencies are displayed by successively shifting the display positions in the ascending (increasing) or descending (decreasing) order of the memory channel numbers according to the change of the transmission and reception frequency $f_R$. When changing the transmission and reception frequency in the ascending order of the memory channel numbers in the scan search mode in the memory channel mode, the signal level of the transmission and reception frequency is displayed in a manner that it is shifted so as to be located at the right end of the matrix LCD section 61 indicated by the center pointing LCD section 63*b* as shown in FIG. 7, and then, the display position of the signal level is sequentially shifted leftward because the transmission and reception frequency is sequentially scanned in the ascending order of the memory channel numbers. When changing the transmission and reception frequency in the descending order of the memory channel numbers, the signal level of the transmission and reception frequency is displayed in a manner that it is shifted so as to be located at the left end of the matrix LCD section 61 indicated by the center pointing LCD section 63*c* as shown in FIG. 8, and then, the display position of the signal level is sequentially shifted rightward because the transmission and reception frequency is sequentially scanned in the descending order of the memory channel numbers.

According to the transceiver of the present preferred embodiment, in the VFO mode and the search mode, the rotary encoder 31 is rotated clockwise or counterclockwise so as to change the transmission and reception frequency in the higher or lower frequency direction according to the degree of rotation, wherein the rotary encoder 31 has clip points at intervals of about 30° in angle, and the degree of rotation increases every time the rotary encoder 31 passes through respective clip points. In accordance with the above-mentioned operation, the signal level data of the reception signals at a plurality of frequencies in the search mode stored in the VRAM 40 are shifted to display in a shifting manner the display positions of the signal levels at the plural number of frequencies on the matrix LCD section 61 of the LCD unit 60. The above-mentioned operation is referred to as a "manual scan search" in contrast to a "scan search mode" executed automatically.

Reference is, first of all, made to the construction of a radio transceiver having a function of displaying signal levels of signals having a plurality of frequencies as shown in FIG. 1.

Referring to FIG. 1, a high-frequency signal received by the antenna 100 is input to a mixer 3 through a common terminal c and a contact point a of a transmission and reception selector switch 10 and an RF amplifier 2 and then mixed with a local oscillation signal having a local oscillation frequency $f_L$ generated in a local oscillator 4 to be converted into a predetermined intermediate frequency $f_{IF}$ ($f_{IF}=f_R=f_L$ in the present preferred embodiment). Subsequently, the resulting signal is input to a limiter amplifier 7 and a detector circuit 19 through a band-pass filter (BPF) 5 for allowing only an IF signal to pass therethrough and an IF amplifier 6. In this state, the local oscillator 4 includes a PLL circuit and generates a local oscillation signal having the local oscillation frequency $f_L$ based on a local oscillation frequency data $Df_L$ output from an MPU 30 to output the signal to the mixer 3 and a mixer 24. The transmission and reception selector switch 10 is selectively switched to either the contact point a or a contact point b based on a transmission and reception switching signal (referred to as a "TRSW signal" hereinafter) output from the MPU 30. In this case, when the TRSW signal is at L level (represented by control data "0" in the MPU 30 in the flowcharts included in the drawings), the selector switch 10 is switched to the contact point a so as to put the radio transceiver into the reception state. When the TRSW signal is at H level (represented by control data "1" in the MPU 30 in the flowcharts), the selector switch 10 is switched to the contact point b so as to put the radio transceiver into the transmission state.

The IF signal input to the detector circuit 19 is subjected to envelope detection, and then, the IF signal is converted into digital data by an A/D converter 20, while the signal level data SLD proportional to the signal level of the received high-frequency signal is input to the MPU 30 so as to be taken therein. On the other hand, the limiter amplifier 7 limits the amplitude of the input IF signal to a predetermined amplitude level, and then, outputs the resulting signal to an FM demodulator 8. The FM demodulator 8 demodulates the input IF signal so as to take out the low-frequency signal or the voice signal from the modulated wave and outputs the low-frequency signal to a speaker 13 through a low-pass filter (LPF) 9, a squelch switch 11, and an AF amplifier 12. The signal which includes a triangular wave noise and has a frequency higher than that of the low-frequency signal after being output from the FM demodulator 8 is input to a detector circuit 17 through a high-pass filter (HPF) 14, a squelch adjusting attenuator 15, and a noise amplifier 16. The detector circuit 17 detects the noise component output from the FM demodulator 8, and outputs the resulting signal to a waveform shaping circuit 18.

The waveform shaping circuit 18 compares the input noise component with a predetermined threshold level. When the noise component level is not lower than the threshold level, i.e., when the level of an FM signal received by the FM signal receiver is lower than the predetermined threshold level, the waveform shaping circuit 18 determines that the signal of the modulated wave to be received cannot be detected, and outputs a high level (referred to as an H level hereinafter) SD (Signal Detection) signal as a squelch signal (referred to as an SQ signal hereinafter) to a control terminal of the squelch switch 11 through a first input terminal of an OR gate OR1 so as to turn off the squelch switch 11, thereby preventing the post-demodulation low-frequency signal from being output from the speaker 13. It is noted that the SD signal output from the waveform shaping circuit 18 is also input to the MPU 30. When the noise component level is lower than the threshold level, i.e., when the level of an FM signal received by the FM signal receiver is not lower than the predetermined threshold level, the waveform shaping circuit 18 determines that the noise component is sufficiently low, and outputs a low level (referred to as a L level hereinafter) signal to the control terminal of the squelch switch 11 through the first input terminal of the OR gate OR1 so as to turn on the squelch switch 11, thereby outputting the post-demodulation low-frequency signal from the speaker 13. The MPU 30 further outputs an H-level enforced squelch signal (referred to as an "ESQ signal" hereinafter) so as to compulsorily turn off the squelch switch 11 in a manner as described later in detail, to the control terminal of the squelch switch 11 through a second input terminal of the OR gate OR1.

It is noted that, in the flowcharts, the H-level ESQ signal is represented by control data "1" in the MPU 30, while the L-level ESQ signal is represented by control data "0" in the MPU 30. The SD signal is also described in the same manner of expression as that of the above-mentioned ESQ signal.

In the transmission state, an audio signal input to the microphone 21 is input through an AF amplifier 22 to an FM modulator 23. The FM modulator 23 frequency-modulates an IF carrier signal having a predetermined intermediate frequency $f_{IF}$ according to the input audio signal, and then outputs the frequency modulated IF signal to the mixer 24. The mixer 24 mixes the input IF signal with the local oscillation signal output from the local oscillator 4 so as to generate a high-frequency transmission signal having a frequency identical to the frequency $f_R$, and then outputs the high-frequency transmission signal to the antenna 1 through a power amplifier 25 and the contact point b and the common terminal c of the transmission and reception selector switch 10, thereby radiating the transmission signal.

The MPU 30 is a control circuit for controlling the operation of the entire radio transceiver and the display operation of the LCD unit 60. The MPU 30 comprises a CPU for executing control and calculation, a ROM for storing therein a control program and data necessary for executing the control program, and a RAM which is used as a work area in executing the control program while storing therein data of a variety of signals and current data of flags. The MPU 30 is connected with a rotary encoder 31 for setting up a transmission and reception frequency and a memory channel number through rotation of the rotary encoder 31's dial and designating the scan direction, and a ten key 32 for directly inputting the transmission and reception frequency and the memory channel number and setting up a variety of control parameters such as a waiting time interval Tw seconds in a waiting process (step S246) described later in detail. In this case, the transmission and reception frequency set up by means of the rotary encoder 31 or the ten key 32 are set up as set-up frequency data fset and stored in the RAM of the MPU 30. The waiting time interval Tw seconds is set up by means of the ten key 32 and then stored into the RAM of the MPU 30.

The MPU 30 is further connected with a step frequency selection key 33 for selectively setting up one of the frequencies of, for example, 1 kHz, 5 kHz, 10 kHz, 20 kHz, and 25 kHz as a step frequency f which is the change step frequency of the transmission and reception frequency in the VFO mode. The data of the step frequency $\Delta f$ set up by means of the key 33 is input to the MPU 30. The MPU 30 is further connected with a terminal of a frequency change unit selector switch 34 the other terminal of which is connected to the ground or earth. Every time the switch 34 is turned on, the unit of change of the transmission and reception frequency to be changed by means of the rotary encoder 31 is set up when being selectively switched between the step frequency $\Delta f$ selected by means of the step frequency selection key 33 and the frequency of 1 MHz.

The MPU 30 is connected to the ground through the following five switches.

(a) Push To Talk switch (referred to as a PTT switch hereinafter) SW1: This is a switch for transmitting an audio signal by putting the radio transceiver in the transmission state. When the switch SW1 is turned on, the radio transceiver is put in the transmission state.

(b) VFO mode/memory channel mode switch SW2: This is a switch for selecting between the VFO mode and the memory channel mode. Every time the switch SW2 is turned on, the VFO mode and the memory channel mode are selected alternatively.

(c) normal mode/search mode switch SW3: This is a switch for selecting between the normal mode and the search mode. Every time the switch SW3 is turned on, the normal mode and the search mode are selected alternatively.

(d) receiving enable mode/receiving disable mode switch SW4: This is a switch for selecting between the receiving enable mode and the receiving disable mode, the switch effective only in the search mode. Every time the switch SW4 is turned on, the receiving enable mode and the receiving disable mode are selected alternatively.

(e) normal mode/scan search mode switch SW5: This is a switch for selecting between the normal mode and the scan search mode. Every time the switch SW5 is turned on, the normal mode and the scan search mode are selected alternatively.

Figure 3:
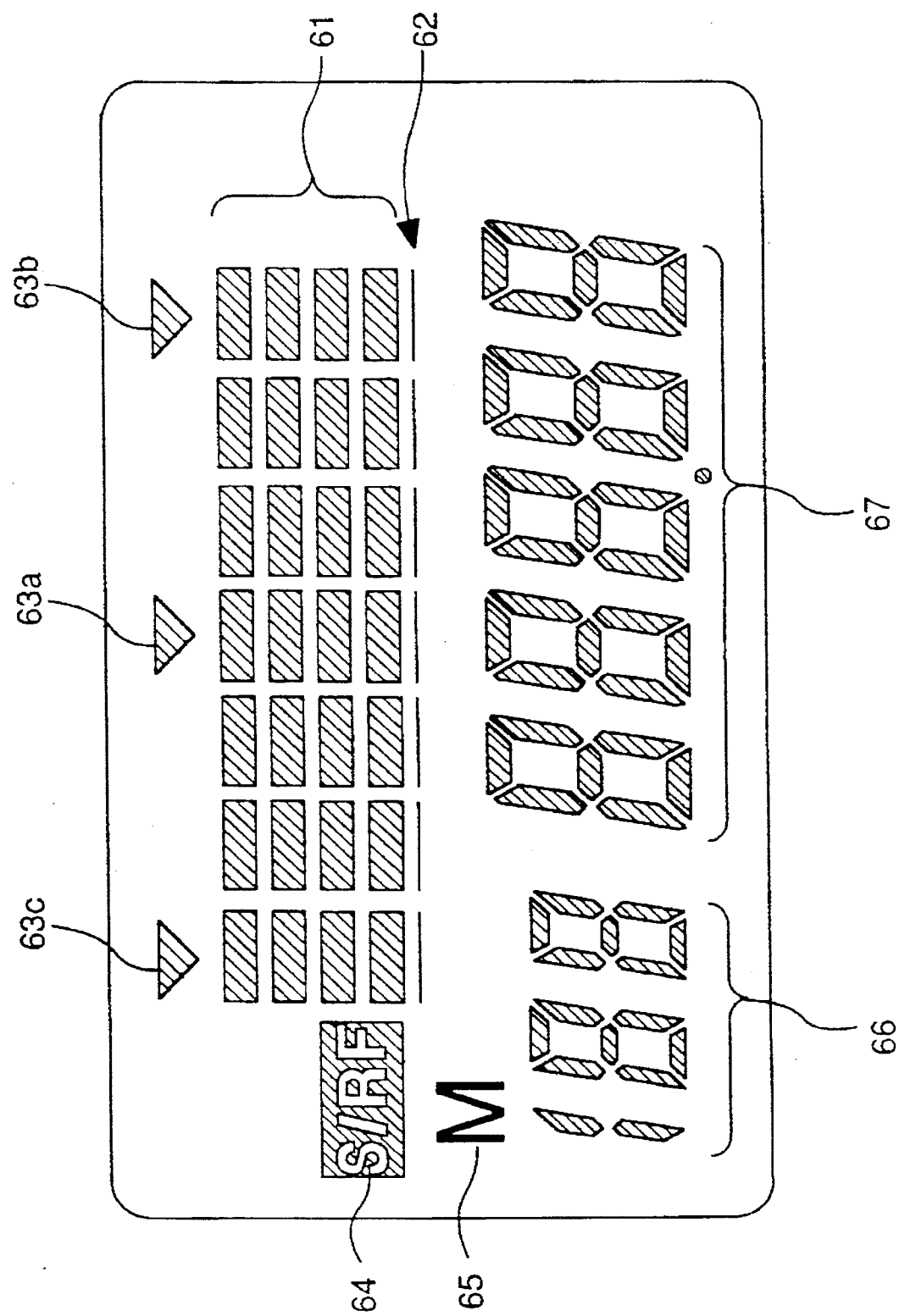
FIG. 3 is a front view of a liquid crystal display (referred to as an LCD hereinafter) shown in FIG. 1.

FIG. 3 is a front view of the LCD unit 60 when display is effected in all the LCD pixels. Referring to FIG. 3, a matrix LCD section 61 in which rectangular LCD pixels LM00 through LM63 are arranged in a matrix of four rows and seven columns (See FIG. 4) in an upper center portion of the LCD unit 60. Just below the LCD pixels LM00 through LM60 in the lowest row of the matrix LCD section 61 are provided horizontal-line-shaped reference LCD pixels 62 which indicate the display positions and the reference levels always in displaying the signal levels of signals having a plurality of frequencies. On the other hand, above the LCD pixel LM33 in the upper center portion of the matrix LCD section 61 is provided a center-indicating LCD section 63a having a downward arrow shape. Above the LCD pixel LM63 in the upper right portion of the matrix LCD section 61 is provided a center-indicating LCD section 63b having a downward arrow shape. In the vicinity of a portion above the LCD pixel LM03 in the upper left portion of the matrix LCD section 61 is provided a center-indicating LCD section 63c having a downward arrow shape.

At the left side of the matrix LCD section 61 is provided an "S/RF" LCD section 64 which indicates the state that the contents of display on the matrix LCD section 61 is the reception signal level (in the reception state) or the transmission signal level (in the transmission state) in the normal mode. Below the section 64 is provided an "M" LCD section 65 which indicates the state that the current mode is the memory channel mode. Just below the section 65 is provided a three-figure seven-segment LCD section 66 which indicates the memory channel in the memory channel mode. In a lower right portion of the LCD unit 60 is provided a five-figure seven-segment LCD section 67 which indicates the transmission and reception frequency $f_R$ or the center transmission and reception frequency in the search mode or the scan search mode, wherein the LCD section 67 has a decimal point in between the second figure and the third figure from the right end.

Figure 4:
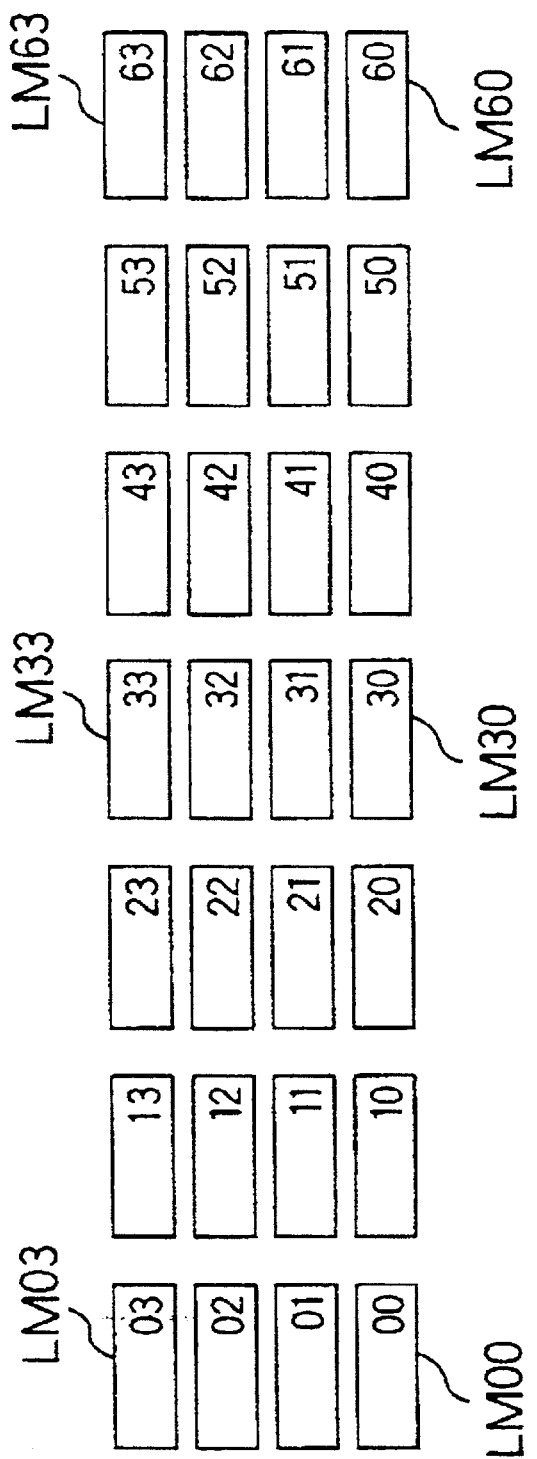
FIG. 4 is a front view showing a relation between LCD pixels in a matrix LCD section shown in FIG. 3 and addresses of a VRAM for storing pixel data.

The VRAM 40 is a video RAM which is connected to the MPU 30 and stores data of 28 pixels to be displayed on the matrix LCD section 61. An output terminal of the VRAM 40 is connected to the matrix LCD section 61 of the LCD unit 60 through an LCD driver 50. Therefore, when pixel data is stored in the VRAM 40, the corresponding display is effected by the LCD driver 50 in real time on the LCD pixels in the matrix LCD section 61. FIG. 4 is a front view showing a relation between the LCD pixels in the matrix LCD section 61 shown in FIG. 3 and the addresses of the VRAM 40 for storing pixel data. As shown in FIG. 4, addresses "00" through "63" are assigned to twenty eight LCD pixels LM00 through LM63 in a manner of two-figure display.

A register 41 is a two-bit register which is connected to the MPU 30 and stores two-bit pixel data Dsm for display on the LCD sections 64 and 65. An output terminal of the register 41 is connected to the LCD sections 64 and 65 of the LCD unit 60 through an LCD driver 51. Therefore, when pixel data Dsm is stored in the register 41, the corresponding display is effected by the LCD driver 51 in real time on the LCD pixels in the LCD sections 64 and 65. In this state, the first bit of the pixel data Dsm is the data representing whether or not display is to be effected on the LCD section 64, while the second bit is the data representing whether or not display is to be effected on the LCD section 65.

A register 42 is a register which is connected to the MPU 30 and stores memory channel number data Dm for display on the LCD section 66. An output terminal of the register 42 is connected to the LCD section 66 of the LCD unit 60 through an LCD driver 52. Therefore, when the pixel data Dm is stored in the register 42, the corresponding display is effected on the LCD pixels in the LCD section 66 by the LCD driver 52. A register 43 is a register which is connected to the MPU 30 and stores transmission and reception frequency data $Df_{CL}$ to be displayed on the LCD section 67. An output terminal of the register 43 is connected to the LCD section 67 of the LCD unit 60 through an LCD driver 53. Therefore, when the pixel data $Df_{CL}$ is stored in the register 43, the corresponding display is effected on the LCD pixels on the LCD section 67 by the LCD driver 53.

A register 44 is a two-bit register which is connected to the MPU 30 and stores two-bit pixel data Dcm for display in the center-indicating LCD sections 63a, 63b and 63c. An output terminal of the register 44 is connected to the LCD sections 63a, 63b and 63c of the LCD unit 60 through an LCD driver 54. Therefore, when the pixel data Dcm is stored in the register 44, the corresponding display is effected on the LCD pixels on the LCD sections 63a, 63b and 63c by the LCD driver 54. In this state, display is effected only on the LCD section 63a indicating the center portion of the matrix LCD section 61 when the pixel data Dcm is "00". When the pixel data Dcm is "01", display is effected only on the LCD section 63b indicating the right end of the matrix LCD section 61. When the pixel data Dcm is "10", display is effected only on the LCD section 63c indicating the left end of the matrix LCD section 61.

Various kinds of flags which are stored in the RAM of the MPU 30 are as follows.

(a) FS2: This flag becomes FS2=0 in the VFO mode, and becomes FS2=1 in the memory channel mode.

(b) FS3: This flag becomes FS3=0 in the normal mode, and becomes FS3=1 in the search mode.

(c) FS4: This flag becomes FS4=0 in the receiving enable mode, and becomes FS4 =1 in the receiving disable mode.

(d) FS5: This flag becomes FS5=0 in the normal mode, and becomes FS5=1 in the scan search mode.

(e) FS5S: This is a flag for designating the start of scan search. The flag FS5S is set to 1 when the scan search is started. After the matrix LCD section 61 is entirely turned off at step S406, the flag FS5S is reset to zero at step S407.

(f) FUP: This flag FUP is set to 1 when the rotary encoder 31 is rotated clockwise so as to scan the transmission and reception frequency automatically or manually in the higher frequency direction, and the flag FUP is reset to zero when the rotary encoder 31 is rotated counterclockwise so as to scan the transmission and reception frequency automatically or manually in the lower frequency direction.

Figure 9:
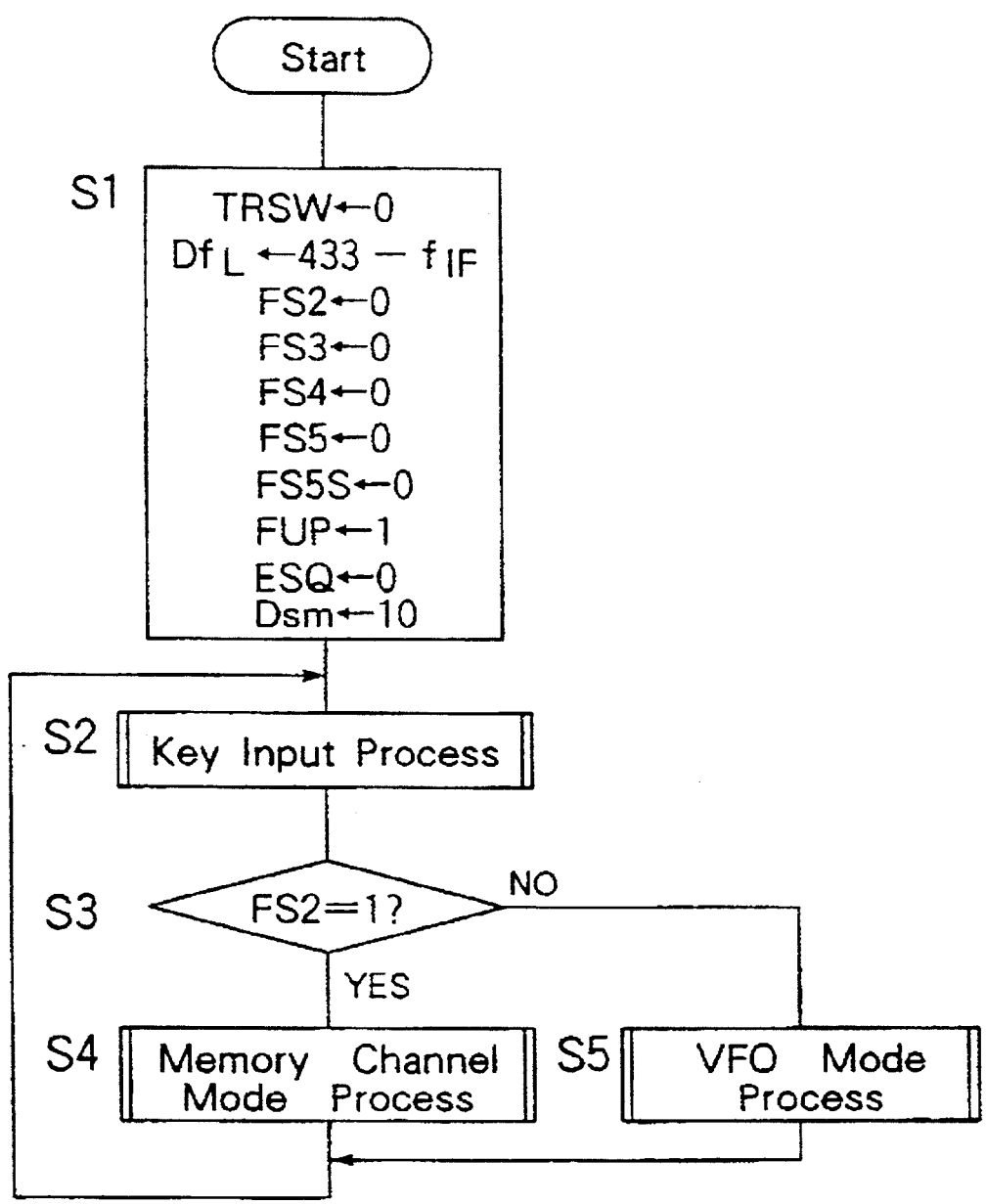
FIG. 9 is a flowchart of a main routine which is executed by a CPU of the radio transceiver shown in FIG. 1.

FIG. 9 is a flowchart of a main routine which is executed by the CPU of the radio transceiver shown in FIG. 1.

Referring to FIG. 9, first of all, initialization is executed at step S1. In more detail, an L-level TRSW signal is output to put the transceiver into the reception state, and a frequency of (433 MHz–$f_{IF}$) is set up as a local oscillation frequency data $Df_L$. Furthermore, the respective flags FS2, FS3, FS4, FS5 and FS5S are reset to zero, and also the flag FUP is set to 1. Meanwhile, an L-level ESQ signal is output so as to set up and store data "10" in the pixel data Dsm. After a key input process (See FIGS. 10 and 11) is executed at step S2, it is determined whether the flag FS2 is 1 or not (namely, 0) at step S3. When FS2=1, a memory channel mode process is executed at step S4, and then, the program flow returns to step S2. When FS2=0, a VFO mode process (See FIG. 12) is executed at step S5, and then, the program flow returns to step S2.

Figure 10:
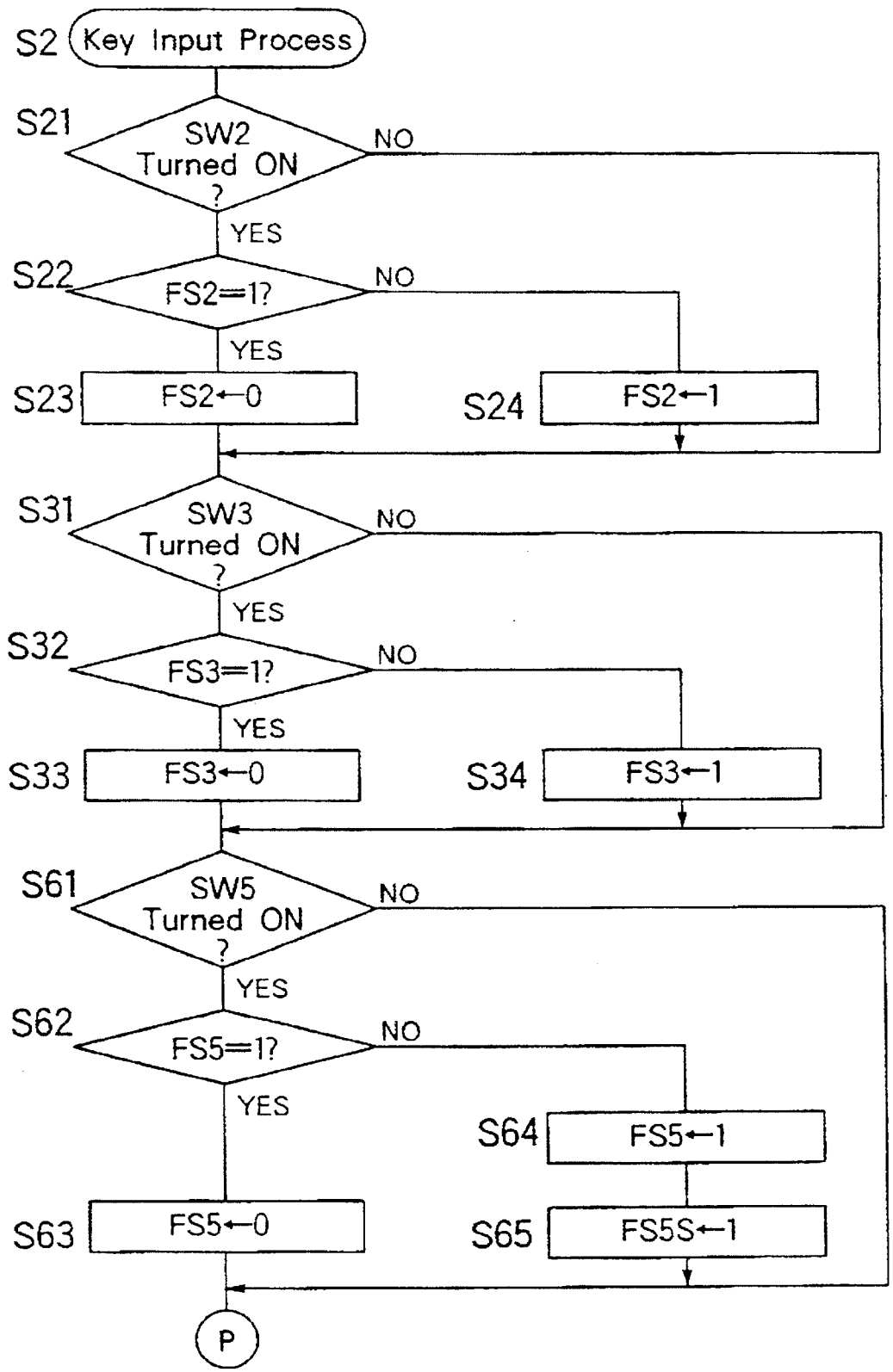
FIG. 10 is a flowchart of a first part of a key input process of a subroutine shown in FIG. 9.
Figure 11:
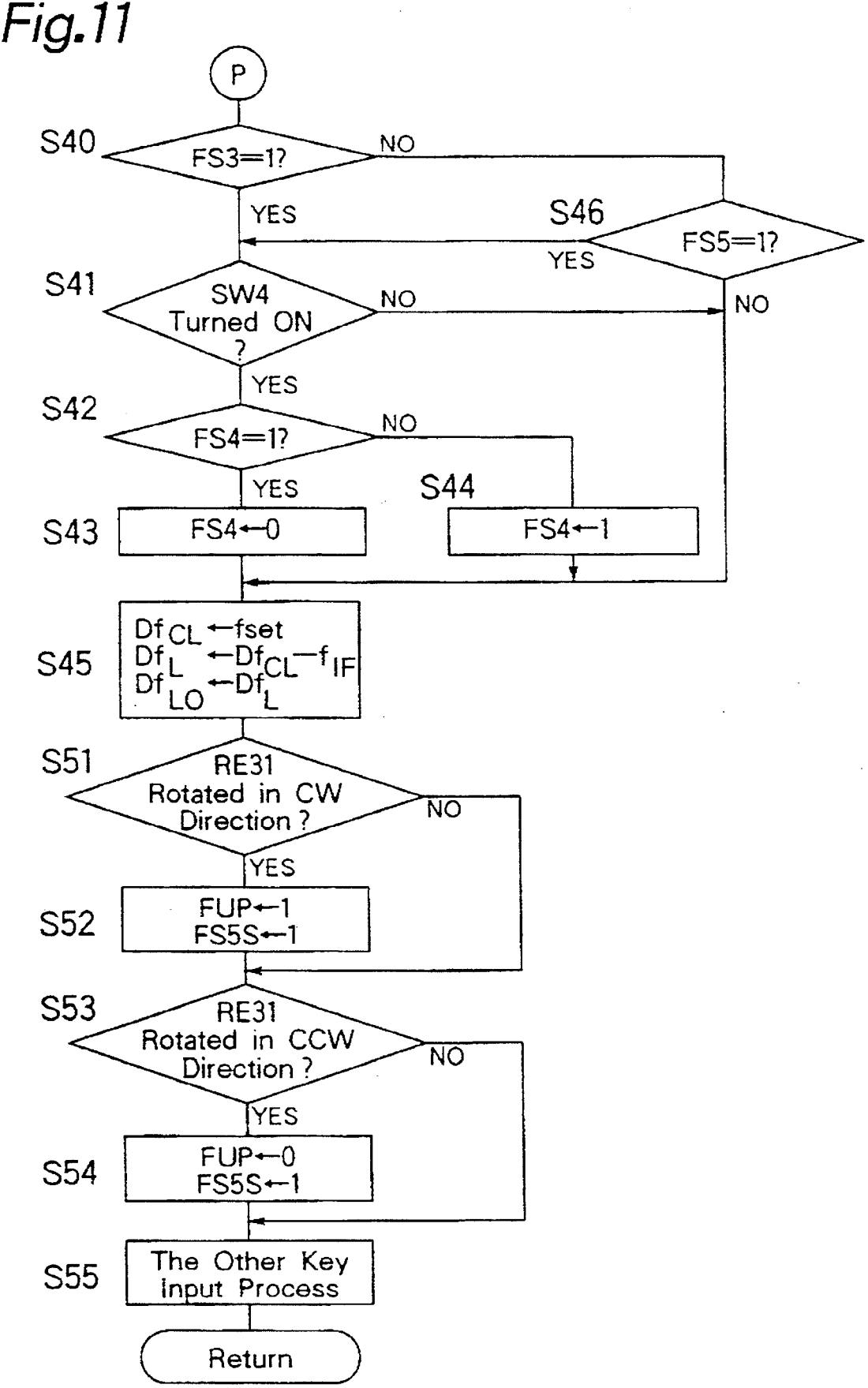
FIG. 11 is a flowchart of a second part of the key input process shown in FIG. 9.

FIGS. 10 and 11 are flowcharts of the key input process (step S2) of a subroutine shown in FIG. 9. The key input process includes the followings:

(a) the process for setting the flag FS2 from step S21 to step S24;

(b) the process for setting the flag FS3 from step S31 to step S34;

(c) the process for setting the flag FS5 from step S61 to step S65;

(d) the process for setting the flag FS4 from step S40 to step S46 (excluding step S45);

(e) the process for setting the frequency data $Df_{CL}$, $Df_L$, and $Df_{LO}$ at step S45;

(f) the process for setting data determined by rotation of the rotary encoders 31 from step S51 through step S54; and (g) the Other key input processes at step S55.

Referring to FIG. 10, it is determined whether the switch SW2 is turned on or not at step S21. When the switch SW2 is not turned on, the program flow proceeds to step S31. When the switch SW2 is turned on, it is determined whether the flag FS2 is 1 or not at step S22. In this case, the program flow proceeds to step S31 after the flag FS2 is reset to zero at step S23 when FS2=1. When FS2=0, the program flow proceeds to step S31 after the flag FS2 is set to 1 at step S24.

Thereafter it is determined whether the switch SW3 is turned on or not at step S31. When the switch SW3 is not turned on, the program flow proceeds to step S61, otherwise it is determined whether the flag FS3 is 1 or not at step S32 when the switch SW3 is turned on. Thereafter, the program flow proceeds to step S61 after the flag FS3 is reset to zero at step S33 when the flag FS3 =1. When the flag FS3=0, the program flow proceeds to step S61 after the flag FS3 is set to 1 at step S34.

Then it is determined whether the switch SW5 is turned on or not at step S61. When the switch SW5 is not turned on, the program flow proceeds to step S40 as shown in FIG. 11, otherwise it is determined whether the flag FS5 is 1 or not at step S62 when the switch SW5 is turned on. Then, the program flow proceeds to step S40 as shown in FIG. 11 after the flag FS5 is reset to zero at step S63 when the flag FS5=1.

When the flag FS5=0 at step S62, the program flow proceeds to step S40 shown in FIG. 11 after the flags FS5 and FS5S are both set to 1 at steps S64 and S65.

Then it is determined whether the flag FS3 is 1 or not at step S40, and it is determined whether the flag FS5 is 1 or not at step S46. In other words, the above-mentioned determinations are made to make effective the processes at steps S41 through S44 only in the search mode or the scan search mode. Therefore, the program flow proceeds to step S41 when FS3=1 or FS5=1. The program flow proceeds to step S45 when FS3=0 and FS5=0. It is further determined whether the switch SW4 is turned on or not at step S41. When the switch SW4 is not turned on, the program flow proceeds to step S45, otherwise it is determined whether the flag FS4 is 1 or not at step S42 when the switch is not turned on. Then, the program flow proceeds to step S45 after the flag FS4 is reset to zero at step S43 when the flag FS4=1. When the flag FS4=0, the program flow proceeds to step S45 after the flag FS4 is set to 1 at step S44.

Then at step S45, the set-up frequency data fset set up by means of the rotary encoder 31 or the ten key 32 is set up as transmission and reception frequency data $Df_{CL}$, the frequency data ($Df_{CL}$–$f_{IF}$) is set up as local oscillation frequency data $Df_L$, and then, the local oscillation frequency data $Df_L$ is set up as center local oscillation frequency data $Df_{LO}$.

Then at step S51, it is determined whether or not the rotary encoder 31 is rotated clockwise. When the rotary encoder 31 is rotated clockwise, the flags FUP and FS5S are each set to 1 at step S52, and the program flow proceeds to step S53. When the determination is NO at step S51, the program flow proceeds directly to step S53. Then it is determined at step S53 whether or not the rotary encoder 31 is rotated counterclockwise. When the rotary encoder 31 is rotated counterclockwise, the flag FUP is reset to zero and the flag FS5S is set to 1 at step S54, and the program flow proceeds to step S55. When the determination is NO at step S53, the program flow proceeds directly to step S55. Further at step S55, there are executed other key input processes such as the setting of the waiting time interval Tw seconds by means of the ten key 32, the setting by means of the step frequency selection key 33, and the setting by means of the frequency change unit selector switch 34.

Figure 12:
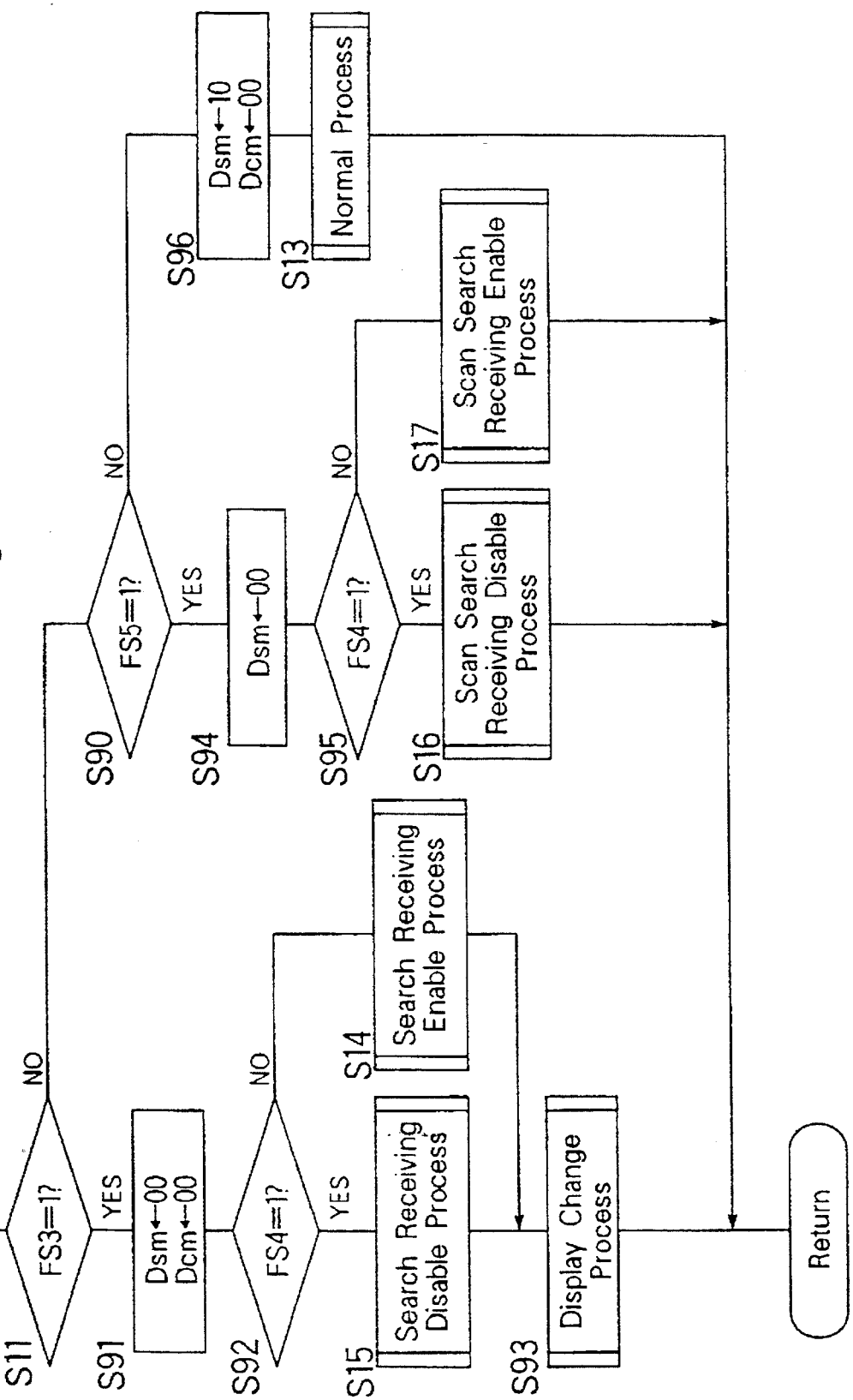
FIG. 12 is a flowchart of a VFO mode process of a subroutine shown in FIG. 9.

FIG. 12 is a flowchart of the VFO mode process (step S5) of a subroutine shown in FIG. 9.

Referring to FIG. 12, it is determined whether the flag FS3 is 1 or not at step S11, and the flag FS5 is 1 or not at step S90. When FS3 =0 and FS5=0 representing neither the search mode nor the scan search mode, the program flow proceeds to step S96. When FS3=1 representing the search mode, the program flow proceeds to step S91. When FS5=1 representing the scan search mode, the program flow proceeds to step S94. At step S96, the data "10" is stored in the pixel data Dsm so as to effect display on the LCD pixels in the "S/FR" LCD section 64 of the LCD unit 60, and then the data "00" is stored in the pixel data Dcm so as to effect display on the LCD pixels in the center-indicating LCD section 63a of the LCD unit 60. Subsequently, the normal process (See FIG. 13) is executed at step S13, and then, the program flow returns to the main routine.

At step S91, the data "00" is stored in the pixel data Dsm so as not to effect display on the LCD pixels on the LCD sections 64 and 65, and then the data "00" is stored in the pixel data Dcm so as to effect display on the LCD pixels in the center-indicating LCD section 63a of the LCD unit 60. Thereafter, the program flow proceeds to step S92. Then it is determined whether the flag FS4 is 1 or not at step S92.

When FS4=0, a search receiving enable process (See FIGS. 14 through 16) is executed at step S14, and then, the program flow proceeds to step S93. When FS4 =1, a search receiving disable process is executed at step S15, and then, the program flow proceeds to step S93. At step S93, the display change process (See FIG. 17) is executed, and then, the program flow returns to the main routine.

At step S94, the data "00" is stored in the pixel data Dsm so as not to effect display on the LCD pixels on the LCD sections 64 and 65, and then, the program flow proceeds to step S95. Then it is determined whether the flag FS4 is 1 or not at step S95. When FS4=0, a scan search receiving enable process (See FIGS. 14 through 16) is executed at step S17, and then, the program flow returns to the main routine. When FS4=1, a search receiving disable process is executed at step S16, and then, the program flow returns to the main routine.

Figure 13:
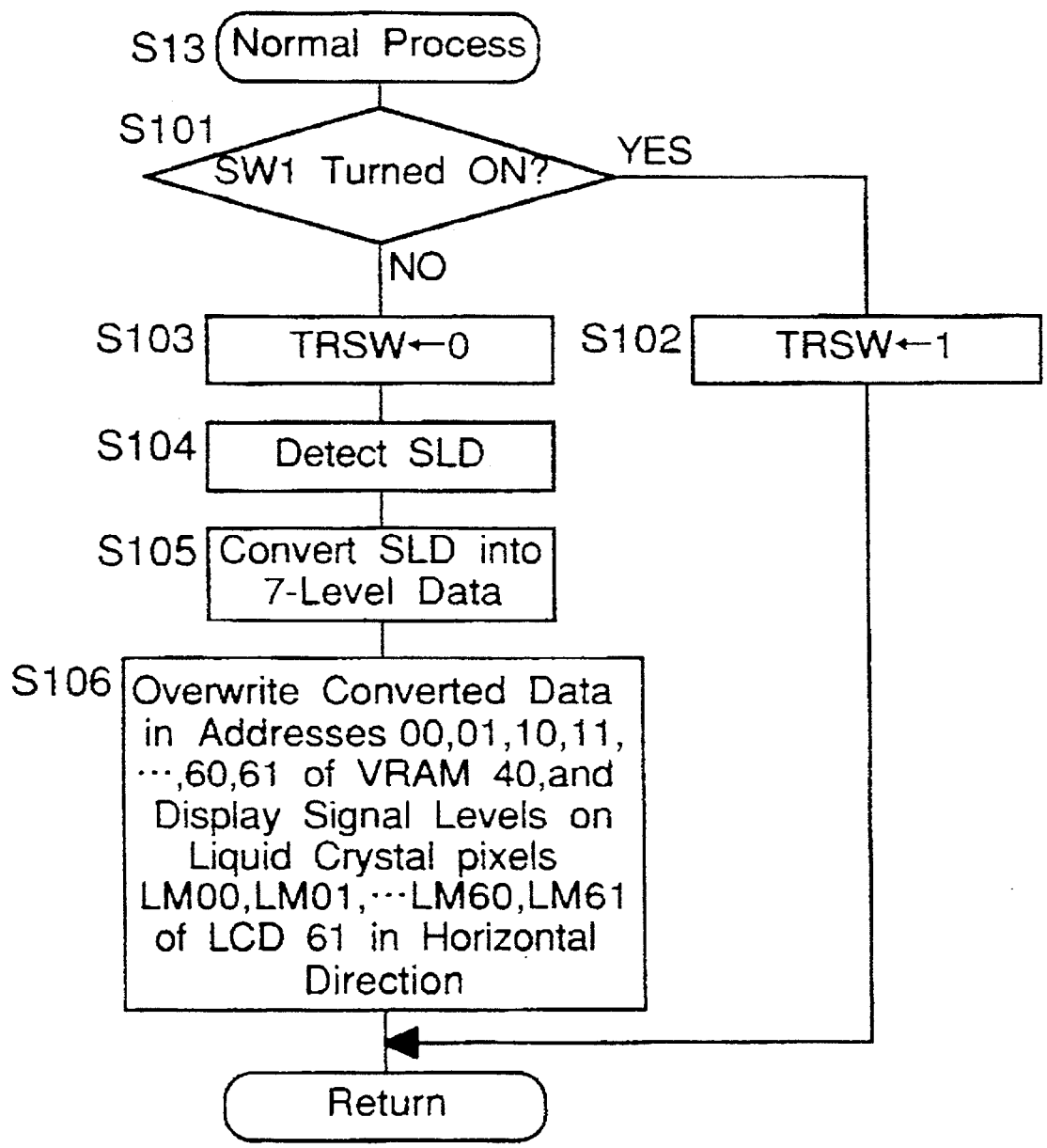
FIG. 13 is a flowchart of a normal mode process of a subroutine shown in FIG. 12.

FIG. 13 is a flowchart of the normal process (step S13) of a subroutine shown in FIG. 12.

Referring to FIG. 13, it is, first of all, determined whether a PTT switch SW1 is turned on or not at step S101. When the switch SW1 is turned on, the program flow proceeds to step S102 to output an H-level TRSW signal so as to switch the transmission and reception selector switch 10 to the contact point b, thereby putting the transceiver in the transmission state, and then the program flow returns to the original routine. When the PTT switch SW1 is not turned on (NO at step S101), an L-level TRSW signal is output at step S103 to switch the transmission and reception selector switch 10 so as to the contact point a, thereby putting the transceiver in the reception state. Then the signal level data SLD output from the A/D converter 20 is detected and taken in the CPU at step S104, and the data SLD is converted into seven-level data at step S105. Then at step S106, the converted data is overwritten into the addresses 00, 01, 10, 11, . . . , 60, 61 of the VRAM 40. Then the signal levels are displayed in the horizontal direction by effecting display simultaneously in two rows with the left end set at 0/7 level by means of the fourteen LCD pixels LM00, LM01, LM10, LM11, LM20, LM21, LM30, LM31, LM40, LM41, LM50, LM51, LM60 and LM61 located in the lowest two rows of the matrix LCD section 61 of the LCD unit 60, and then, the program flow returns to the original routine.

For instance, when the signal level is 4/7, the LCD pixels LM00, LM01, LM10, LM11, LM20, LM21, LM30 and LM31 are made effective for display. When the signal level is 7/7, all the LCD pixels LM00, LM01, LM10, LM11, LM20, LM21, LM30, LM31, LM40, LM41, LM50, LM51, LM60 and LM61 are made effective for display. When the signal level is 1/7, the LCD pixels LM00 and LM01 are made effective for display.

It is noted that the transmission signal level is displayed in the horizontal direction by effecting display simultaneously in two rows with the left end set at 0 level by means of the fourteen LCD pixels LM00, LM01, LM10, LM11, LM20, LM21, LM30, LM31, LM40, LM41, LM50, LM51, LM60 and LM61 located in the lowest two rows of the matrix LCD section 61 of the LCD unit 60 in the transmission state of the normal process or another process in a manner similar to that in the reception state by detecting the output level of the power amplifier 25, though no detailed description therefor is provided herein.

Figure 14:
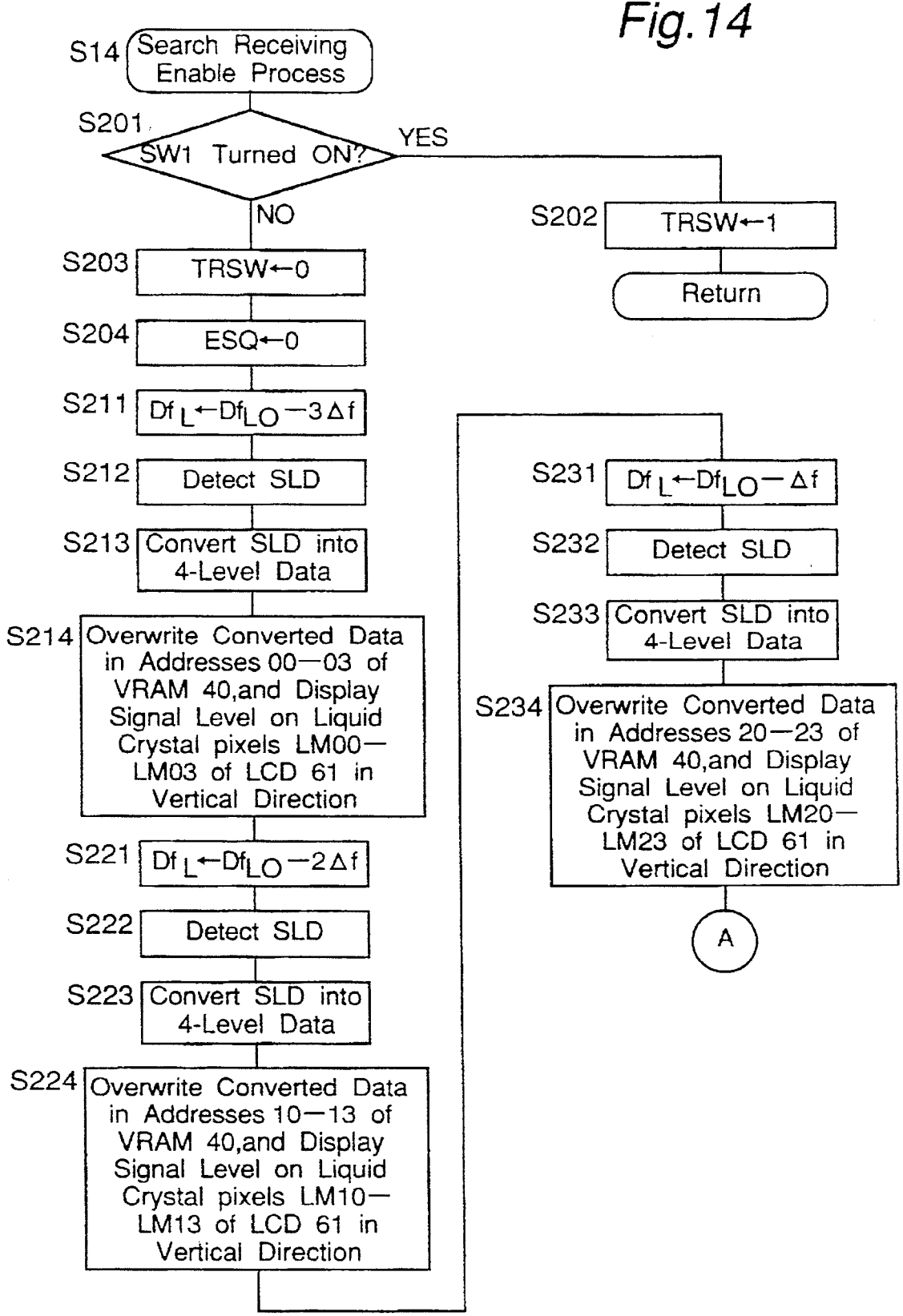
FIG. 14 is a flowchart of a first part of a search receiving enable process of a subroutine shown in FIG. 12.
Figure 15:
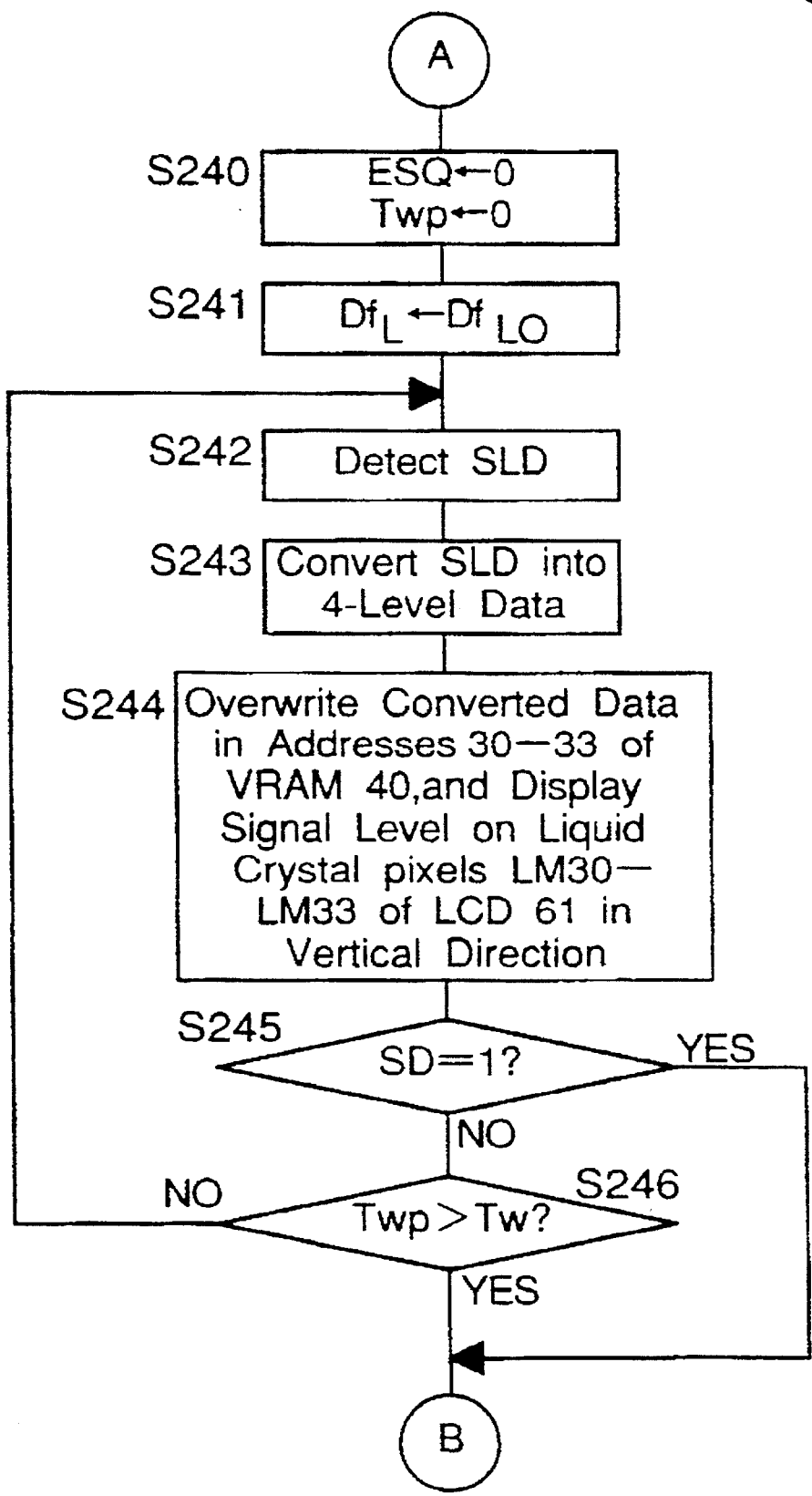
FIG. 15 is a flowchart of a second part of the search receiving enable process shown in FIG. 12.
Figure 16:
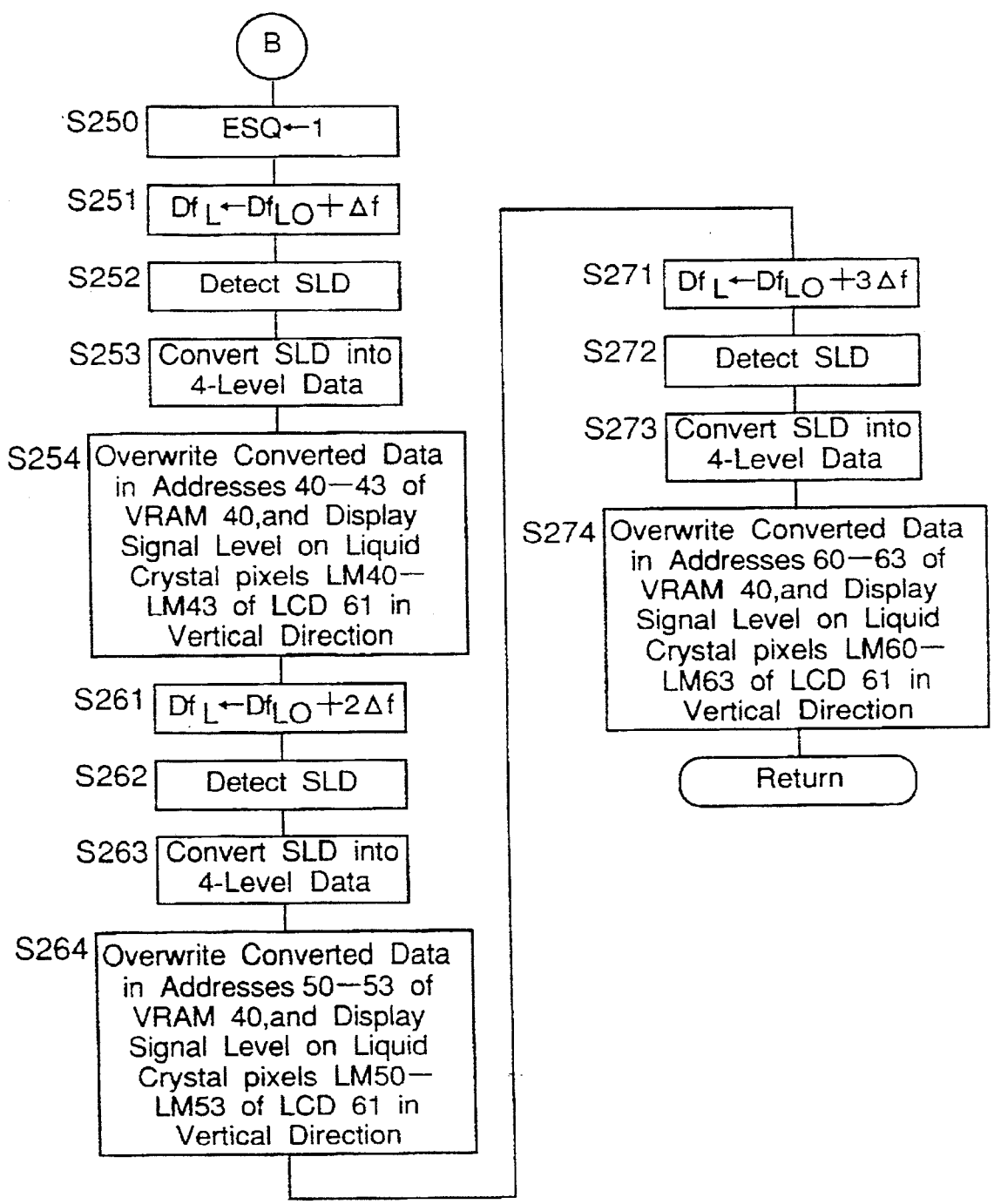
FIG. 16 is a flowchart of a third part of the search receiving enable process shown in FIG. 12.

FIGS. 14 through 16 are flowcharts of the search receiving enable process (step S14) of a subroutine shown in FIG. 12.

Referring to FIG. 14, it is, first of all, determined whether the PTT switch SW1 is turned on or not at step S201. When the switch SW1 is turned on, the program flow proceeds to step S202, and then the H-level TRSW signal is output so as to switch the transmission and reception selector switch 10 to the contact point b, thereby putting the transceiver in the transmission state. Then, the program flow returns to the original routine. When the PTT switch SW1 is not turned on (NO at step S201), the L-level TRSW signal is output at step S203 so as to switch the transmission and reception selector switch 10 to the contact point a, thereby putting the transceiver into the reception state. Then at step S204, the H-level ESQ signal is output so as to turn off the squelch switch 11, thereby stopping output of the low-frequency signal to the speaker 13.

Figure 5:
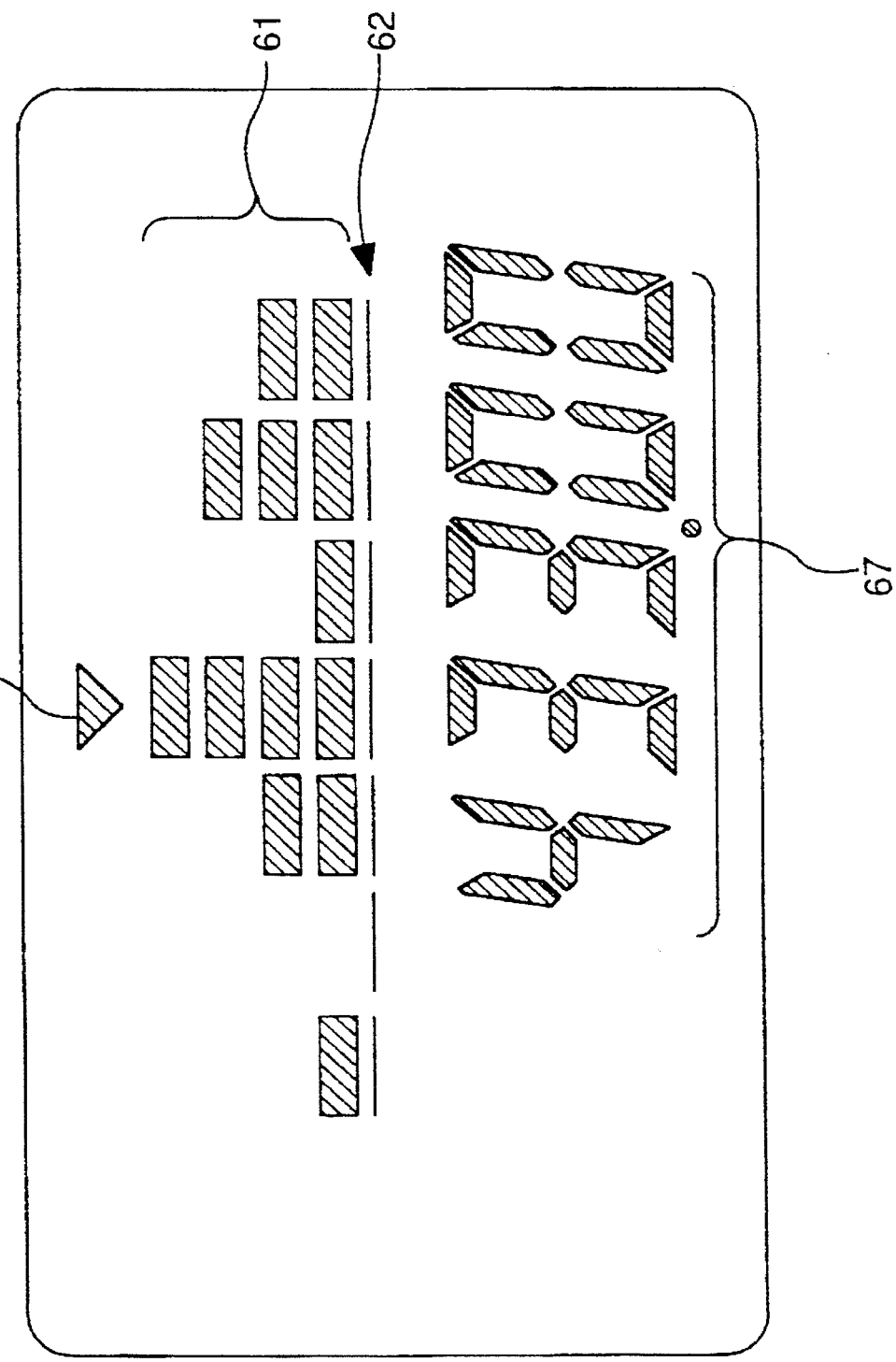
FIG. 5 is a front view of the LCD when signal levels of signals having a plurality of frequencies are displayed in a VFO mode and a search mode in the radio transceiver shown in FIG. 1.
Figure 6:
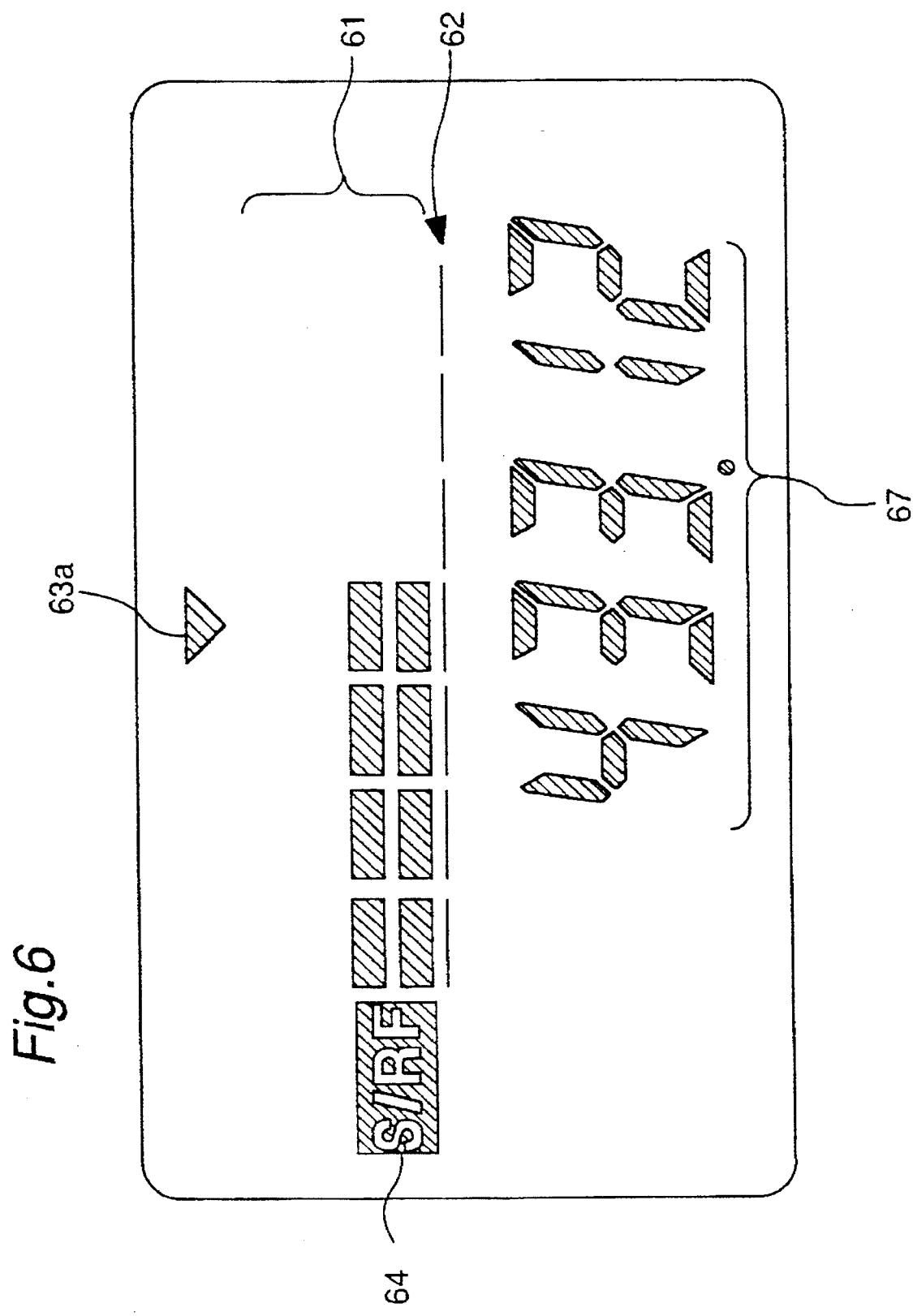
FIG. 6 is a front view of the LCD when a signal level is displayed in the VFO mode and the normal mode in the radio transceiver shown in FIG. 1.

Then at step S211, the frequency data ($Df_{LO}-3\Delta f$) is set up as the local oscillation frequency data $Df_L$, and the reception signal level data SLD output from the A/D converter 20 is detected and taken in the CPU at step S212. Thereafter, the data SLD is converted into four-level data at step S213. Then at step S214, the converted data is overwritten into the addresses 00 through 03 of the VRAM 40, and the signal level is displayed in the vertical direction with the bottom end set at 0/4 level in a manner as shown in FIG. 5 by means of the four LCD pixels LM00 through LM03 in one column of the matrix LCD section 61 of the LCD unit 60. In the present case, when the signal level is, for example, 4/4, all the four LCD pixels LM00 through LM03 are made effective for display. When the signal level is 2/4, the two LCD pixels LM00 through LM01 are made effective for display.

Then at step S221, the frequency data ($Df_{LO}-2\Delta f$) is set up as the local oscillation frequency data $Df_L$, and the reception signal level data SLD output from the A/D converter 20 is detected and=taken in the CPU at step S222. Thereafter, the data SLD is converted into four-level data at step S223. Then at step S224, the converted data is overwritten into the addresses 10 through 13 of the VRAM 40, and the signal level is displayed in the vertical direction with the bottom end set at the 0/4 level by means of the four LCD pixels LM10 through LM13 in one column of the matrix LCD section 61 of the LCD unit 60.

Then at step S231, the frequency data ($Df_{LO}-\Delta f$) is set up as the local oscillation frequency data $Df_L$, and the reception signal level data SLD output from the A/D converter 20 is detected and taken in the CPU at step S232. Thereafter, the data SLD is converted into four-level data at step S233. Then at step S234, the converted data is overwritten into the addresses 20 through 23 of the VRAM 40, and the signal level is displayed in the vertical direction with the bottom end set at the 0/4 level by means of the four LCD pixels LM20 through LM23 in one column of the matrix LCD section 61 of the LCD unit 60. Thereafter, the program flow proceeds to step S240 of FIG. 15.

Referring to FIG. 15, the L-level ESQ signal is output at step S240 so as to turn off the squelch switch 11, thereby putting the transceiver in the state of permitting reception of a low-frequency signal demodulated from the modulated wave of the reception signal by means of the speaker 13, and then, the time counting is started by resetting the timer count Twp of a timer (not shown) for the waiting process in the MPU 30 to zero second, wherein the timer is provided in the MPU 30. Then at step S241, the center local oscillation frequency data $Df_{LO}$ is set up as the local oscillation frequency data $Df_L$, and then, the program flow proceeds to step S242. At step S242, the reception signal level data SLD output from the A/D converter 20 is detected and taken in the CPU, and then, the data SLD is converted into four-level data at step S243. Thereafter, the converted data is overwritten into the addresses 30 through 33 of the VRAM 40. With the above-mentioned operation, the signal level is displayed in the vertical direction with the bottom end set at the 0/4 level by means of four LCD pixels LM30 through LM33 in one column at the center portion of the matrix LCD section 61 of the LCD unit 60, and it is determined whether the SD signal is at H level or not. When the SD signal is at H level, i.e., when there is no reception signal at the reception frequency, the program flow proceeds to step S250 as shown in FIG. 16 without executing a waiting time determination process at step S246. When the SD signal is at L level at step S245, i.e., when there is a reception signal at the reception frequency, the waiting time determination for the waiting process is executed at step S246. In more detail, it is determined whether or not the timer count Twp of the timer has elapsed over the preset waiting time interval Tw. When the timer count has not yet elapsed over the time interval Tw, the program flow returns to step S242, and then there is executed a process for detecting and displaying the level at the reception frequency while executing the waiting process. When the timer count has elapsed over the time interval Tw, the program flow proceeds to step S250 as shown in FIG. 16. The signal level displayed at step S244 indicates the signal level of the signal being currently received. In the loop process starting from step S246 and returning through step S242 to step S246, the signal level of the signal being currently received is detected and displayed in real time in a predetermined cycle. Since the squelch switch 11 is turned on, the reception signal at the set-up transmission and reception frequency $f_R=fset=Df_{CL}$ is received so as to allow the low-frequency signal demodulated from the modulated wave so that the operator can hear the low-frequency signal or the voice signal output from the speaker 13. It is noted that the above-mentioned arrangement is not limitative in the present invention, and there may be selected an arrangement of waiting, for example, for the waiting time interval Tw seconds without executing the waiting time determination process. In such a case, the signal level of the signal being currently received does not change in real time.

Referring to FIG. 16, the H-level ESQ signal is output at step S250 so as to turn off the squelch switch 11, thereby stopping outputting the low-frequency signal to the speaker 13. Then frequency data $(Df_{LO}+\Delta f)$ is set up as the local oscillation frequency data $Df_L$ at step S251, and then, the reception signal level data SLD output from the A/D converter 20 is detected and taken in the CPU at step S252, and then, the data SLD is converted into four-level data at step S253. Then the converted data is overwritten into the addresses 40 through 43 of the VRAM 40 at step S254, and the signal level is displayed in the vertical direction with the bottom end set at the 0/4 level by means of the four LCD pixels LM40 through LM43 in one column of the matrix LCD section 61 of the LCD unit 60.

Then the frequency data $(Df_{LO}+2\Delta f)$ is set up as the local oscillation frequency data $Df_L$ at step S261, and then, the reception signal level data SLD output from the A/D converter 20 is detected and taken in the CPU at step S262, converting the data SLD into four-level data at step S263. Then the converted data is overwritten into the addresses 50 through 53 of the VRAM 40 at step S264, and the signal level is displayed in the vertical direction with the bottom end set at the 0/4 level by means of the four LCD pixels LM50 through LM53 in one column of the matrix LCD section 61 of the LCD unit 60.

Then the frequency data $(Df_{LO}+3\Delta f)$ is set up as the local oscillation frequency data $Df_L$ at step S271, and then, the reception signal level data SLD output from the A/D converter 20 is detected and taken in the CPU at step S272, converting the data SLD into four-level data at step S273. Then the converted data is overwritten into the addresses 60 through 63 of the VRAM 40 at step S274, and the signal level is displayed in the vertical direction with the bottom end set at the 0/4 level by means of the four LCD pixels LM60 through LM63 in one column of the matrix LCD section 61 of the LCD unit 60.

It is noted that the process of the search receiving disable process (step S15) as shown in FIG. 12 is the same as that in the search receiving enable process (step S14) shown in FIGS. 14 through 16, except that the H-level ESQ signal is output instead of the L-level ESQ signal at step S240 shown in FIG. 15. With the above-mentioned arrangement, the signal levels of signals having a plurality of frequencies are displayed in the search mode and receiving disable mode in a manner similar to that in the search receiving enable process, when the low-frequency signal of the reception signal cannot be heard from the speaker 13.

Figure 17:
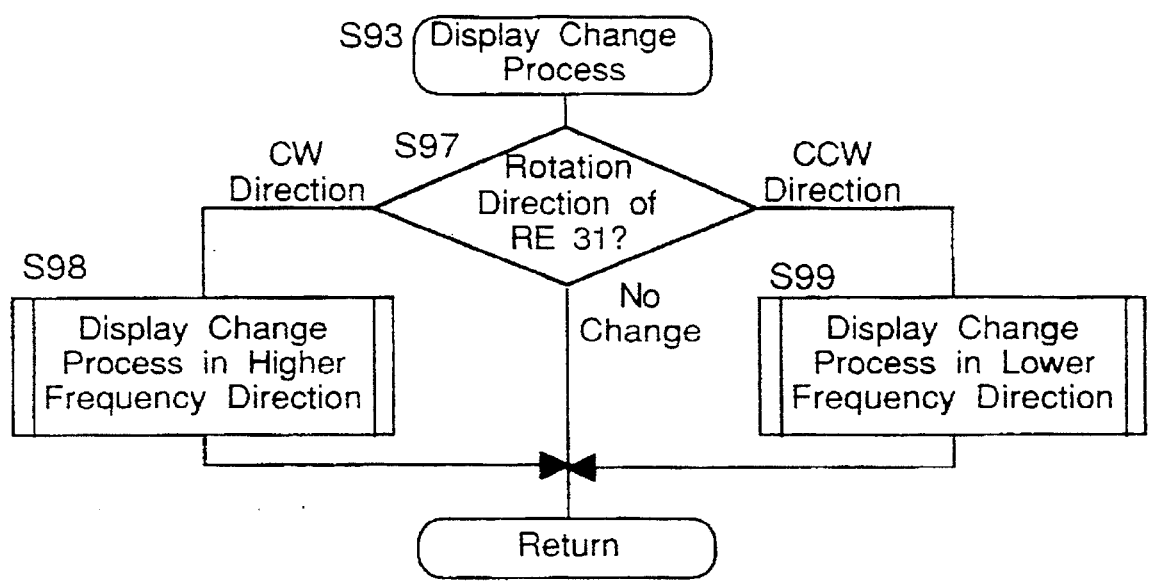
FIG. 17 is a flowchart of a display change process of a subroutine shown in FIG. 12.

FIG. 17 is a flowchart of a display change step (step S93) of a subroutine shown in FIG. 12 for executing the manual scan search.

At step S97, the rotation direction of change of the rotary encoder 31 is determined. When the rotary encoder 31 is rotated clockwise, a display change process in the higher frequency direction (See FIG. 18) is executed at step S98, and then, the program flow returns to the original routine. When the rotary encoder 31 is rotated counterclockwise at step S97, a display change process in the lower frequency direction (See FIG. 19) is executed at step S99, and then, the program flow returns to the original routine. When no rotation of the rotary encoder 31 is detected at step S97, the program flow returns to the original routine, directly.

Figure 18:
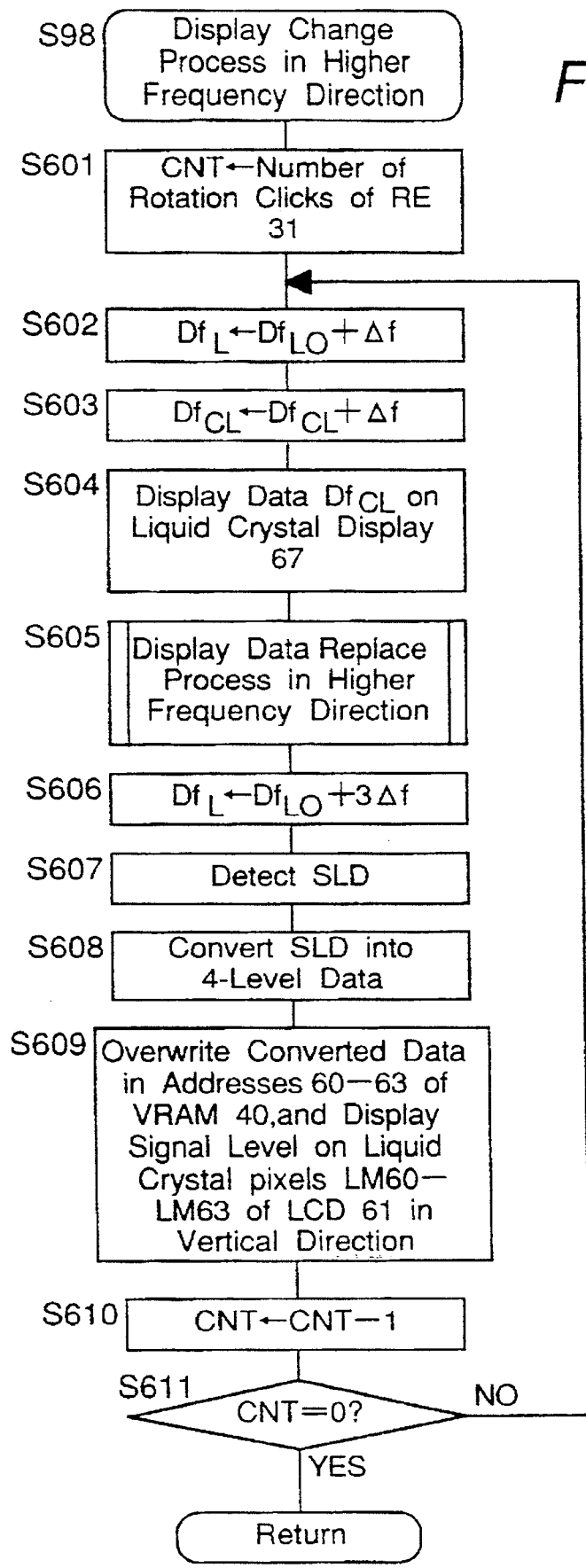
FIG. 18 is a flowchart of a the display change process in the higher frequency direction of a subroutine shown in FIG. 17.

FIG. 18 is a flowchart of the display change process in the higher frequency direction (step S98) of a subroutine shown in FIG. 17.

First of all, the number of rotation clicks of the rotary encoder 31 is set up in the data CNT at step S601, and then, data obtained by adding the step frequency $\Delta f$ to the center local oscillation frequency data $Df_{LO}$ is renewed or updated as the center local oscillation frequency data $Df_{LO}$ at step S602, and the data obtained by adding the step frequency $\Delta f$ to the transmission and reception frequency data $Df_{CL}$ at step S603 is renewed or updated as the transmission and reception frequency data $Df_{CL}$. The transmission and reception frequency data $Df_{CL}$ renewed at step S604 is displayed on the seven-segment LCD section 67 of the LCD unit 60, and then, the display data replace process in the higher frequency direction (See FIG. 20) is executed at step S605. In the display data replace process in the higher frequency direction, the pixel data stored in the VRAM 40 is replaced so that the display positions of the signal levels of signals having a plurality of frequencies in the matrix LCD section 61 of the LCD unit 60 are shifted leftward by one step.

Then the data $(Df_{LO}+3\Delta f)$ is stored as renewed or updated so as to be set up in the local oscillation frequency data $Df_L$ at step S606. Further at step S607, the reception signal level data SLD output from the A/D converter 20 is detected and taken in the CPU, and then, the data SLD is converted into four-level data at step S608. Thereafter, the converted data is overwritten into the addresses 60 through 63 of the VRAM 40 at step S609, and the signal level is displayed in the vertical direction with the bottom end set at the 0/4 level by means of the four LCD pixels LM60 through LM63 in one column at the right end of the matrix LCD section 61 of the LCD unit 60. With the above-mentioned operation, the signal level at the right end, of which frequency is no more corresponding due to the data replacement at step S605, is detected and displayed. Then the data CNT is decremented by one so as to be renewed at step S610, and then, it is determined whether the data CNT is 0 or not at step S611. When CNT=0, it is determined that the display positions in the matrix LCD section 61 have been shifted by the designated number of steps by rotating the rotary encoder 31, and then, the program flow returns to the original routine. When CNT≠0 at step S611, the program flow returns to step S602 to repeat the aforementioned processes.

Figure 26:
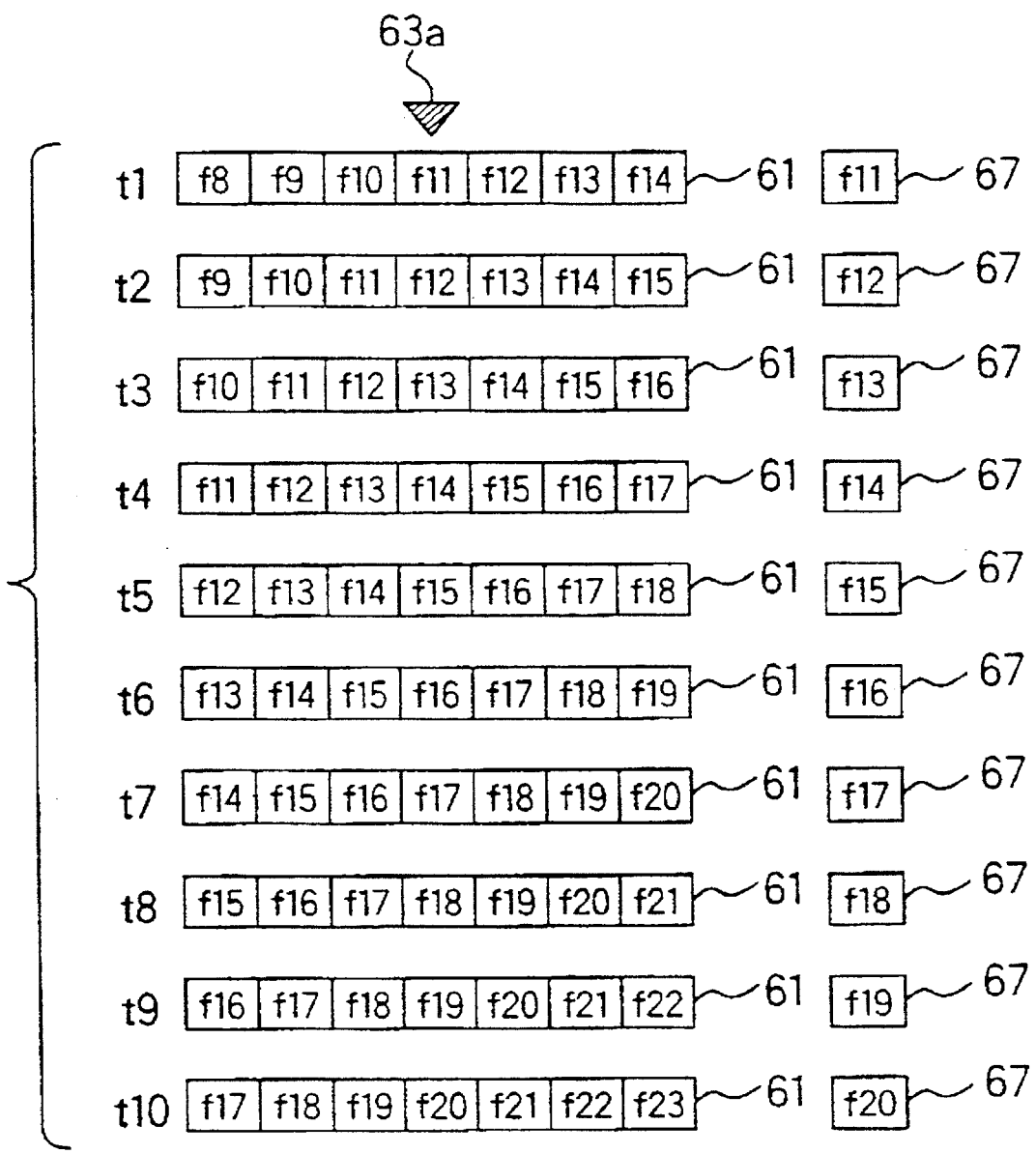
FIG. 26 is a front view showing frequencies of seven signal levels displayed on the matrix LCD section 61 of the LCD section when the transmission and reception frequency is scanned by manual scan search, and the transmission and reception frequency displayed on the seven-segment LCD section 67.

With the above-mentioned processes, the display positions of the reception signals at the plural number of frequencies displayed on the matrix LCD section 61 of the LCD unit 60 can be shifted in the higher frequency direction by the number of steps set up manually by means of the rotary encoder 31. For instance, in the case where the rotary encoder 31 is rotated clockwise by three steps when the transmission and reception frequency is f11 at a timing t1 as shown in FIG. 26, a shift of state is effected from the state at the timing t1 successively through states at timings t2 and t3 to the state at a timing t4. FIG. 26 shows the frequencies of the signal levels which change according to the rotation of the rotary encoder 31 in the matrix LCD section 61 and the transmission and reception frequency data $Df_{CL}$ displayed on the LCD section 67. In this state, f11 is the transmission and reception frequency at the time of starting the scan search, and it is indicated that the greater the number given to "f" is, the higher the frequency is.

Figure 19:
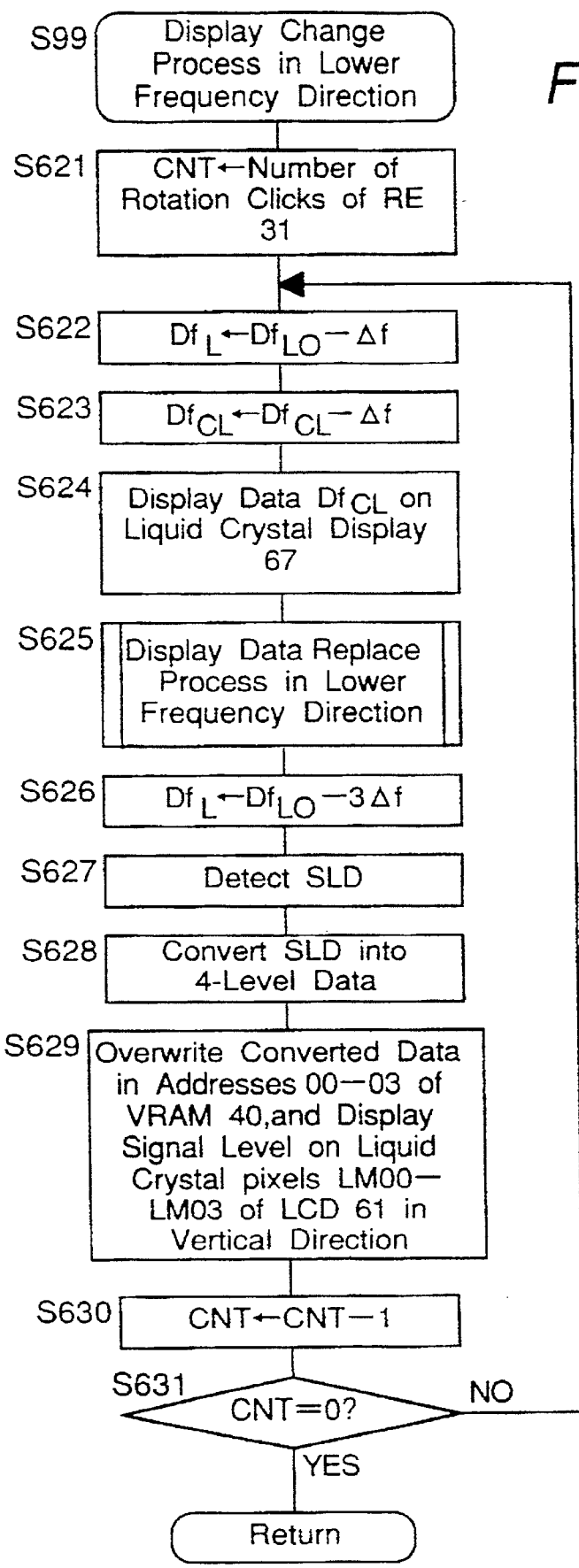
FIG. 19 is a flowchart of a display change process in the lower frequency direction of a subroutine shown in FIG. 17.

FIG. 19 shows a flowchart of the display change process in the lower frequency direction (step S99) of a subroutine shown in FIG. 17.

First of all, the number of rotation clicks of the rotary encoder 31 is set up in the data CNT at step S621, and then, the data obtained by subtracting the step frequency Δf from the center local oscillation frequency data $Df_{LO}$ is renewed or updated as the center local oscillation frequency data $Df_{LO}$ at step S622, and then, the data obtained by subtracting the step frequency Δf from the transmission and reception frequency data $Df_{CL}$ at step S623 is renewed or updated as the transmission and reception frequency data $Df_{CL}$. The transmission and reception frequency data $Df_{CL}$ renewed at step S624 is displayed on the seven-segment LCD section 67 of the LCD unit 60, and then, the display data replace process in the lower frequency direction (See FIG. 21) is executed at step S625. In the display data replace process in the lower frequency direction, the pixel data stored in the VRAM 40 is replaced so that the display positions of the signal levels of signals having a plurality of frequencies in the matrix LCD section 61 of the LCD unit 60 are shifted rightward by one step.

Then the data ($Df_{LO}$–3Δf) is stored as renewed to be set up in the local oscillation frequency data $Df_L$ at step S626. Further at step S627, the reception signal level data SLD output from the A/D converter 20 is detected and taken in the CPU, and then, the data SLD is converted into four-level data at step S628. Thereafter, the converted data is overwritten into the addresses 00 through 03 of the VRAM 40 at step S629, and then, the signal level is displayed in the vertical direction with the bottom end set at the 0/4 level by means of the four LCD pixels LM00 through LM03 in one column at the left end of the matrix LCD section 61 of the LCD unit 60. With the above-mentioned operation, the signal level at the right end, of which frequency is no more corresponding due to the data replacement at step S625, is detected and displayed. Then the data CNT is decremented by one to be renewed at step S630, and then, it is determined whether the data CNT is 0 or not at step S631. When CNT=0, it is determined that the display positions in the matrix LCD section 61 are shifted by the designated number of steps by rotating the rotary encoder 31, and then the program flow returns to the original routine. When CNT≠0 at step S631, the program flow returns to step S622, and then there is repeated the aforementioned processes.

With the above-mentioned processes, the display positions of the reception signals at a plurality of frequencies displayed on the matrix LCD section 61 of the LCD unit 60 can be shifted in the lower frequency direction by the number of steps set up manually by means of the rotary encoder 31. For instance, in the case where the rotary encoder 31 is rotated counterclockwise by three steps when the transmission and reception frequency is f14 at the timing t4 as shown in FIG. 26, a shift of state is effected from the state at the timing t4 successively through the states at times t3 and t2 to the state at the timing t1.

Figure 23:
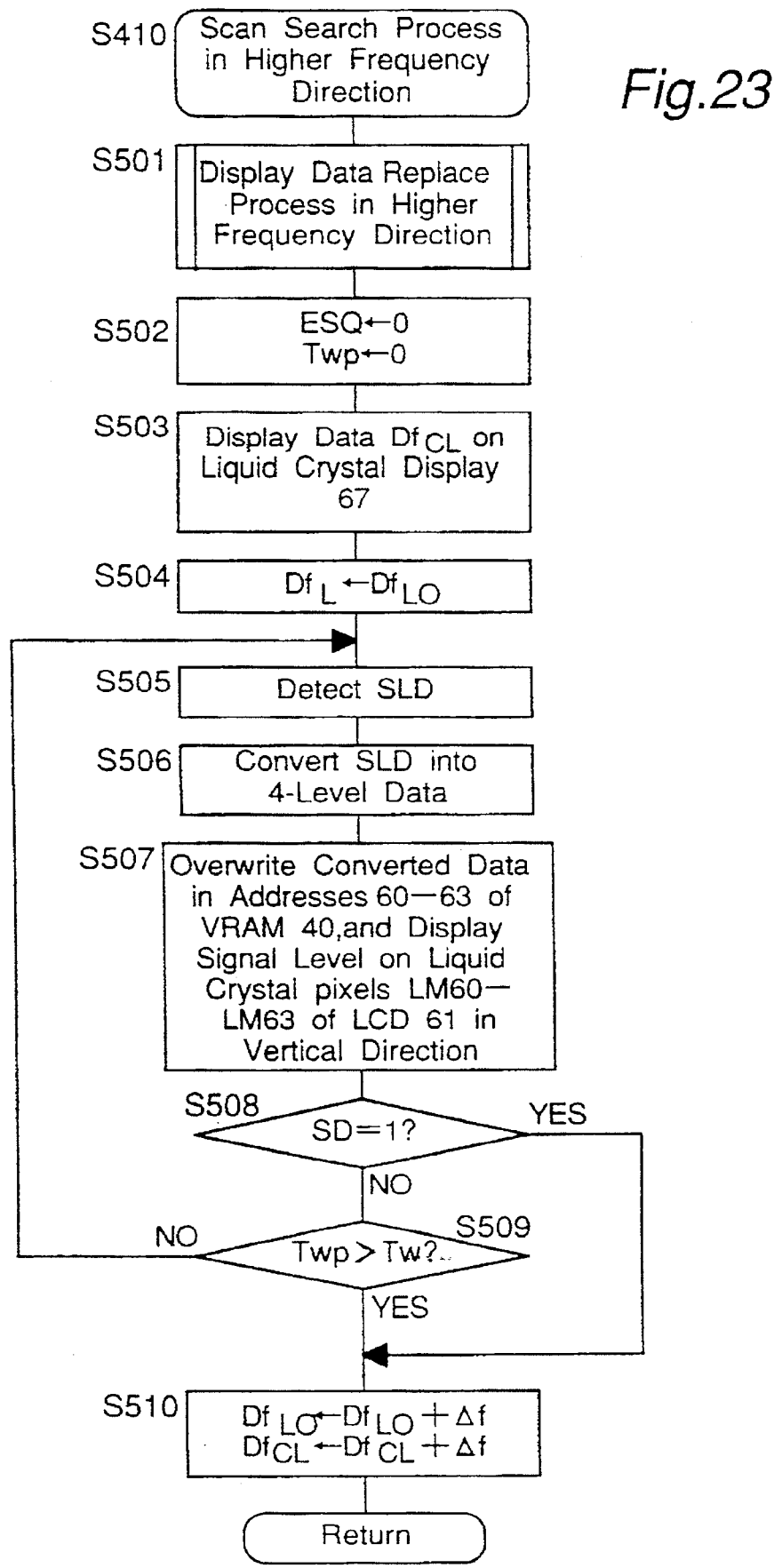
FIG. 23 is a flowchart of a scan search process in the higher frequency direction of a subroutine shown in FIG. 22.
Figure 37:
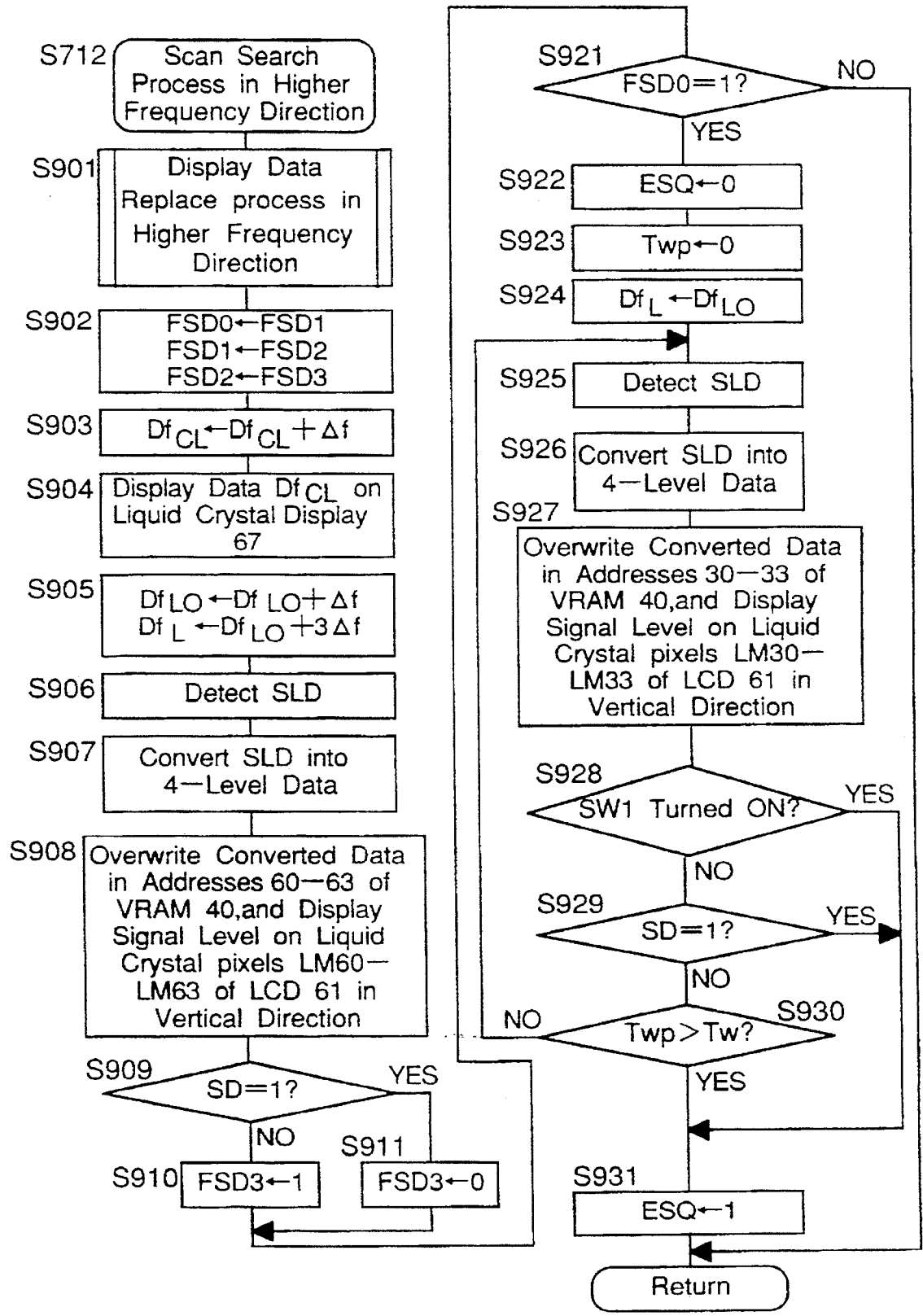
FIG. 37 is a flowchart of a scan search process in the higher frequency direction of a subroutine shown in FIG. 34.

FIG. 20 shows a flowchart of the display change process in the higher frequency direction (steps S605, S501 and S901) of a subroutine shown in FIGS. 18, 23 and 37.

First of all, the pixel data stored in the addresses 10 through 13 of the VRAM 40 are overwritten into the addresses 00 through 03 of the VRAM 40 at step S321, and then, there is displayed the corresponding signal level vertically on the LCD pixels LM00 through LM03 in the matrix LCD section 61 of the LCD unit 60. Thereafter, the pixel data stored in the addresses 20 through 23 of the VRAM 40 is overwritten into the addresses 10 through 13 of the VRAM 40 at step S322, and then, there is displayed the corresponding signal level vertically on the LCD pixels LM10 through LM13 in the matrix LCD section 61 of the LCD unit 60. The same processes as above-mentioned processes are repeated at steps S323 through S326 to overwrite the pixel data stored in the addresses 30 through 33, 40 through 43, 50 through 53, and 60 through 63 of the VRAM 40 respectively into the addresses 20 through 23, 30 through 33, 40 through 43, and 50 through 53 of the VRAM 40, and the corresponding signal levels are displayed vertically on the LCD pixels LM20 through LM23, LM30 through LM33, LM40 through LM43, and LM50 through LM53 in the matrix LCD section 61 of the LCD unit 60. Thereafter, the program flow returns to the original routine. With the above-mentioned processes, the display positions of the signal levels of the reception signals at the plural number of frequencies displayed on the matrix LCD section 61 of the LCD unit 60 are shifted leftward by one step.

Figure 24:
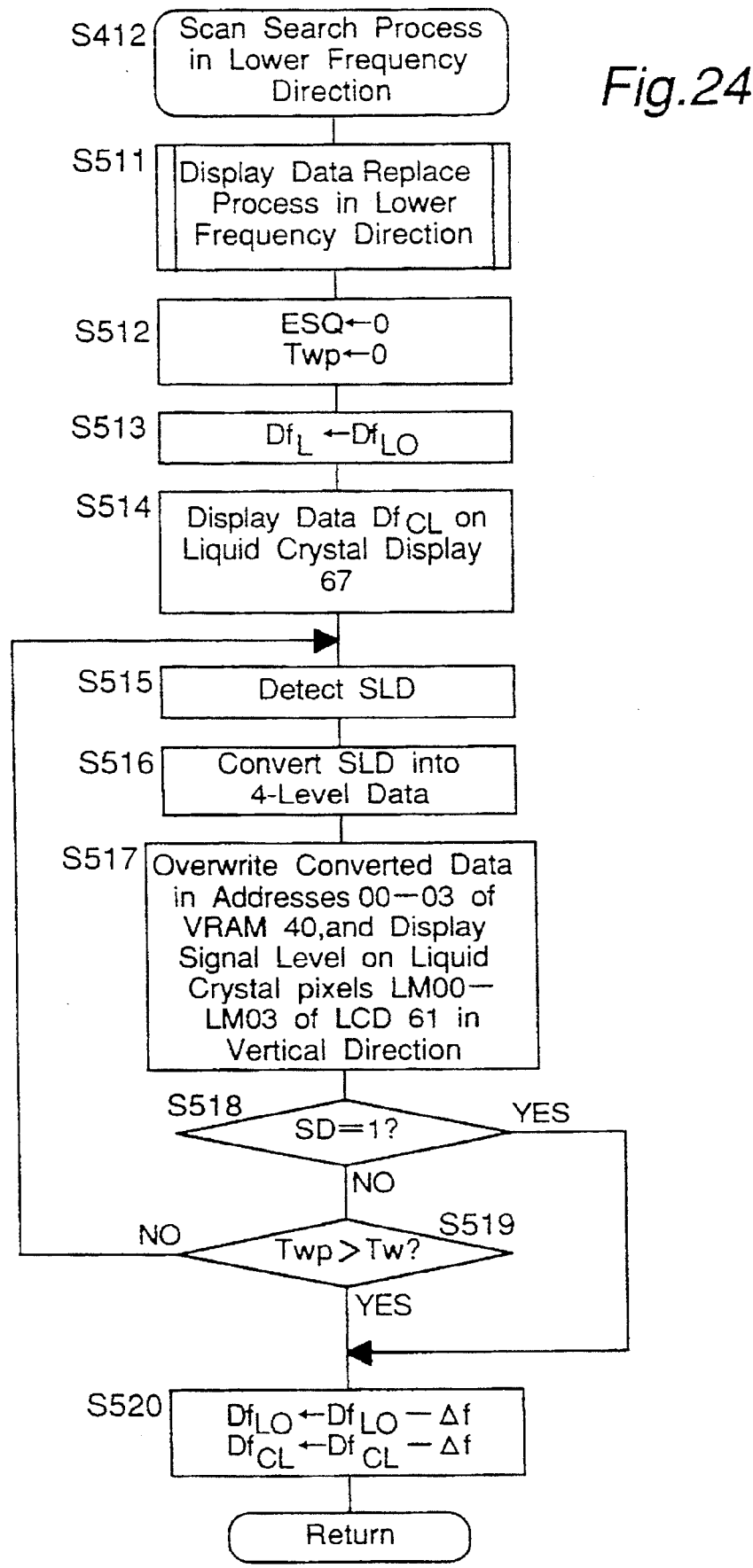
FIG. 24 is a flowchart of a scan search process in the lower frequency direction of a subroutine shown in FIG. 22.
Figure 40:
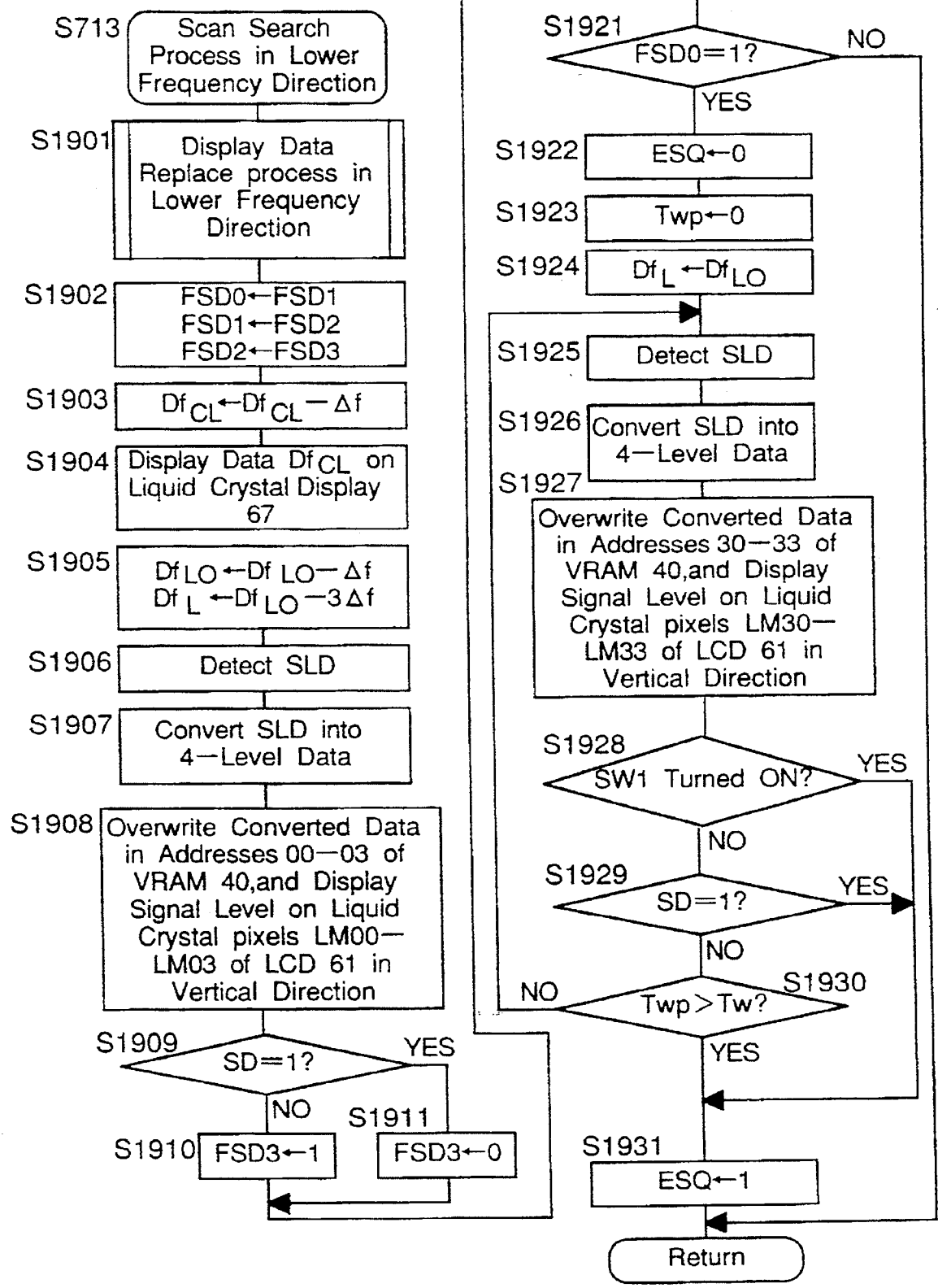
FIG. 40 is a flowchart of a scan search process in the lower frequency direction of a subroutine shown in FIG. 34.

FIG. 21 is a flowchart of the display change process in the lower frequency direction (steps S625, S511 and S1901) of a subroutine shown in FIGS. 19, 24 and 40.

First of all, the pixel data stored in the addresses 50 through 53 of the VRAM 40 are overwritten into the addresses 60 through 63 of the VRAM 40 at step S331 to display the corresponding signal level vertically on the LCD pixels LM60 through LM63 in the matrix LCD section 61 of the LCD unit 60. Thereafter, the pixel data stored in the addresses 40 through 43 of the VRAM 40 is overwritten into the addresses 50 through 53 of the VRAM 40 at step S332, and then, there is displayed the corresponding signal level vertically on the LCD pixels LM50 through LM53 in the matrix LCD section 61 of the LCD unit 60. The same processes as above-mentioned processes are repeated at steps S333 through S336 so as to overwrite the pixel data stored in the addresses 30 through 33, 20 through 23, 10 through 13, and 00 through 03 respectively into the addresses 40 through 43, 30 through 33, 20 through 23, and 10 through 13 of the VRAM 40, and then, the corresponding signal levels are displayed vertically on the LCD pixels LM40 through LM43, LM30 through LM33, LM20 through LM23, and LM10 through LM13 in the matrix LCD section 61 of the LCD unit 60. Thereafter, the program flow returns to the original routine. With the above-mentioned processes, the display positions of the signal levels of the reception signals at a plurality of frequencies displayed on the matrix LCD section 61 of the LCD unit 60 are shifted rightward by one step.

Figure 22:
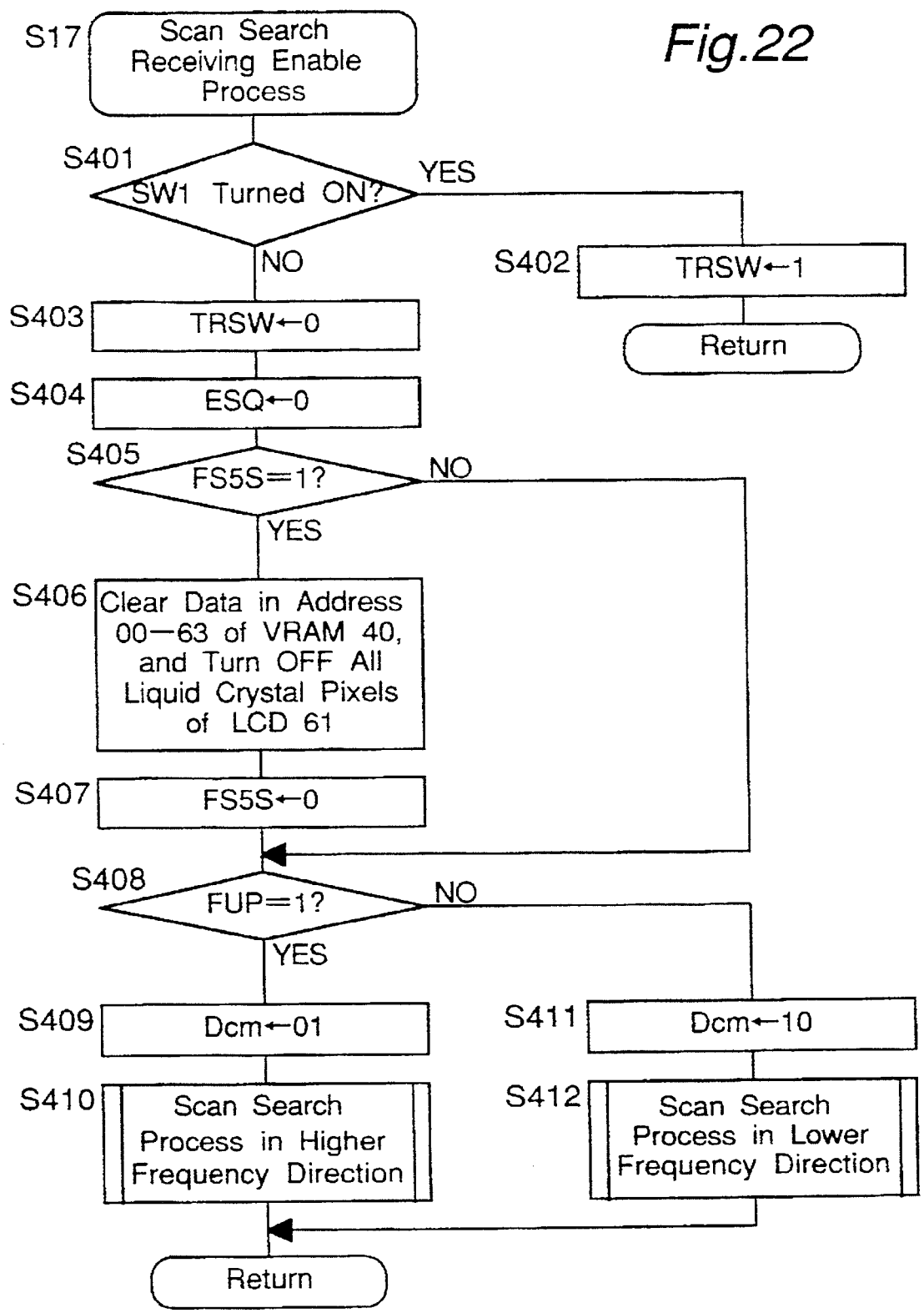
FIG. 22 is a flowchart of a scan search receiving enable process of a subroutine shown in FIG. 12.

FIG. 22 is a flowchart of the scan search receiving enable process (step S17) of a subroutine as shown in FIG. 12.

Referring to FIG. 22, it is, first of all, determined whether the PTT switch SW1 is turned on or not at step S401. When the switch SW1 is turned on, the program flow proceeds to step S402, and then, the H-level TRSW signal is output so as to put the transceiver in the transmission state by switching the transmission and reception selector switch 10 to the contact point b. Thereafter, the program flow returns to the original routine. When the PTT switch SW1 is not turned on (NO at step S401), the L-level TRSW signal is output so as to put the transceiver in the reception state by switching the transmission and reception selector switch 10 to the contact point a. Then the L-level ESQ signal is output so as to turn on the squelch switch 11 at step S404, and then, the low-frequency signal is output from the speaker 13. Then it is determined whether the flag FS5 is FS5=1 or not at step S405. When FS5=1, the data stored in the addresses 00 through 63 of the VRAM 40 are cleared to zero at step S406 so as to turn off all the LCD pixels in the matrix LCD section 61, and the flag FS5S is reset to zero at step S407. Thereafter, the program flow proceeds to step S408. When FS5S=0 at step S405, the program flow proceeds directly to step S408.

Then it is determined whether the flag FUP=1 or not at step S408. When FUP=1, the data "01" is stored into the pixel data Dcm at step S409 so as to effect display on the center-indicating LCD section 63b of the LCD unit 60, and the scan search process in the higher frequency direction (See FIG. 23) is executed at step S410. Thereafter, the program flow returns to the original routine. When FUP=0 at step S408, the data "10" is stored into the pixel data Dcm at step S411 so as to effect display on the center-indicating LCD section 63c of the LCD unit 60, and the scan search process in the lower frequency direction (See FIG. 24) is executed at step S412. Then the program flow returns to the main routine.

It is noted that the process of the search receiving disable process (step S16) shown in FIG. 12 is the same as that of the search receiving enable process (step S17) shown in FIG. 22 except that the H-level ESQ signal is output instead of the L-level ESQ signal at step S404 of FIG. 22. With the above-mentioned arrangement, the signal levels of signals having a plurality of frequencies are displayed in a manner similar to that of the search receiving enable process in the scan search mode and the receiving disable mode, when the low-frequency signal of the reception signal cannot be heard from the speaker 13.

FIG. 23 is a flowchart of the scan search process in the higher frequency direction (step S410) of a subroutine shown in FIG. 22.

First of all, the display data replace process in the higher frequency direction (See FIG. 20) is executed at step S501. Then the L-level ESQ signal is output so as to turn off the squelch switch 11 at step S502, thereby allowing the low-frequency signal demodulated from the modulated wave of the reception signal to be received. Then the timer count Twp of the timer for the waiting process in the MPU 30 is reset to zero second so as to start the time counting. Then the transmission and reception frequency data $Df_{CL}$ is set up in the register 43 at step S503 so as to effect display on the LCD section 67, and the center local oscillation frequency data $Df_{LO}$ is set up in the local oscillation frequency data $Df_L$ at step S504. Thereafter, the program flow proceeds to step S505.

At step S505, the reception signal level data SLD output from the A/D converter 20 is detected and taken in the CPU, and then the data SLD is converted into four-level data at step S506. Thereafter, the converted data is overwritten into the addresses 60 through 63 of the VRAM 40 at step S507. With the above-mentioned processes, the signal level is displayed vertically on the four LCD pixels LM60 through LM63 in one column at the right end of the matrix LCD section 61 of the LCD unit 60 with the bottom end set at the 0/4 level, and then, it is determined whether the SD signal is at H level or not at step S508. When the SD signal is at H level, i.e., when there is no reception signal at the reception frequency, the program flow proceeds to step S510 without executing the waiting time determination process at step S509. When the SD signal is at L level at step S508, i.e., when there is a reception signal at the reception frequency, waiting time determination for the waiting process is executed at step S509. In other words, it is determined whether the timer count Twp of the timer has elapsed over the preset waiting time interval Tw or not. When the time has not yet elapsed, the program flow returns to step S505, and then there is executed the level detection and display process at the reception frequency while executing the waiting process. When the time has been elapsed, the program flow proceeds to step S510. Then the frequency data ($Df_{LO}+\Delta f$) is set up as the center local oscillation frequency data $Df_{LO}$ at step S510, and the frequency data ($Df_{CL}+\Delta f$) is set up as the transmission and reception frequency data $Df_{CL}$. Thereafter, the program flow returns to the original routine.

The signal level displayed at step S507 shown in FIG. 23 represents the signal level of the signal being currently received. In the loop process starting from step S505 and returning through step S509 to step S505, the signal level of the signal being currently received is detected and displayed in real time in a predetermined cycle. Meanwhile, since the squelch switch 11 has been turned on, the reception signal at the set-up frequency $f_R = f_{set} = Df_{CL}$ can be received so as to allow the low-frequency signal demodulated from the modulated wave of the signal, and then the operator can hear the low-frequency signal or the voice signal output from the speaker 13. It is noted that the above-mentioned arrangement is not limitative in the present invention, and it may be accepted to wait, for example, for the waiting time interval Tw seconds without executing the waiting time determination at step S509. In such a case, the signal level of the signal being currently received does not change in real time.

FIG. 24 is a flowchart of the scan search process in the lower frequency direction (step S412) of a subroutine shown in FIG. 22.

First of all, the display data replace process in the lower frequency direction (See FIG. 21) is executed at step S511. Then the L-level ESQ signal is output so as to turn off the squelch switch 11 at step S512, thereby allowing the low-frequency signal demodulated from the modulated wave of the reception signal to be received. Thereafter, the timer count Twp of the timer for the waiting process in the MPU 30 is reset to zero second, then starting the time counting. Then the center local oscillation frequency data $Df_{LO}$ is set up in the local oscillation frequency data $Df_L$ at step S513, and the transmission and reception frequency data $Df_{CL}$ is set up in the register 43 at step S514 so as to effect display on the LCD section 67. Thereafter, the program flow proceeds to step S515.

At step S515, the reception signal level data SLD output from the A/D converter 20 is detected and taken in the CPU, and the, the data SLD is converted into four-level data at step S516. Thereafter, the converted data is overwritten into the addresses 00 through 03 of the VRAM 40 at step S517. With the above-mentioned processes, the signal level is displayed vertically at the four LCD pixels LM00 through LM03 in one column at the left end of the matrix LCD section 61 of the LCD unit 60 with the bottom end set at the 0/4 level, and then, it is determined whether the SD signal is at H level or not at step S518. When the SD signal is at H level, i.e., when there is no reception signal at the reception frequency, the program flow proceeds to step S520 without executing the waiting time determination process at step S519. When the SD signal is at L level at step S518, i.e., when there is a reception signal at the reception frequency, waiting time determination for the waiting process is executed at step S519. In other words, it is determined whether the timer count Twp of the timer has elapsed over the preset waiting time interval Tw or not. When the time has not yet elapsed, the program flow returns to step S515 so as to execute the level detection and display process at the reception frequency while executing the waiting process. When the time has been elapsed, the program flow proceeds to step S520. Then the frequency data ($Df_{LO}-\Delta f$) is set up as the center local oscillation frequency data $Df_{LO}$ at step S520, and the frequency data ($Df_{CL}-\Delta f$) is set up as the transmission and reception frequency data $Df_{CL}$. Thereafter, the program flow returns to the original routine.

The signal level displayed at step S517 shown in FIG. 24 represents the signal level of the signal being currently received. In the loop process starting from step S515 and returning through step S519 to step S515, the signal level of the signal being currently received is detected and displayed in real time in a predetermined cycle. Meanwhile, since the squelch switch 11 is turned on, the reception signal at the set-up frequency $f_R=fset=Df_{CL}$ can be received so as to allow the low-frequency signal demodulated from the modulated wave of the signal, and then the operator can hear the low-frequency signal or the voice signal output from the speaker 13. It is noted that the above-mentioned arrangement is not limitative in the present invention, and it may be accepted to wait, for example, for the waiting time interval Tw seconds without executing the waiting time determination at step S519. In such a case, the signal level of the signal being currently received does not change in real time.

In the scan search receiving enable process described with reference to FIG. 22, an operation of automatically changing the transmission and reception frequency every step frequency set up by means of the step frequency selection key 33 in the higher or lower frequency direction is repeated until the scan search mode is released to shift the data of the signal levels of the reception signals at a plurality of frequencies in the VRAM 40, with which the display positions of the signal levels of the plural number of frequencies are displayed as shifted in the higher or lower frequency direction according to the change of the transmission and reception frequency. When the transmission and reception frequency is changed in the higher frequency direction in the scan search mode, the signal level of the transmission and reception frequency is displayed in a manner that, since the transmission and reception frequency is sequentially scanned in the higher frequency direction after the display position is shifted so as to be positioned at the right end of the matrix LCD section 61 as indicated by the center-indicating LCD section 63b as shown in FIG. 7, the corresponding display position of the signal level is sequentially shifted leftward as shown in FIG. 27. On the other hand, when the transmission and reception frequency is changed in the lower frequency direction, the signal level of the transmission and reception frequency is displayed in a manner similar to that as described above, since the transmission and reception frequency is sequentially scanned in the lower frequency direction after the display position is shifted so as to be positioned at the left end of the matrix LCD section 61 as indicated by the center-indicating LCD section 63c as shown in FIG. 8, the corresponding display position of the signal level is sequentially shifted rightward as shown in FIG. 28. It is noted that FIGS. 27 and 28 show the frequencies of the respective signal levels on the matrix LCD section 61 changing according as the time t elapses and the transmission and reception frequency data $Df_{CL}$ so as to be displayed on the LCD section 67 in a manner similar to that of FIG. 26. In FIGS. 27 and 28, f11 represents the transmission and reception frequency at the time of starting the scan search, wherein the greater the number given to "f" is, the higher the frequency is.

Figure 29:
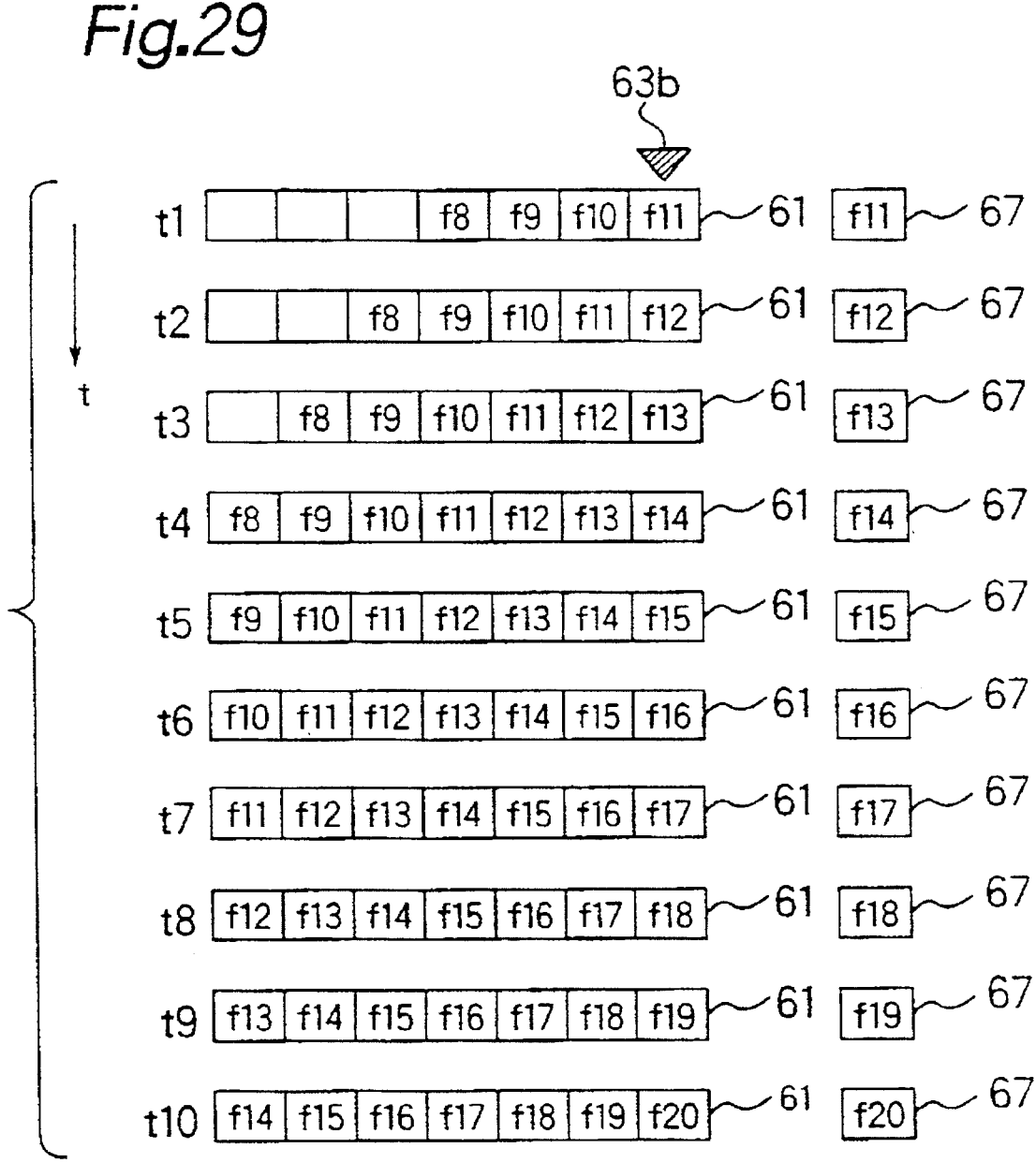
FIG. 29 is a front view showing frequencies of seven signal levels displayed on the matrix LCD section 61 of the LCD section when the transmission and reception frequency is scanned by automatic scan search in a modification of the first preferred embodiment in which the transmission and reception frequency is scanned in the higher frequency direction and the transmission, and reception frequency displayed on the seven-segment LCD section 67.
Figure 30:
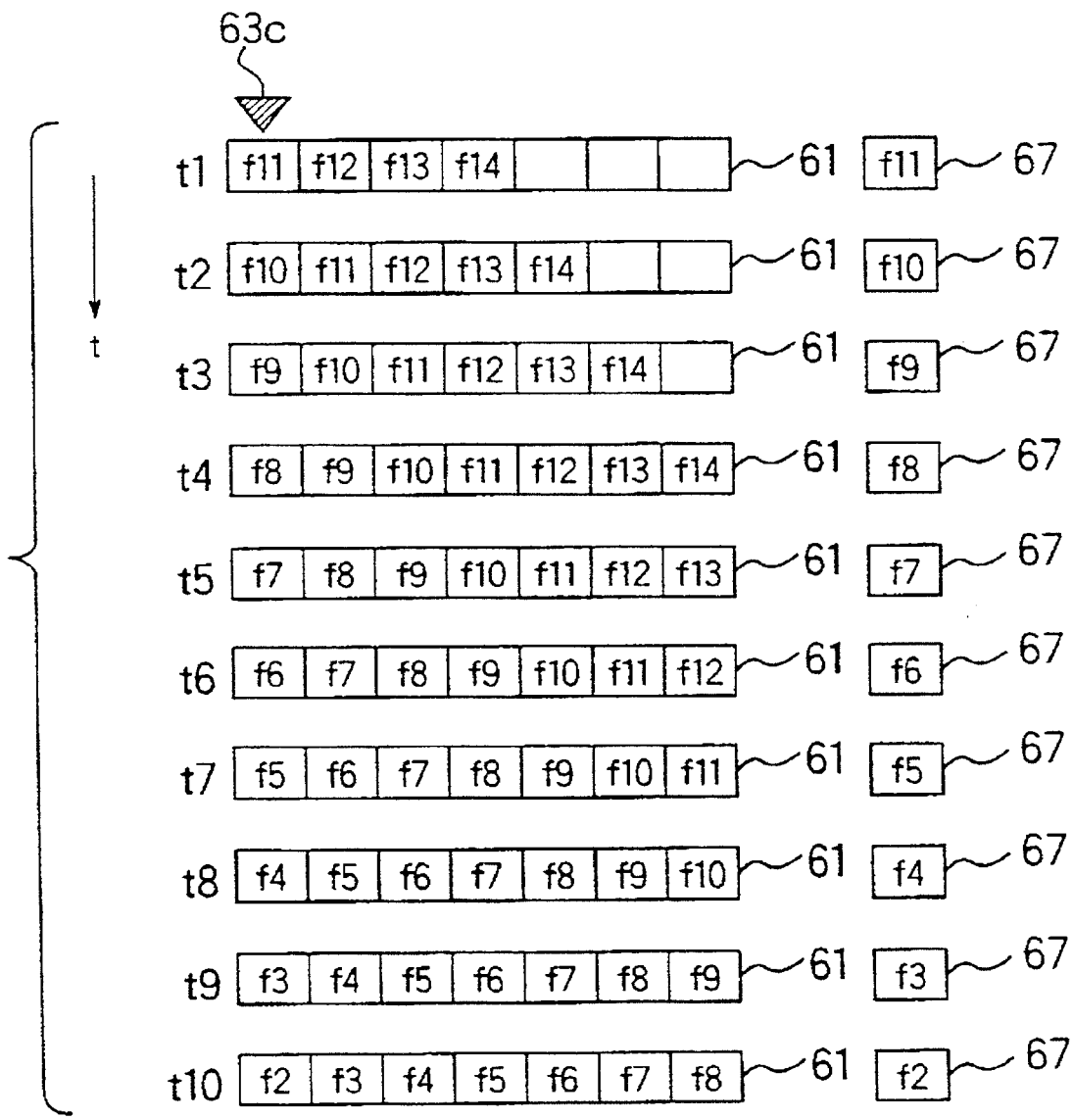
FIG. 30 is a front view showing frequencies of seven signal levels displayed on the matrix LCD section 61 of the LCD section when the transmission and reception frequency is scanned by automatic scan search in the modification of the first preferred embodiment in which the transmission and reception frequency is scanned in the lower frequency direction, and the transmission and reception frequency displayed on the seven-segment LCD section 67.

Although all the LCD segments in the matrix LCD section 61 of the LCD unit 60 are turned off at step S406 in the scan search receiving enable process shown in FIG. 22, the above-mentioned arrangement is not limitative in the present invention, and then the LCD segments may be designed so as to be not turned off without executing the process at step S406. In such a case, the data of the signal levels at the three frequencies of $f8=f11-3\Delta f$, $f9=f11-2\Delta f$, and $f10=f11-\Delta f$ lower than the transmission and reception frequency f11 when starting the scan search are stored in the VRAM 40 in the scan search in the higher frequency direction. Therefore, by shifting the data of the signal levels rightward by three steps corresponding to $3\Delta f$ in the VRAM 40, the signal levels are displayed additionally as shown in FIG. 29 corresponding to FIG. 27 of the aforementioned first preferred embodiment. On the other hand, in the scan search in the lower frequency direction, the data of the signal levels at the three frequencies of $f12=f11+\Delta f$, $f13=f11+2\Delta f$, and $f14=f11+3\Delta f$ higher than the transmission and reception frequency f11 when starting the scan search are stored in the VRAM 40. Therefore, by shifting the data of the signal levels leftward by three steps corresponding to $3\Delta f$ in the VRAM 40, the signal levels are displayed additionally as shown in FIG. 30 corresponding to FIG. 28 of the aforementioned first preferred embodiment.

Figure 25:
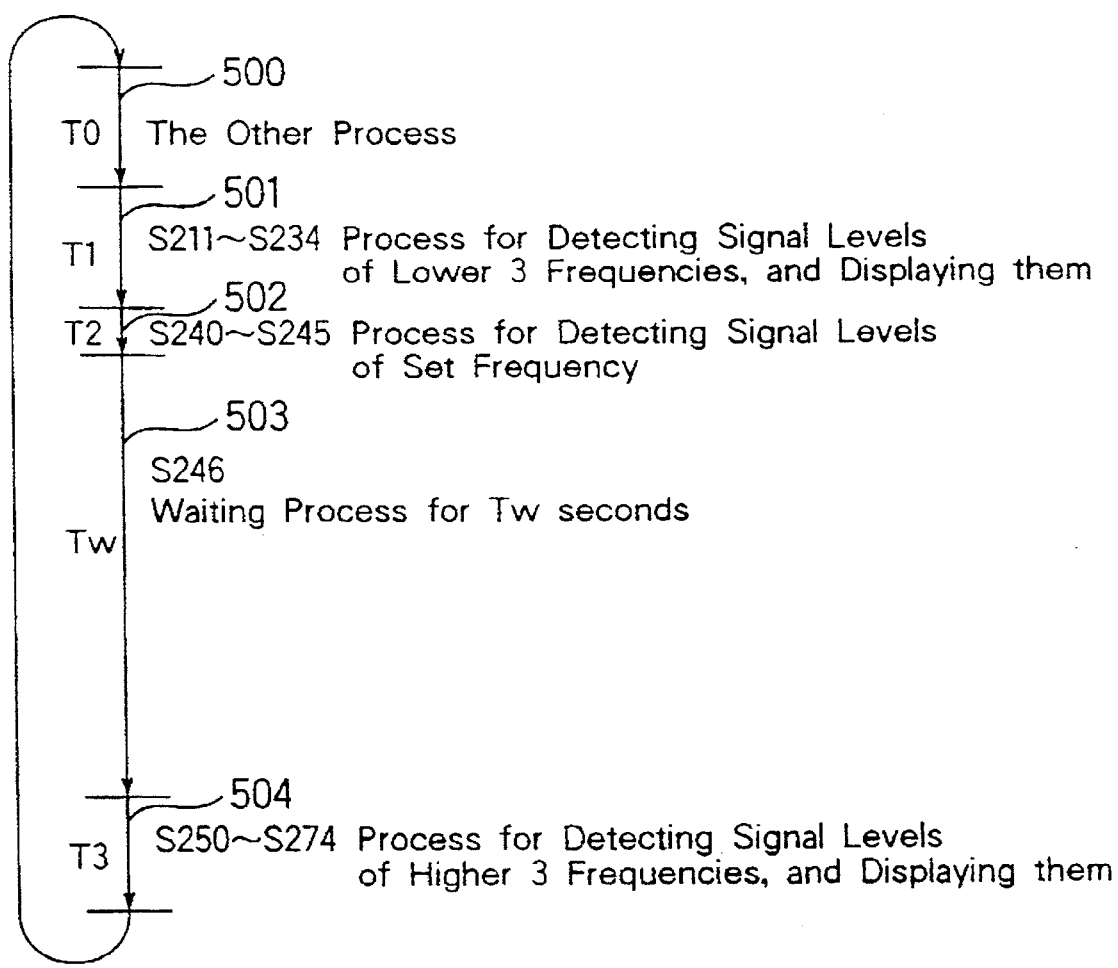
FIG. 25 is a timing chart mainly showing the display processes of signal levels of signals having a plurality of frequencies in the radio transceiver shown in FIG. 1.

FIG. 25 is a timing chart of a search reception process mainly of the process for displaying signal levels of signals having a plurality of frequencies in the case where the reception state of the radio transceiver shown in FIG. 1 is repeated by setting up the VFO mode, the search mode, and the search receiving enable mode, and the SD signal is at L level (referred to as a "search reception process" hereinafter). Referring to FIG. 25, the search reception process includes the following processes and is repeated periodically unless any mode change is effected by means of the switches SW1 through SW4.

(a) A process 500 for a time T0 seconds including steps S2 and S3 of the main routine.

(b) A process 501 for a time T1 seconds including the process for detecting and displaying the signal levels at three frequencies lower than the set-up transmission and reception frequency $f_R=fset=Df_{CL}$ (referred to as a "lower three frequencies" hereinafter) including the processes at steps S211 through S234. In the present case, the lower three frequencies are the frequency $f_R-3\Delta f$, frequency $f_R-2\Delta f$, and frequency $f_R-\Delta f$ which are different from each adjacent one by the preset step frequency $\Delta f$.

(c) A process 502 for a time T2 seconds including the process for detecting and displaying the signal level at the reception frequency $f_R=\text{fset}=\text{Df}_{CL}$ including the processes at steps S240 through S245.

(d) A process 503 including the process for determining the waiting time interval Tw seconds at step S246 and the loop process starting from step S246 and returning through step S242 to step S246 until the waiting time interval Tw seconds elapses though it is not shown in FIG. 25. In the process 503, the signal level at the reception frequency $f_R=\text{fset}=\text{Df}_{CL}$ being currently received is detected and displayed periodically in real time in a predetermined cycle as described above, which allows the operator to hear the low-frequency signal demodulated from the modulated wave sounding from the speaker 13 and observe the signal level.

(e) A process 504 for a time T3 seconds including the process for detecting and displaying the signal levels at three frequencies higher than the set-up transmission and reception frequency $f_R=\text{fset}=\text{Df}_{CL}$ (referred to as a "higher three frequencies" hereinafter) including the processes at steps S250 through S274. In the present case, the higher three frequencies are the frequency $f_R+\Delta f$, frequency $f_R+2\Delta f$, and frequency $f_R+3\Delta f$ which are different from each adjacent one by the preset step frequency $\Delta f$.

In the case where the processes 500 through 504 are periodically repeated in the above-mentioned search reception process, when level detection display process at one frequency is executed, the signal levels at the other six frequencies are stored in the VRAM 40 as displayed in the previous level detection display process. Therefore, the signal levels at all the seven frequencies including the upper three frequencies, the transmission and reception frequency $f_R$, and the lower three frequencies are displayed on the matrix LCD section 61 of the LCD unit 60, with which the signal levels of signals having a plurality of frequencies having a reception bandwidth of $6\Delta f$ ranging from the lowest frequency $f_R-3\Delta f$ to the highest frequency $f_R+3\Delta f$ in steps of the step frequency $\Delta f$ are displayed. For instance, by reducing the time (T0+T1+T2+T3) seconds of the processes 500 through 502 and 504 as far as possible and sufficiently increasing the waiting time interval Tw seconds, the low-frequency signal demodulated from the modulated wave at the transmission and reception frequency $f_R$ is allowed to be heard from the speaker 13 in the course of from step S240 to step S246 almost any time except for the time (T0+T1+T2+T3) seconds of the processes 500 through 502 and 504, wherein the squelch switch 11 is turned off in the processes 500 through 502 and 504, for which the low-frequency signal of the reception signal is not output from the speaker 13, and therefore, the operator can not hear any low-frequency signal.

Since the signal levels at the seven frequencies are always stored in the VRAM 40, the operator is substantially allowed to observe the signal levels at the plural number of frequencies displayed on the matrix LCD section 61 and hear the low-frequency signal demodulated from the modulated wave at the desired transmission and reception frequency $f_R$ sounding from the speaker 13. Therefore, the signal level at the transmission and reception frequency $f_R$ being currently set up and received and the signal levels at the adjacent six frequencies can be easily observed.

In this state, the waiting time interval Tw may be set up by the operator by means of the ten key 32 according to the communication states. The time interval Tw is preferably set at a time interval in a range from 10 to 30 seconds. According to an experiment of a trial production performed by the present inventor, it was confirmed that the level detection display process at one frequency can be suppressed not higher than 0.01 milliseconds.

It is noted that the memory channel mode process (step S4) is executed in a manner similar to that in the VFO process (step S5) except for the following process. It is assumed herein that the channel number preset by means of the rotary encoder 31 or the ten key 32 is a natural number m, and the transmission and reception frequency at the time is fm. In this case, the set-up frequency fset is set at fm, and the local oscillation frequency (fm–$f_{IF}$) corresponding to the transmission and reception frequency fm is set in the frequency data $\text{Df}_{LO}$ and $\text{Df}_L$. This corresponds to step S45 of FIG. 11.

(a) Display is effected on the "M" LCD section 65 of the LCD unit 60.

(b) The frequency data {f(m–3)–$f_{IF}$} is set up as local oscillation frequency data $\text{Df}_L$ at step S211 of FIG. 14.

(c) The frequency data {f(m–2)–$f_{IF}$} is set up as local oscillation frequency data $\text{Df}_L$ at step S221 of FIG. 14.

(d) The frequency data {f(m–1)–$f_{IF}$} is set up as local oscillation frequency data $\text{Df}_L$ at step S231 of FIG. 14.

(e) The frequency data {f(m+1)–$f_{IF}$} is set up as local oscillation frequency data $\text{Df}_L$ at step S251 of FIG. 16.

(f) The frequency data {f(m+2)–$f_{IF}$} is set up as local oscillation frequency data $\text{Df}_L$ at step S261 of FIG. 16.

(g) The frequency data {f(m+3)–$f_{IF}$} is set up as local oscillation frequency data $\text{Df}_L$ at step S271 of FIG. 16.

(h) The channel number (m+1) is set up as the channel number m, and the frequency data {fm–$f_{IF}$} is set up as the center local oscillation frequency data $\text{Df}_{LO}$ at step S602 of FIG. 18.

(i) The frequency data fm is set up as the transmission and reception frequency data $\text{Df}_{CL}$ at step S603 of FIG. 18.

(j) The frequency data {f(m+3)–$f_{IF}$} is set up as the local oscillation frequency data $\text{Df}_L$ at step S606 of FIG. 18.

(k) The channel number (m–1) is set up as the channel number m, and the frequency data {fm–$f_{IF}$} is set up as the center local oscillation frequency data $\text{Df}_{LO}$ at step S622 of FIG. 19.

(l) The frequency data fm is set up as the transmission and reception frequency data $\text{Df}_{CL}$ at step S623 of FIG. 19.

(m) The frequency data {f(m–3)–$f_{IF}$} is set up as the local oscillation frequency data $\text{Df}_L$ at step S626 of FIG. 19.

(n) The channel number (m+1) is set up as the channel number m, the frequency data {fm–$f_{IF}$} is set up as the center local oscillation frequency data $\text{Df}_{LO}$, and the frequency data fm is set up as the transmission and reception frequency data $\text{Df}_{CL}$ at step S510 of FIG. 23.

(o) The channel number (m–1) is set up as the channel number m, the frequency data {fm–$f_{IF}$} is set up as the center local oscillation frequency data $\text{Df}_{LO}$, and the frequency data fm is set up as the transmission and reception=frequency data $\text{Df}_{CL}$ at step S520 of FIG. 24.

In the case where the memory channel mode, the search mode, and the search receiving enable mode are set up and the reception state is repeated in the radio transceiver, when the level detection display process at one frequency is executed, the signal levels at the other six frequencies are stored in the VRAM 40 in the previous level detection display process. Therefore, the signal levels at the seven memory channel frequencies of channel number (m−3) to (m+3) are displayed on the matrix LCD section 61 of the LCD unit 60, with displaying the seven signal levels displayed. Therefore, the signal levels of the memory channel being currently set up and received, and the six memory channels adjacent to the memory channel can be easily observed even when the frequencies are greatly separated apart from each other. Although the signal levels are displayed when the seven channel numbers are arranged in the ascending order in the aforementioned operation mode, the signal levels at the reception signals corresponding to the seven channel numbers previously selected by the operator may be displayed.

When the scan search mode is set up in the memory channel mode in the radio transceiver, the same operation as that in the VFO mode is executed except that the transmission and reception frequency is changed according to the frequencies corresponding to the memory channel numbers and the display positions of the seven signal levels are displayed in the ascending (increasing) or descending (decreasing) order of the memory channel numbers.

According to the first preferred embodiment as described above, the process for detecting and storing the signal levels of signals having a plurality of frequencies and the process for outputting the output of the FM demodulator 8 to the speaker 13 are executed time-sharingly or through the time division method, by means of the receiver circuit of one system for receiving only the high-frequency signal at one reception frequency by selecting the search mode and the receiving enable mode in the VFO mode and the memory channel mode. The above-mentioned arrangement allows the operator to observe the signal levels at the seven frequencies displayed on the matrix LCD section 61 easily and substantially simultaneously, while substantially hearing the low-frequency signal demodulated from the modulated wave of the reception signal at the desired transmission and reception frequency $f_R$ sounding from the speaker 13. For instance, by reducing the step frequency $\Delta f$ in the VFO mode, a spectrum can be displayed in a simulation manner. The aforementioned time-sharing or time division process may be executed simultaneously. In such a case, when reception signals at six frequencies except for the reception signal at the desired transmission and reception frequency $f_R$ are received and each of the signal levels is greater than the squelch level, a click sound can be accompanied with hearing the low-frequency signal or the voice signal output from the speaker 13.

The present preferred embodiment is not provided with the receiver circuits of two systems of the original signal receiver circuit and the receiver circuit for spectrum display as in the conventional example, but there is provided with the receiver circuit of the former one system. The above arrangement allows the provision of a radio transceiver having a function of displaying signal levels of signals having a plurality of frequencies requiring a very simple circuit construction and low manufacturing cost in comparison with the conventional example or the case where a spectrum analyzer is separately provided.

Figure 2:
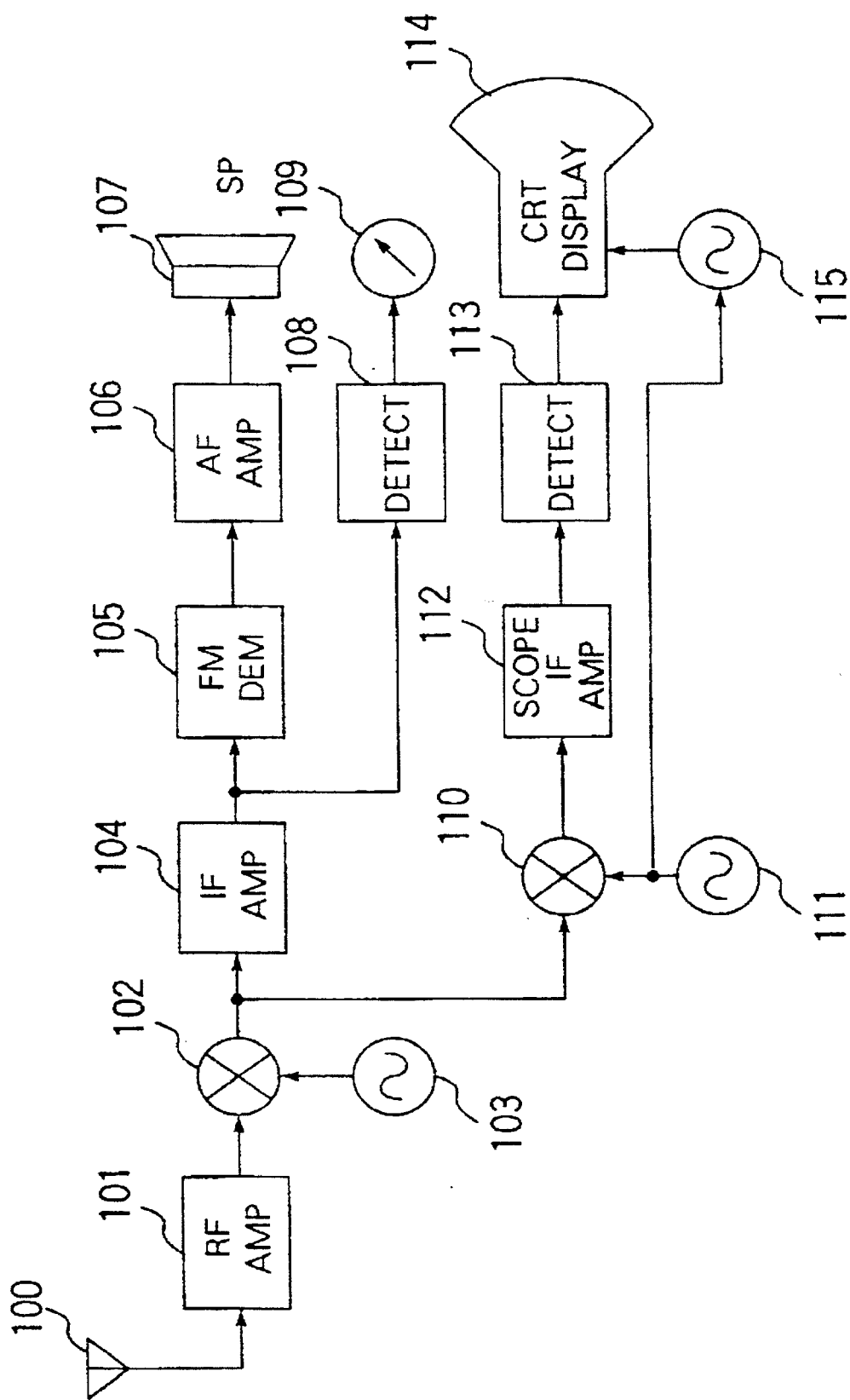
FIG. 2 is a block diagram of a radio transceiver provided with a spectrum display function of a conventional example.

Furthermore, in the conventional example shown in FIG. 2, the bandwidth in measuring the reception signal in the spectrum display is substantially determined depending on the passband width of the band-pass filter in the scope IF amplifier 112. Therefore, when the spectrum is desired to be displayed at the same level as that of the reception signal displayed on the signal level meter 109, it is required to change the setting of the bandwidth of the band-pass filter in the IF amplifier 104 so that the bandwidth is equal to that of the scope IF amplifier 112. In contrast to the above, since both the processes are executed in the above-mentioned identical receiver circuit in the present preferred embodiment, no change of setting is required and the signal levels of signals having a plurality of frequencies (in the VFO mode) in the vicinity of the frequency of the reception signal being currently received can be easily perceived through observation of the matrix LCD section 61 of the LCD unit 60 in the same state as that of the reception signal being currently received. The above-mentioned arrangement allows unoccupied channels or occupied channels at adjacent frequencies to be easily found. The perception of the unoccupied channels is effective when almost all the channels are in the busy state particularly in city areas. The perception of the occupied channels is effective when very few usable channels are availed particularly in areas other than the city areas.

Furthermore, a greater number of pixels are provided in the horizontal direction in comparison with the number of pixels in the vertical direction in the search mode as described above. Therefore, while displaying the signal levels of high-frequency signals at seven frequencies varying in the vertical direction on the matrix LCD section 61 of the LCD unit 60 in the reception state, the signal level of the currently-received high-frequency signal varying in the horizontal direction can be displayed in steps greater in number than in displaying the signal levels of signals having a plurality of frequencies, i.e., in greater number of signal level steps by means of the pixels in the lowest two rows and seven columns on the matrix LCD section 61 in the normal mode.

Second preferred embodiment

A radio transceiver having a function of displaying signal levels of signals having a plurality of frequencies in accordance with a second preferred embodiment of the present invention differs from the first preferred embodiment in the following points.

Figure 31:
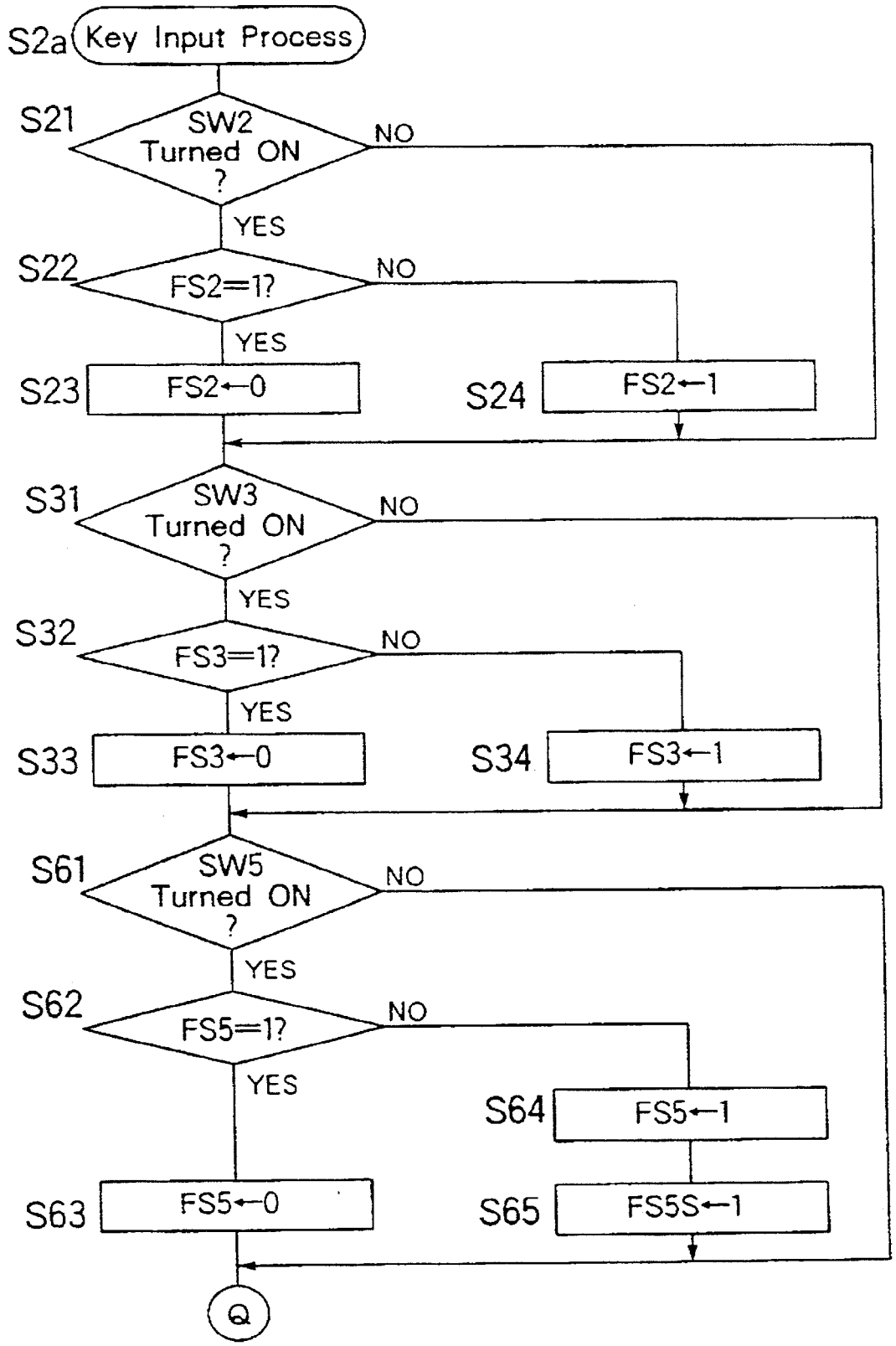
FIG. 31 is a flowchart of a first part of a key input process of a subroutine in a radio transceiver having a function of displaying signal levels of signals having a plurality of frequencies in accordance with the second preferred embodiment of the° present invention, wherein FIG. 31 corresponds to FIG. 10 of the first preferred embodiment.
Figure 32:
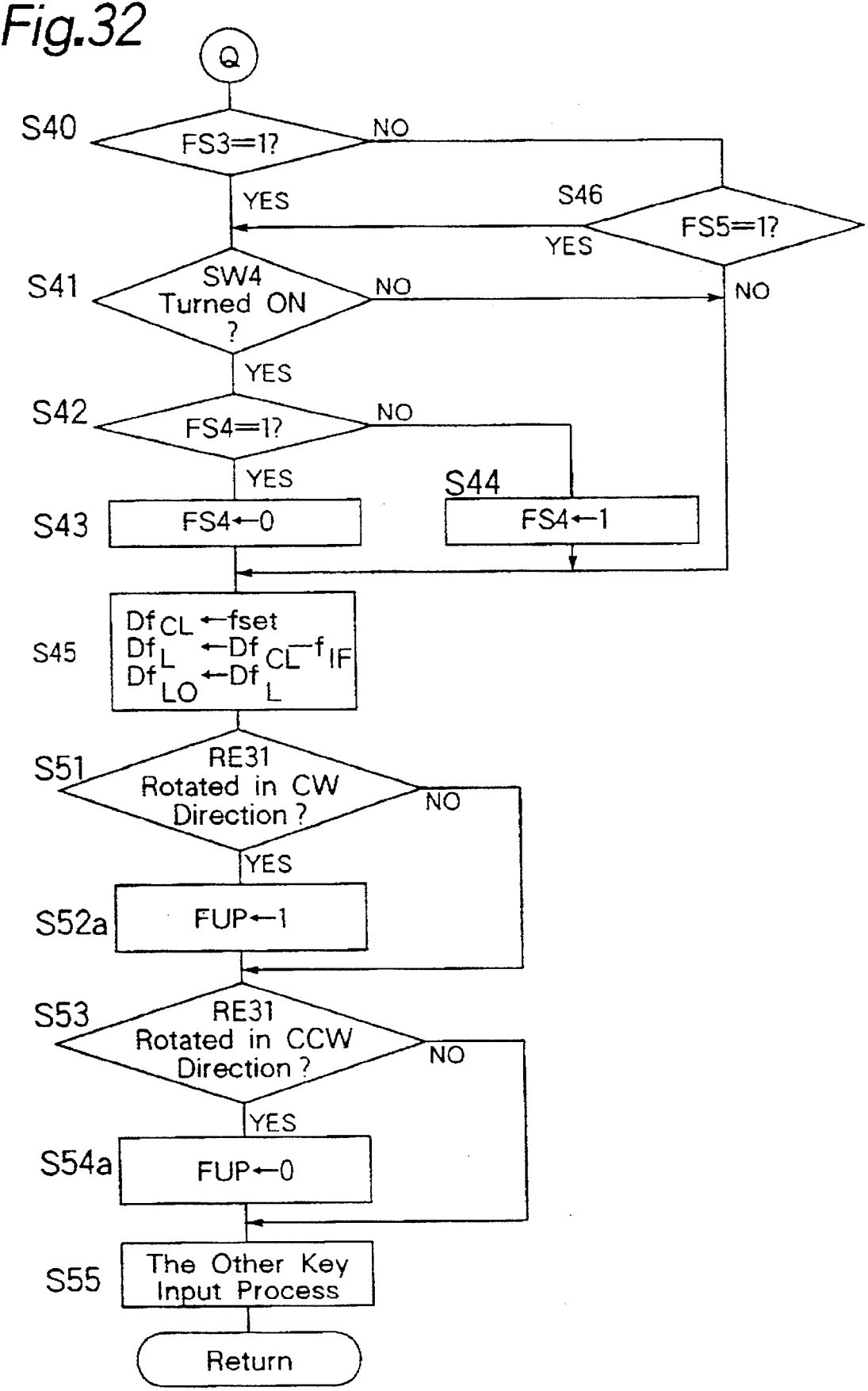
FIG. 32 is a flowchart of a second part of the key input process of the second preferred embodiment, wherein FIG. 32 corresponds to FIG. 11 of the first preferred embodiment.

(1) The key input process of the first preferred embodiment shown in FIGS. 10 and 11 are replaced by a key input process (step S2a) as shown in FIGS. 31 and 32 respectively.

Figure 33:
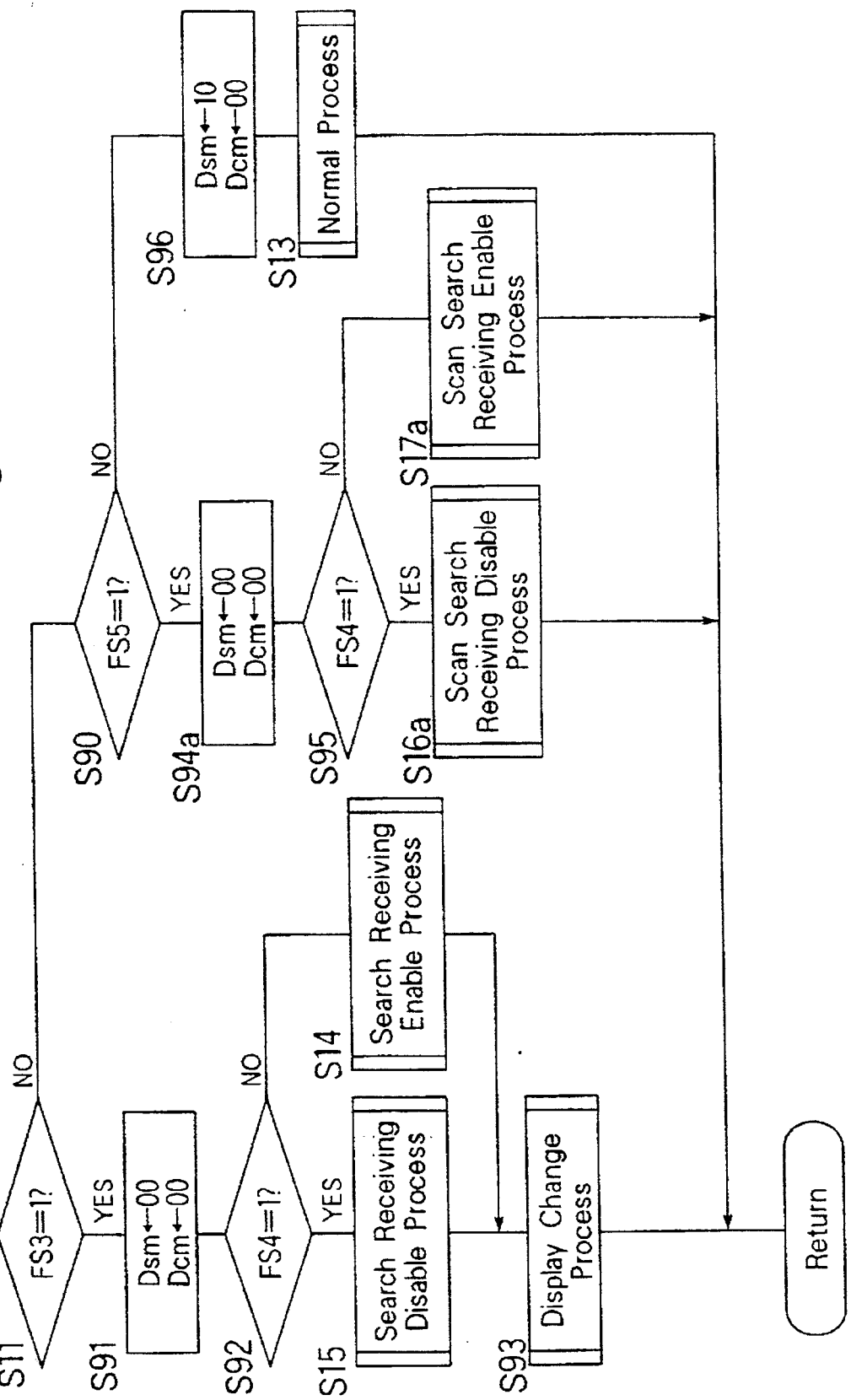
FIG. 33 is a flowchart of a subroutine of a VFO mode process of the second preferred embodiment, wherein FIG. 33 corresponds to FIG. 12 of the first preferred embodiment.

(2) The VFO mode process of the first preferred embodiment shown in FIG. 12 is replaced by a VFO mode process (step S5a) as shown in FIG. 33. In the present case, in particular, the scan search receiving enable process and the scan search receiving disable process are different from those of the first preferred embodiment. The memory channel process (step S4) of the first preferred embodiment is changed as described in detail later in a manner similar to that in the VFO mode process shown in FIG. 33.

Figure 41:
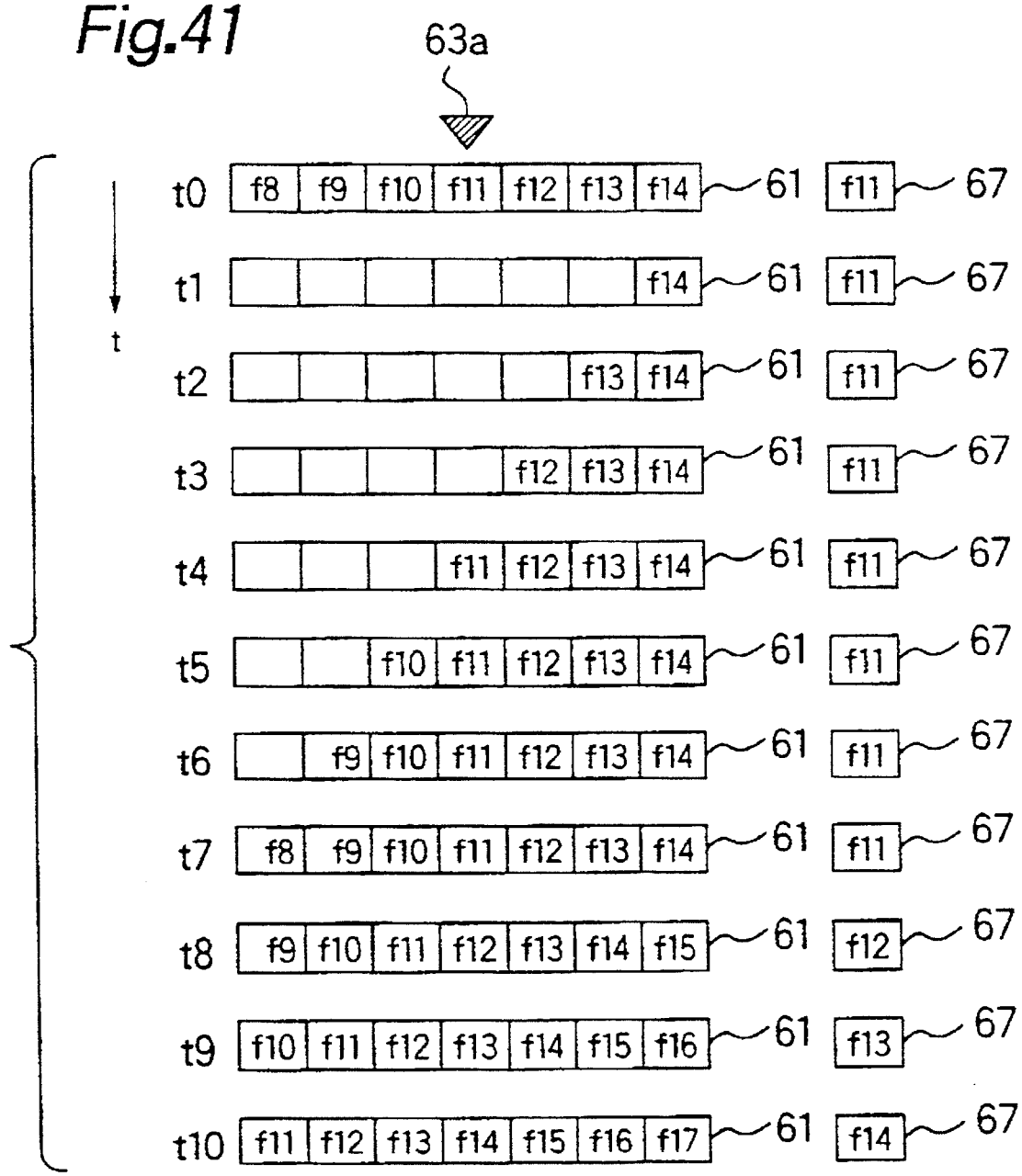
FIG. 41 is a front view showing frequencies of seven signal levels displayed on the matrix LCD section 61 of the LCD section when the transmission and reception frequency is scanned by automatic scan search in the second preferred embodiment in which the transmission and reception frequency is scanned in the higher frequency direction, and the transmission and reception frequency displayed on the seven-segment LCD section 67.
Figure 42:
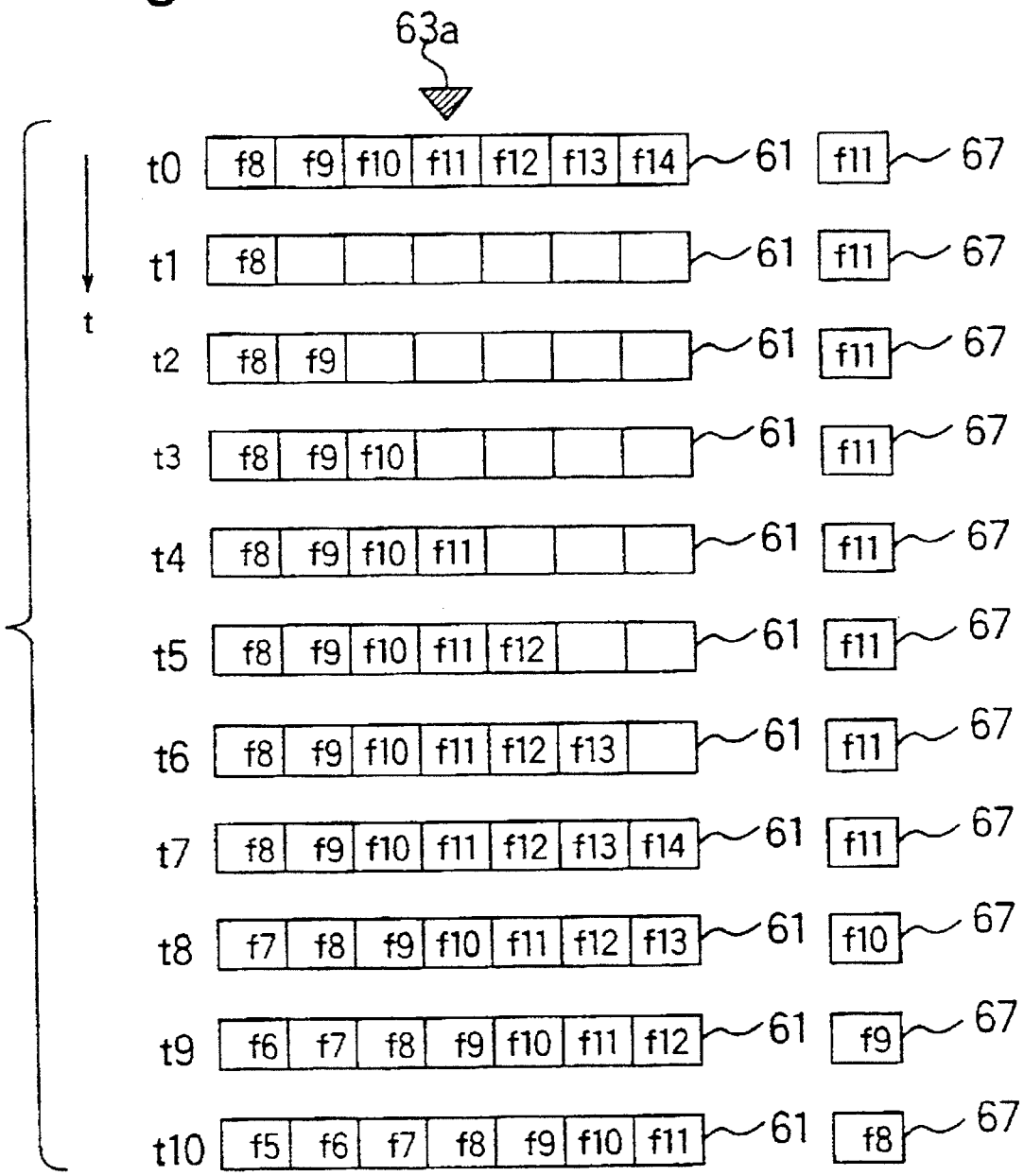
FIG. 42 is a front view showing frequencies of seven signal levels displayed on the matrix LCD section 61 of the LCD section when the transmission and reception frequency is scanned by automatic scan search in the first preferred embodiment in which the transmission and reception frequency is scanned in the lower frequency direction, and the transmission and reception frequency displayed on the seven-segment LCD section 67.

In the first preferred embodiment and the modification thereof, the center frequency is shifted to the right end indicated by the center-indicating LCD section 63b or to the left end indicated by the center-indicating LCD section 63c in the matrix LCD section 61 in the scan search mode as shown in FIGS. 27 through 30. In contrast to the above, the second preferred embodiment is characterized in that the scan search process is executed by holding the center frequency in the center position indicated by the center-indicating LCD section 63a as shown in FIGS. 41 and 42. The following describes the points different from those of the first preferred embodiment.

FIGS. 31 and 32 are flowcharts of the key input process (step S2a) of a subroutine of the second preferred embodiment, which corresponds to FIGS. 10 and 11 of the first preferred embodiment. In the present case, the content of process shown in FIG. 31 is the same as that in FIG. 10, however, in FIG. 32, the steps S52a and S54a are different from those of the first preferred embodiment. In more detail, only the flag FUP is set to 1 at step S52a, and then, the program flow proceeds to step S53. Otherwise only the flag FUP is reset to zero at step S54a, and then, the program flow proceeds to step S55.

FIG. 33 is a flowchart of the VFO mode process (step S5a) of a subroutine of the second preferred embodiment. The content of process differs from FIG. 12 of the first preferred embodiment in the following points.

(1) Instead of storing the data "00" in the pixel data Dsm and not effecting display on the LCD sections 64 and 65, the data "00" is stored in the pixel data Dcm and display is effected on the LCD pixel in the center-indicating LCD section 63a of the LCD unit 60 at step S94a.

(2) The scan search receiving disable process as described in detail later is executed at step S16a.

(3) The scan search receiving enable process (refer to FIG. 34) as described in detail later is executed at step S17a.

Figure 34:
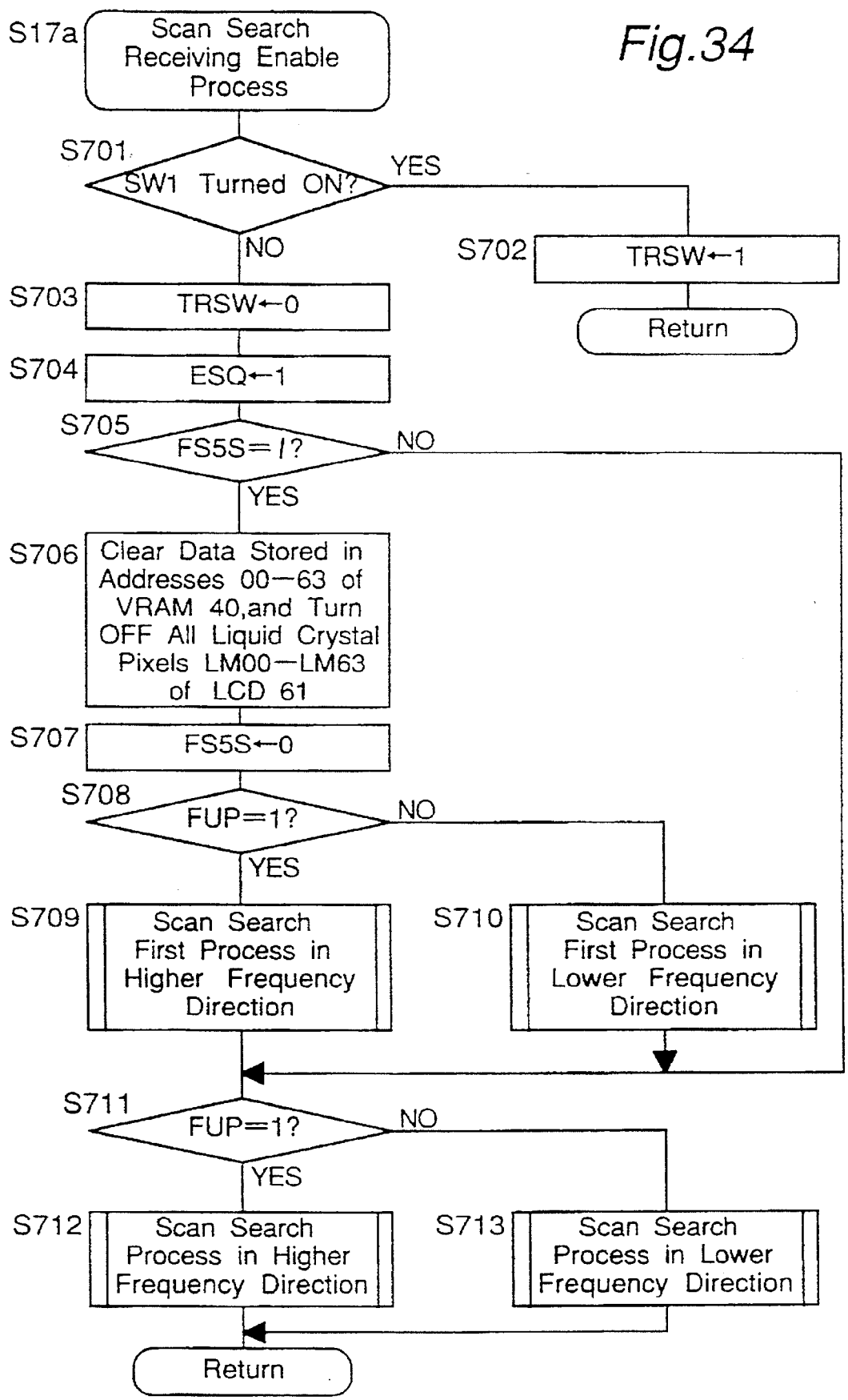
FIG. 34 is a flowchart of a scan search receiving enable process of a subroutine shown in FIG. 33.

FIG. 34 is a flowchart of the scan search receiving enable process (step S17a) of a subroutine shown in FIG. 33.

Referring to FIG. 34, it is, first of all, determined whether the PTT switch SW1 is turned on or not at step S701. When the switch SW1 is turned on, the program flow proceeds to step S702, and then, the H-level TRSW signal is output so as to switch the transmission and reception changeover switch 10 to the contact point b. With the above-mentioned operation, the transceiver is put in the transmission state, and the program flow returns to the original routine. On the other hand, when the PTT switch SW1 is not turned on (NO at step S701), the L-level TRSW signal is output so as to switch the transmission and reception changeover switch 10 to the contact point a at step S703, thereby putting the transceiver in the reception state. Then the H-level ESQ signal is output so as to turn off the squelch switch 11 at step S704, thereby stopping output of the low-frequency signal from the speaker 13. Then it is determined whether the flag FS5S=1 or not at step S705. When FS5S=1, the data stored in the addresses 00 through 63 of the VRAM 40 are cleared to zero so as to turn off all the LCD pixels in the matrix LCD section 61 at step S706. Then the flag FS5S is reset to zero at step S707, and then, the program flow proceeds to step S708. Then it is determined whether the flag FUP=1 or not at step S708. When FUP=1, the scan search first process in the higher frequency direction (See FIGS. 35 and 36) is executed at step S709, and then, the program flow proceeds to step S711. When FUP=0 at step S708, a scan search first process in the lower frequency direction (See FIGS. 38 and 39) is executed at step S710, and then, the program flow proceeds to step S711.

Thereafter, it is determined whether the flag FUP=1 or not at step S711. When FUP=1, the scan search process in the higher frequency direction (See FIG. 37) is executed at step S712, and then, the program flow returns to the original routine. When FUP=0 at step S711, the scan search process in the lower frequency direction (See FIG. 40) is executed at step S713, and then, the program flow returns to the original routine.

It is noted that the process of the scan search receiving disable process (step S16a) shown in FIG. 33 is the same as that of the scan search receiving enable process (step S17a) as shown in FIG. 34, except that the H-level ESQ signal is output instead of the L-level ESQ signal at step S931 of the scan search process in the higher frequency direction shown in FIG. 37.

With the above-mentioned arrangement, the signal levels of signals having a plurality of frequencies are displayed in a manner similar to that in the scan search receiving enable process (step S17a) in the scan search mode and the receiving disable mode, wherein the low-frequency signal of the reception signal at the center frequency cannot be heard from the speaker 13 by the operator.

Figure 35:
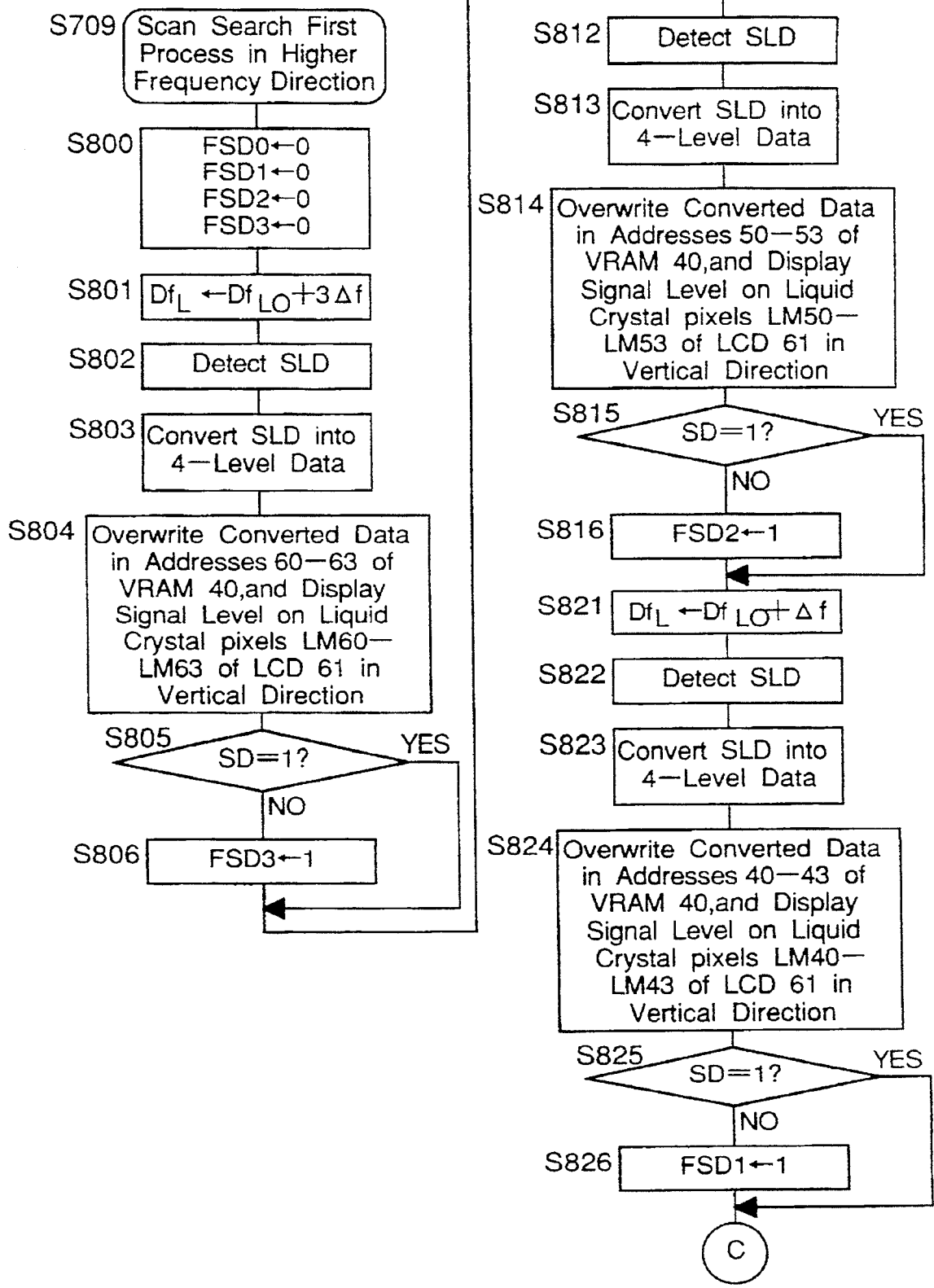
FIG. 35 is a flowchart of a first part of a scan search first process of a subroutine in the higher frequency direction shown in FIG. 34.
Figure 36:
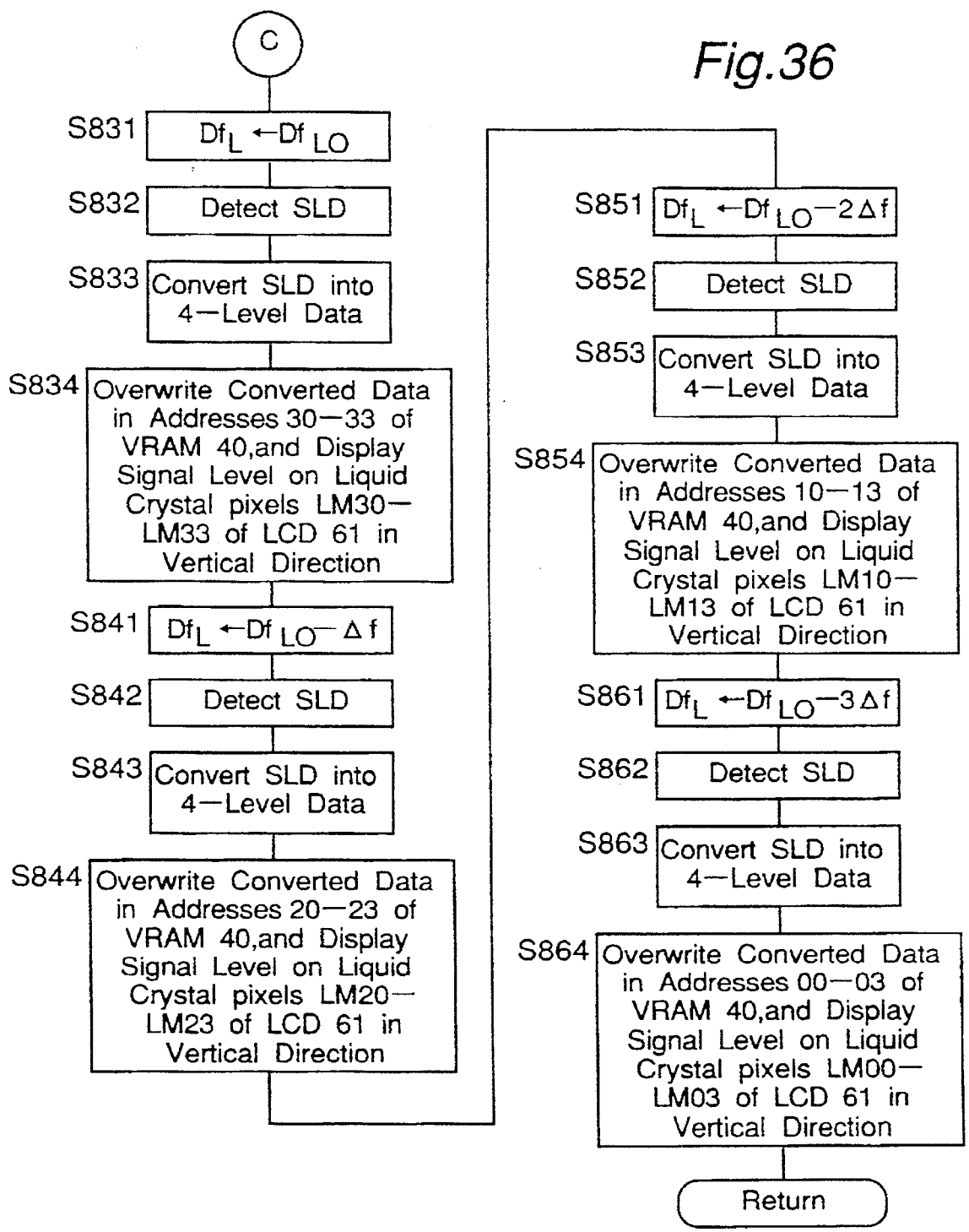
FIG. 36 is a flowchart of a second part of the scan search first process in the higher frequency direction shown in FIG. 34.

FIGS. 35 and 36 are flowcharts of the scan search first process in the higher frequency direction (step S709) of a subroutine shown in FIG. 34.

Referring to FIG. 35, the four SD signal detection flags FSD0, FSD1, FSD2 and FSD3 are, first of all, reset to zero at step S800. The SD signal detection flags FSD0, FSD1, FSD2 and FSD3 have the following meanings.

(1) Flag FSD0: This flag FSD0 represents whether the SD signal is detected or not at the center frequency $Df_{CL}$. The flag FSD0 is set to 1 when SD=0, and is reset to zero when SD=1, which arrangement is provided for all the flags as follows.

(2) Flag FSD1: This flag FSD1 represents whether the SD signal is detected or not at a frequency displaced from the center frequency $Df_{CL}$ by the step frequency $\Delta f$ in the higher frequency direction.

(3) Flag FSD2: This flag FSD2 represents whether the SD signal is detected or not at a frequency displaced from the center frequency $Df_{CL}$ by two times of the step frequency $\Delta f$ in the higher frequency direction.

(4) Flag FSD3: This flag FSD3 represents whether the SD signal is detected or not at a frequency displaced from the center frequency $Df_{CL}$ by three times of the step frequency $\Delta f$ in the higher frequency direction.

Figure 39:
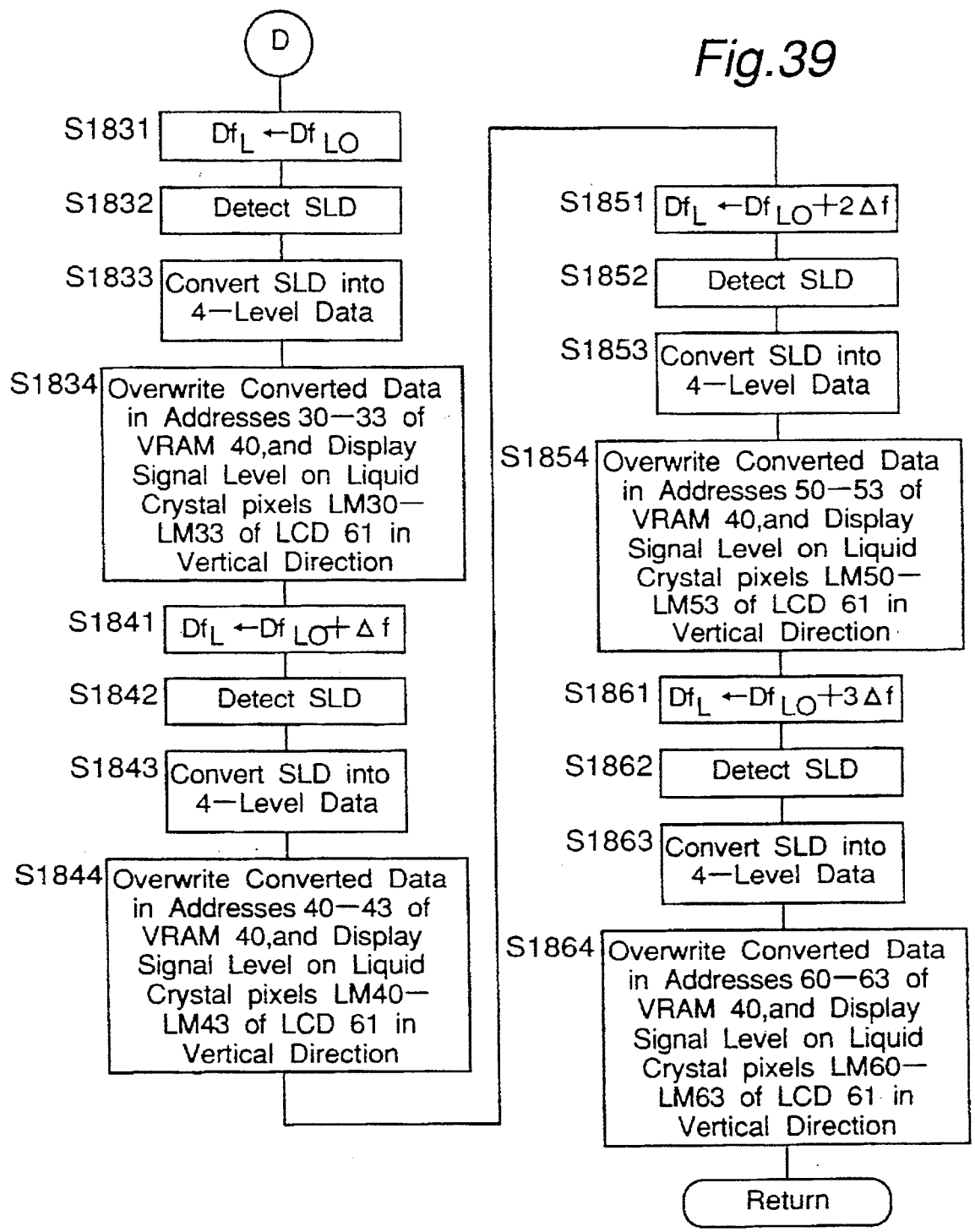
FIG. 39 is a flowchart of a second part of the scan search first process in the lower frequency direction shown in FIG. 34.

It is noted that each of the flags FSD0, FSD1, FSD2 and FSD3 indicates whether the SD signal is detected at a frequency displaced from the center frequency $Df_{CL}$ by one to three times of the step frequency $\Delta f$ in the lower frequency direction in the scan search process shown in FIGS. 38 through 40.

Then the frequency data $(Df_{LO}+3\Delta f)$ is set up as the local oscillation frequency data $Df_L$ at step S801, and the reception signal level data SLD output from the A/D converter 20 is detected and taken in the CPU at step S802. The data SLD is converted into four-level data at step S803, and then, the converted data is overwritten into the addresses 60 through 63 of the VRAM 40 at step S804. With the above processes, the signal level is displayed in the vertical direction with the bottom end set at the 0/4 level by means of the four LCD pixels LM60 through LM63 in one column of the matrix LCD section 61 of the LCD unit 60. Then it is determined whether SD=1 or not at step S805. When SD=1, the program flow proceeds to step S811. When SD=0, the flag FSD3 is set to 1 at step S806, and then, the program flow proceeds to step S811.

Then the frequency data $(Df_{LO}+2\Delta f)$ is set up as the local oscillation frequency data $Df_L$ at step S811, and the reception signal level data SLD output from the A/D converter 20 is detected and taken in the CPU at step S812. The data SLD is converted into four-level data at step S813, and then, the converted data is overwritten into the addresses 50 through 53 of the VRAM 40 at step S814. With the above processes, the signal level is displayed in the vertical direction with the bottom end set at the 0/4 level by means of the four LCD pixels LM50 through LM53 in one column of the matrix LCD section 61 of the LCD unit 60. Then it is determined whether SD=1 or not at step S815. When SD=1, the program flow proceeds to step S821. When SD=0, the flag FSD2 is set to 1 at step S816, and then, the program flow proceeds to step S821.

Then the frequency data ($Df_{LO}+\Delta f$) is set up as the local oscillation frequency data $Df_L$ at step S821, and the reception signal level data SLD output from the A/D converter 20 is detected and taken in the CPU at step S822. The data SLD is converted into four-level data at step S823, and then, the converted data is overwritten into the addresses 40 through 43 of the VRAM 40 at step S824. With the above processes, the signal level is displayed in the vertical direction with the bottom end set at the 0/4 level by means of the four LCD pixels LM40 through LM43 in one column of the matrix LCD section 61 of the LCD unit 60. Then it is determined whether SD=1 or not at step S825. When SD=1, the program flow proceeds to step S831 as shown in FIG. 36. When SD=0, the flag FSD1 is set to 1 at step S826, and then, the program flow proceeds to step S831.

Then the frequency data ($Df_{LO}$) is set up as the local oscillation frequency data $Df_L$ at step S831 as shown in FIG. 36, and the reception signal level data SLD output from the A/D converter 20 is detected and taken in the CPU at step S832. The data SLD is converted into four-level data at step S833, and then, the converted data is overwritten into the addresses 30 through 33 of the VRAM 40 at step S834. With the above processes, the signal level is displayed in the vertical direction with the bottom end set at the 0/4 level by means of the four LCD pixels LM30 through LM33 in one column of the matrix LCD section 61 of the LCD unit 60. Then the program flow proceeds to step S841.

Then the frequency data ($Df_{LO}-\Delta f$) is set up as the local oscillation frequency data $Df_L$ at step S841, and the reception signal level data SLD output from the A/D converter 20 is detected and taken in the CPU at step S842. The data SLD is converted into four-level data at step S843, and then, the converted data is overwritten into the addresses 20 through 23 of the VRAM 40 at step S844. With the above processes, the signal level is displayed in the vertical direction with the bottom end set at the 0/4 level by means of the four LCD pixels LM20 through LM23 in one column of the matrix LCD section 61 of the LCD unit 60. Then the program flow proceeds to step S851.

Then the frequency data ($Df_{LO}-2\Delta f$) is set up as the local oscillation frequency data $Df_L$ at step S851, and the reception signal level data SLD output from the A/D converter 20 is detected and taken in the CPU at step S852. The data SLD is converted into four-level data at step S853, and then, the converted data is overwritten into the addresses 10 through 13 of the VRAM 40 at step S853. With the above processes, the signal level is displayed in the vertical direction with the bottom end set at the 0/4 level by means of the four LCD pixels LM10 through LM13 in one column of the matrix LCD section 61 of the LCD unit 60. Then the program flow proceeds to step S861.

Thereafter, the frequency data ($Df_{LO}-3\Delta f$) is set up as the local oscillation frequency data $Df_L$ at step S861, and the reception signal level data SLD output from the A/D converter 20 is detected and taken in the CPU at step S862. The data SLD is converted into four-level data at step S863, and then, the converted data is overwritten into the addresses 00 through 03 of the VRAM 40 at step S864. With the above processes, the signal level is displayed in the vertical direction with the bottom end set at the 0/4 level by means of the four LCD pixels LM00 through LM03 in one column of the matrix LCD section 61 of the LCD unit 60. Then the program flow returns to the original routine.

FIG. 41 is a front view showing the frequencies of the seven signal levels displayed on the matrix LCD section 61 of the LCD section, and the transmission and reception frequency displayed on the seven-segment LCD section 67 when the transmission and reception frequency in the time of automatic scan search in the second preferred embodiment where the transmission and reception frequency is scanned in the higher frequency direction.

In the scan search first process in the higher frequency direction, all the contents of display are once cleared in the matrix LCD section 61 of the LCD unit 60 in a manner as shown in the interval of from the timing t0 to the timing t7 as shown in FIG. 41, and then, the signal levels at the seven frequencies around the center frequency $Df_{LO}$ including the center frequency are detected and displayed sequentially from the higher frequency. With the above processes, display is effected on the matrix LCD section 61 of the LCD unit 60 in the form of signal levels of signals having a plurality of frequencies (See the timing t7 as shown in FIG. 41).

FIG. 37 is a flowchart of the scan search process in the higher frequency direction (step S712) of a subroutine shown in FIG. 34.

Referring to FIG. 37, the display data replace process in the higher frequency direction as shown in FIG. 20 is executed at step S901. Then the data of the flag FSD1 is set up in the flag FSD0, the data of the flag FSD2 is set up in the flag FSD1, and the data of the flag FSD3 is set up in the flag FSD2 at step S902. Then at step S903, data obtained by adding the step frequency $\Delta f$ to the transmission and reception frequency data $Df_{CL}$ is renewed as the transmission and reception frequency data $Df_{CL}$, and then the renewed transmission and reception frequency data $Df_{CL}$ is displayed on the seven-segment LCD section 67 of the LCD unit 60 at step S904. Furthermore, at step S905, data obtained by adding the step frequency $\Delta f$ to the center local oscillation frequency data $Df_{LO}$ is renewed as the center local oscillation frequency data $Df_{LO}$, and the data ($Df_{LO}+3\Delta f$) is stored as renewed in the local oscillation frequency data $Df_L$. Then the signal level data SLD output from the A/D converter 20 is detected and taken in the CPU at step S906 and converted into four-level data at step S907. Then the converted data is overwritten into the addresses 60 through 63 of the VRAM 40, and the signal levels are displayed in the vertical direction with the bottom end set at the 0/4 level by means of the four LCD pixels LM60 through LM63 in one column at the right end of the matrix LCD section 61 of the LCD unit 60. Furthermore, it is determined whether SD=1 or not at step S909. When SD=1, the flag FSD3 is reset to zero at step S911, and then, the program flow proceeds to step S921. When SD=0 at step S909, the flag FSD3 is set to 1 at step S910, and then the program flow proceeds to step S921.

Then it is determined whether the flag FSD0 is 1 or not at step S921, i.e., it is determined whether or not the reception signal is received at the transmission and reception frequency corresponding to the center local oscillation frequency data $Df_{LO}$. When FSD0=0, it is neither required to renew or update the signal level of the transmission and reception frequency nor required to output the low-frequency signal of the reception signal. Therefore, the program flow directly returns to the original routine, immediately. When FSD0=1 at step S921, the L-level ESQ signal is output so as to turn off the squelch switch 11, thereby putting the transceiver in the state capable of receiving the low-frequency signal demodulated from the modulated wave of the reception signal at step S922, and the timer count Twp of the timer in the MPU 30 for the waiting process is reset to zero second at step S923 to start time counting. Then at step S924, the center local oscillation frequency data $Df_{LO}$ is set up at the local oscillation frequency data $Df_L$, and then, the program flow proceeds to step S925.

The reception signal level data SLD output from the A/D converter 20 is detected and taken in the CPU at step S925, and the data SLD is converted into four-level data at step S926. Thereafter, the converted data is overwritten into the addresses 30 through 33 at step S927, and then, there is displayed the signal level in the vertical direction with the bottom end set at the 0/4 level by means of the four LCD pixels LM30 through 33 in one column at the center of the matrix LCD section 61 of the LCD unit 60. Then it is determined whether the PTT switch SW1 is turned on or not at step S928. When the PTT switch SW1 is turned on, the program flow proceeds directly to step S931 so as to enter into the transmission state without executing determination of waiting in the reception state. When the PTT switch SW1 is not turned on at step S928, it is determined whether SD=1 or not at step S929. When SD=1, the program flow proceeds directly to step S931 without executing determination of waiting in the reception state. When SD=0 at step S929, i.e., when there is a reception signal at the reception frequency, the determination of waiting time for the waiting process is executed at step S930. In practice, it is determined whether or not the timer count Twp of the timer has elapsed over the preset waiting time, interval Tw. When the time interval Tw has not elapsed, the program flow returns to step S925 to execute the level detection display process at the reception frequency while executing the waiting process. When the time interval Tw has been elapsed, the program flow proceeds to step S931. Thereafter, the H-level ESQ signal is output at step S931 so a to turn off the squelch switch 11 and then stop outputting the low-frequency signal from the speaker 13. Then the program flow returns to the original routine.

In the scan search process in the higher frequency direction, after the scan search first process in the higher frequency direction, the data of the respective signal levels displayed on the matrix LCD section 61 is shifted leftward as viewed from the front of the display unit in a manner as shown in the interval of from the timing t7 to the timing t10 as shown in FIG. 41, and then the signal level corresponding to the frequency at the right end of the matrix LCD section 61, which has been not yet detected, is detected and displayed. When a reception signal exists at the transmission and reception frequency being the center frequency, the detection and display of the signal level is repeated for the predetermined waiting time interval Tw, and then, the data of the respective signal levels displayed on the matrix LCD section 61 is shifted leftward as viewed from the front of the display unit until the scan search mode is released.

FIGS. 38 and 39 are flowcharts of the scan search first process in the lower frequency direction (step S710) of a subroutine shown in FIG. 34.

Referring to FIG. 38, the four SD signal detection flags FSD0, FSD1, FSD2 and FSD3 are, first of all, reset to zero. Then the frequency data ($Df_{LO}-3\Delta f$) is set up as the local oscillation frequency data $Df_L$ at step S1801, and then, the reception signal level data SLD output from the A/D converter 20 is detected and taken in the CPU at step S1802. The data SLD is converted into four-level data at step S1803, and then, the converted data is overwritten into the addresses 00 through 03 of the VRAM 40. With the above processes, the signal level is displayed in the vertical direction with the bottom end set at the 0/4 level by means of the four LCD pixels LM00 through LM03 in one column of the matrix LCD section 61 of the LCD unit 60. Then it is determined whether SD=1 or not at step S1805. When SD=1, the program flow proceeds to step S1811. When SD=0, the flag FSD3 is set to 1 at step S1806, and then, the program flow proceeds to step S1811.

Then the frequency data ($Df_{LO}-2\Delta f$) is set up as the local oscillation frequency data $Df_L$ at step S1811, and then the reception signal level data SLD output from the A/D converter 20 is detected and taken in the CPU at step S1812. The data SLD is converted into four-level data at step S1813, and then, the converted data is overwritten into the addresses through 13 of the VRAM 40 at step S1814. With the above processes, the signal level is displayed in the vertical direction with the bottom end set at the 0/4 level by means of the four LCD pixels LM10 through LM13 in one column of the matrix LCD section 61 of the LCD unit 60. Then it is determined whether SD=1 or not at step S1815. When SD=1, the program flow proceeds to step S1821. When SD=0, the flag FSD2 is set to 1 at step S1816, and then, the program flow proceeds to step S1821.

Then the frequency data ($Df_{LO}-\Delta f$) is set up as the local oscillation frequency data $Df_L$ at step S1821, and the reception signal level data SLD output from the A/D converter 20 is detected and taken in the CPU at step S1822. The data SLD is converted into four-level data at step S1823, and then, the converted data is overwritten into the addresses 20 through 23 of the VRAM 40 at step S1824. With the above processes, the signal level is displayed in the vertical direction with the bottom end set at the 0/4 level by means of the four LCD pixels LM20 through LM23 in one column of the matrix LCD section 61 of the LCD unit 60. Then it is determined whether SD=1 or not at step S1825. When SD=1, the program flow proceeds to step S1831 as shown in FIG. 39. When SD=0, the flag FSD1 is set to 1 at step S1826, and then, the program flow proceeds to step S1831 as shown in FIG. 39.

Then the frequency data $Df_{LO}$ is set up as the local oscillation frequency data $Df_L$ at step S1831 shown in FIG. 39, and the reception signal level data SLD output from the A/D converter 20 is detected and taken in the CPU at step S1832. The data SLD is converted into four-level data at step S1833, and then, the converted data is overwritten into the addresses 30 through 33 of the VRAM 40 at step S1834. With the above processes, the signal level is displayed in the vertical direction with the bottom end set at the 0/4 level by means of the four LCD pixels LM30 through 12433 in one column of the matrix LCD section 61 of the LCD unit 60. Then the program flow proceeds to step S1841.

Then the frequency data ($Df_{LO}+\Delta f$) is set up as the local oscillation frequency data $Df_L$ at step S1841, and the reception signal level data SLD output from the A/D converter 20 is detected and taken in the CPU at step S1842. The data SLD is converted into four-level data at step S1843, and then, the converted data is overwritten into the addresses 40 through 43 of the VRAM 40 at step S1844. With the above processes, the signal level is displayed in the vertical direction with the bottom end set at the 0/4 level by means of the four LCD pixels LM40 through LM43 in one column of the matrix LCD section 61 of the LCD unit 60. Then the program flow proceeds to step S1851.

Then the frequency data ($Df_{LO}+2\Delta f$) is set up as the local oscillation frequency data $Df_L$ at step S1851, and then the reception signal level data SLD output from the A/D converter 20 is detected and taken in the CPU at step S1852. The data SLD is converted into four-level data at step S1853, and then, the converted data is overwritten into the addresses 50 through 53 of the VRAM 40 at step S1854. With the above processes, the signal level is displayed in the vertical direction with the bottom end set at the 0/4 level by means of the four LCD pixels LM50 through LM53 in one column of the matrix LCD section 61 of the LCD unit 60. Then the program flow proceeds to step S1861.

Then the frequency data $(Df_{LO}+3\Delta f)$ is set up as the local oscillation frequency data $Df_L$ at step S1861, and the reception signal level data SLD output from the A/D converter 20 is detected and taken in the CPU at step S1862. The data SLD is converted into four-level data at step S1863, and then, the converted data is overwritten into the addresses 60 through 63 of the VRAM 40 at step S1864. With the above processes, the signal level is displayed in the vertical direction with the bottom end set at the 0/4 level by means of the four LCD pixels LM60 through LM63 in one column of the matrix LCD section 61 of the LCD unit 60. Then the program flow returns to the original routine.

FIG. 42 is a front view showing the frequencies of the seven signal levels displayed on the matrix LCD section 61 of the LCD section, and the transmission and reception frequency displayed on the seven-segment LCD section 67 when the transmission and reception frequency is scanned in the time of automatic scan search in the second preferred embodiment where the transmission and reception frequency is scanned in the lower frequency direction.

In the scan search first process in the lower frequency direction, all the contents of display are once cleared in the matrix LCD section 61 of the LCD unit 60 in a manner as shown in the interval of from the timing t0 to the timing t7 as shown in FIG. 42, and then, the signal levels at the seven frequencies around the center frequency $Df_{LO}$ including the center frequency are detected and displayed sequentially from the lower frequency. With the above processes, display is effected in the matrix LCD section 61 of the LCD unit 60 in the form of signal levels of signals having a plurality-of frequencies (See the timing t7 shown in FIG. 42).

FIG. 40 is a flowchart of the scan search process in the lower frequency direction (step S713) of a subroutine shown in FIG. 34.

Referring to FIG. 40, the display data replace process in the lower frequency direction as shown in FIG. 21 is executed at step S1901. Then the data of the flag FSD1 is set up in the flag FSD0, the data of the flag FSD2 is set up in the flag FSD1, and the data of the flag FSD3 is set up in the flag FSD2 at step S1902. Then at step S1903, the data obtained by subtracting the step frequency $\Delta f$ from the transmission and reception frequency data $Df_{CL}$ is renewed or updated as the transmission and reception frequency data $Df_{CL}$, and then, the renewed transmission and reception frequency data $Df_{CL}$ is displayed on the seven-segment LCD section 67 of the LCD unit 60 at step S1904. Furthermore, at step S1905, the data obtained by subtracting the step frequency $\Delta f$ from the center local oscillation frequency data $Df_{LO}$ is renewed as the center local oscillation frequency data $Df_{LO}$, and the data $(Df_{LO}3\Delta f)$ is stored as renewed in the local oscillation frequency data $Df_L$. Then the signal level data SLD output from the A/D converter 20 is detected and taken in the CPU at step S1906 and converted into four-level data at step S1907. Then the converted data is overwritten into the addresses 00 through 03 of the VRAM 40, and then, the signal level is displayed in the vertical direction with the bottom end set at the 0/4 level by means of the four LCD pixels LM00 through 03 in one column at the right end of the matrix LCD section 61 of the LCD unit 60 at step S1908. Furthermore, it is determined whether SD=1 or not at step S1909. When SD=1, the flag FSD3 is reset to zero at step S1911, and then, the program flow proceeds to step S1921. When SD=0 at step S1909, the flag FSD3 is set to 1 at step S1910, and then, the program flow proceeds to step S1921.

Then at steps S1921 through S1931, the same processes as those in the steps S921 through S931 shown in FIG. 37 are executed, and then, the program flow returns to the original routine.

In the scan search process in the lower frequency direction, after the scan search first process in the lower frequency direction, the data of the respective signal levels displayed on the matrix LCD section 61 is shifted rightward as viewed from the front of the display unit in a manner as shown in the interval of from the timing t7 to the timing t shown in FIG. 42, and the signal level corresponding to the frequency at the left end of the matrix LCD section 61, which has been not yet detected, is detected and displayed. When a reception signal is existing at the transmission and reception frequency being the center frequency, the detection and display of the signal level is repeated for the predetermined waiting time interval Tw, and then, the data of the respective signal levels displayed on the matrix LCD section 61 is shifted rightward as viewed from the front of the display unit until the scan search mode is released.

The memory channel mode process (step S4) of the second preferred embodiment is executed in a manner similar to that in the VFO process (step S5a) except for the following processes. It is herein assumed that the channel number preset by means of the rotary encoder 31 or the ten key 32 is a natural number m, and the transmission and reception frequency in the case is fm. In the present case, the set-up frequency fset is set up at fm, and a local oscillation frequency $(fm-f_{IF})$ corresponding to the transmission and reception frequency fm is set up in the frequency data $Df_{LO}$ and $Df_L$. This corresponds to step S45 of FIG. 32.

(a) Display is effected on the "M" LCD section 65 of the LCD unit 60.

(b) The frequency data $\{f(m+3)-f_{IF}\}$ is set up as the local oscillation frequency data $Df_L$ at step S801 shown in FIG. 35.

(c) The frequency data $\{f(m+2)-f_{IF}\}$ is set up as the local oscillation frequency data $Df_L$ at step S811 shown in FIG. 35.

(d) The frequency data $\{f(m+1)-f_{IF}\}$ is set up as the local oscillation frequency data $Df_L$ at step S821 shown in FIG. 35.

(e) The frequency data $\{f(m-1)-f_{IF}\}$ is set up as the local oscillation frequency data $Df_L$ at step S841 shown in FIG. 36.

(f) The frequency data $\{f(m-2)-f_{IF}\}$ is set up as the local oscillation frequency data $Df_L$ at step S851 shown in FIG. 36.

(g) The frequency data $\{f(m-3)-f_{IF}\}$ is set up as the local oscillation frequency data $Df_L$ at step S861 shown in FIG. 36.

(h) The channel number (m+1) is set up as the channel number m, and the frequency data fm is set up as the transmission and reception frequency data $Df_{CL}$ at step S903 shown in FIG. 37.

(i) The frequency data $\{fm-f_{IF}\}$ is set up as the center local oscillation frequency data $Df_{LO}$, and the frequency data $\{f(m+3)-f_{IF}\}$ is set up as the local oscillation frequency data $Df_L$ at step S905 shown in FIG. 37.

(j) The frequency data $\{f(m-3)-f_{IF}\}$ is set up as the local oscillation frequency data $Df_L$ at step S1801 shown in FIG. 38.

(k) The frequency data $\{f(m-2)-f_{IF}\}$ is set up as the local oscillation frequency data $Df_L$ at step S1811 shown in FIG. 38.

(l) The frequency data $\{f(m-1)-f_{IF}\}$ is set up as the local oscillation frequency data $Df_L$ at step S1821 shown in FIG. 38.

(m) The frequency data $\{f(m+1)-f_{IF}\}$ is set up as the local oscillation frequency data $Df_L$ at step S1841 shown in FIG. 39.

(n) The frequency data $\{f(m+2)-f_{IF}\}$ is set up as the local oscillation frequency data $Df_L$ at step S1851 shown in FIG. 39.

(o) The frequency data $\{f(m+3)-f_{IF}\}$ is set up as the local oscillation frequency data $Df_L$ at step S1861 shown in FIG. 39.

(p) The channel number (m−1) is set up as the channel number m, and the frequency data fm is set up as the transmission and reception frequency data $Df_{CL}$ at step S1903 shown in FIG. 40.

(q) The frequency data $\{fm-f_{IF}\}$ is set up as the center local oscillation frequency data $Df_{LO}$, and the frequency data $\{f(m-3)-f_{IF}\}$ is set up as the local oscillation frequency data $Df_L$ at step S1905 shown in FIG. 40.

According to the second preferred embodiment described as above, the center frequency can be placed in the center position of the matrix LCD section 61 in the scan search mode, and the signal levels of signals having a plurality of frequencies can be displayed in a manner similar to that in the search mode as compared with the first preferred embodiment. Therefore, the scan search mode has the advantage that the signal levels at the frequencies around the center frequency in the higher and lower frequency directions can be perceived in a manner similar to that in the search mode.

The Other preferred embodiments

Although each of the aforementioned preferred embodiments described a radio transceiver, the present invention is not limited to such a unit or apparatus and able to be applied to a radio or wireless receiver, wired receiver, or a wired transceiver receiving a high-frequency signal. Although each of the aforementioned preferred embodiments described an FM radio transceiver as an example, the present invention is not limited to such a unit or apparatus and able to be applied to a transceiver or a receiver of an arbitrary modulation system of AM, SSB, FSK, or the like.

Although each of the aforementioned preferred embodiments described a radio-receiver having a receiver circuit of one system, the present invention is not limited to such a device or apparatus and may be applied to a receiver having receiver circuits of a plurality of systems.

Although the VRAM 40 and the registers 41, 42, 43 and 44 which are memory units for storing display data for the LCD unit 60 are provided independently of the MPU 30, the above arrangement is not limitative and a one-chip microprocessor including these memory units may be used instead.

Although the transmission frequency and the reception frequency are designed to be identical to each other at the set-up frequency fset in each of the aforementioned preferred embodiments, the frequencies may be set up so as to be different from each other by a predetermined frequency to operate a repeater of an amateur radio station.

Although the signal level is displayed in the horizontal direction by means of the matrix LCD section 61 of the LCD unit 60 in the normal mode and the signal level is displayed in the vertical direction by means of the matrix LCD section 61 in the search mode, the directions of display are not limited to the above-mentioned directions and they may be arranged vice versa.

Although the signal levels of the reception signals in a plurality of channels are displayed in parallel so as be aligned in the ascending (increasing) order of the channel numbers in the memory channel mode process (step S4), the above arrangement is not limitative, and the signal levels may be displayed in parallel so as to be aligned in the descending or decreasing order of the channel numbers.

Although the signal level of the reception signal is displayed so as to vary in the horizontal direction on the matrix LCD section 61 of the LCD unit 60 in the normal mode, the above arrangement is not limitative in the present invention and the signal level may be displayed so as to vary in the vertical direction. Although the respective signal levels of the spectrum are displayed so as to vary in the vertical direction on the matrix LCD section 61 of the LCD unit 60 in the search mode, the above-mentioned arrangement is not limitative in the present invention, and the signal level may be displayed so as to vary in the horizontal direction. The direction of display of the signal level may be changed between the case where the signal level is displayed and the case where the spectrum is displayed, or they may be displayed in the same direction.

Although the respective signal levels of the spectrum is displayed in five signal levels including 0 in the vertical direction by means of four LCD pixels in the matrix LCD section 61 of the LCD unit 60 in the search mode or the scan search mode, the above arrangement is not limitative in the present invention, and the display may be arranged so as to at least display the existence or absence of a signal at each frequency of the spectrum.

Although a setting process of the set-up frequency fset is executed at step S45 shown in FIG. 11, the step S45 may be not executed when the set-up frequency fset is not changed.

Although it is determined whether the waiting process (refer to step S246) for the predetermined waiting time interval Tw is to be executed or not at step S245 shown in FIG. 15, the determination may be executed according to the signal strength of the reception signal, or alternatively the process at the step S245 may be eliminated. In such a case, the waiting process at step S246 is executed regardless of the signal level of the SD signal, i.e., the existence or absence of a reception signal.

Although the program flow proceeds directly to step S250 when the determination of the process at step S245 is YES as shown in FIG. 15, the above arrangement is not limitative in the present invention, and then, the program flow may proceed to step S250 after executing a waiting process for a preset waiting time interval Twa.

By changing the waiting time interval Tw and/or the waiting time interval Twa, the ratio in operation time of the process for detecting and storing the signal levels of signals having a plurality of frequencies to the process for time-sharingly or by the time division method, outputting the output of the FM demodulator 8 to the speaker 13 can be changed by means of a receiver circuit of one system.

Although the local oscillator 4 is provided by the PLL circuit in each of the aforementioned preferred embodiments, there may be used a DDS circuit for generating a local oscillation signal having a predetermined local oscillation frequency by means of a ROM for previously storing sampling levels of a signal waveform in order to reduce the operation time set up by changing the local oscillation frequency.

Although the signal level at one reception frequency is detected and stored and the resulting low-frequency signal is output to the speaker 13 when the SD signal is at L level at steps S240 through S246 in each of the aforementioned preferred embodiments, the above arrangement is not limitative in the present invention, and the signal levels of signals having a plurality of frequencies may be successively detected and stored and the resulting low-frequency signal may be successively output to the speaker 13.

Although the OR gate OR1 is provided outside the MPU 30, the same function may be provided by software executed in the MPU 30.

According to the preferred embodiments of the present invention, the signal strengths at the plural number of reception frequencies can be displayed on the plural number of display sections of the display means according to the order of switchover while allowing the operator to substantially monitor the output of the demodulation means by the reception means of one system which receives a high-frequency signal at a predetermined reception frequency. With the above-mentioned arrangement, the signal strengths at the plural number of frequencies can be observed easily and substantially simultaneously.

The preferred embodiment according to the present invention, which is provided with receiver circuit or means of only one system, can provide a receiver having a function of displaying signal strengths of signals having a plurality of frequencies, then the receiver can be very simple in circuit construction and be an in expensive manufacturing cost as compared with the conventional example as shown in FIG. 2 or the case where a spectrum analyzer is separately provided.

Furthermore, in the conventional example shown in FIG. 2, the bandwidth when measuring the reception signals in spectrum display substantially depends on the passband width of the band-pass filter in the scope IF amplifier 112. When the bandwidth is desired to be set up on the same level as that of the reception signal displayed at the signal level meter 109, the setting of the bandwidth of the band-pass filter in the IF amplifier 104 is required to be changed so as to be equal to the bandwidth of the scope IF amplifier 112. In contrast to the above, since the process is executed by the receiver circuit or means of only one identical system in the preferred embodiments of the present invention, change of setting the reception frequency is unnecessary. Further, the signal levels of signals having a plurality of frequencies around the center frequency, such as the reception signal currently being received, can be easily perceived by means of the display unit or apparatus in the same state as that of the reception signal currently being received. With the above-mentioned arrangement, there is such an advantageous effect as allowing the unoccupied channels and occupied channels of adjacent frequencies to be easily found by the operator.

According to the preferred embodiments of the present invention, the signal strengths of the high-frequency signals having a plurality of frequencies displayed so as be aligned in parallel with each other, and then, the signal strength of the signal having one reception frequency can be easily observed selectively by means of the display unit or apparatus while the demodulation signal of the high-frequency signal having the set-up desired reception frequency is substantially output to a speaker or the like.

According to the preferred embodiments of the present invention, the signal strengths of the signals having a plurality of reception frequencies can be displayed on a plurality of display sections of the display apparatus or means according to the order when switching over a plurality of frequencies, and the display positions of the signal strengths of the signal having a plurality of reception frequencies can be changed as shifted according to change of the reception frequency. With the above-mentioned arrangement, the signal strengths of the signals having a plurality of reception frequencies can be observed easily and substantially simultaneously. Furthermore, there is such an advantageous effect as allowing the unoccupied channels and occupied channels of adjacent frequencies to be easily found by the operator.

According to the preferred embodiments of the present invention, the signal strengths of the signals having a plurality of reception frequencies can be displayed on a plurality of display sections of the display apparatus or means according to the order when switching over a plurality of reception frequencies, and the reception frequency is automatically shifted in a predetermined direction of change, thereby allowing the display positions of the signal strengths at the plural number of reception frequencies to be changed as shifted according to the changed reception frequency. With the above-mentioned arrangement, the signal strengths of the signals having a plurality of reception frequencies can be observed easily and substantially simultaneously. Furthermore, there is such an advantageous effect as allowing the unoccupied channels and occupied channels of adjacent frequencies to be easily found by the operator.

According to the preferred embodiments of the present invention described as above, the signal strengths of signals having a plurality of frequencies can be displayed, for example, in a predetermined order such as the order of the channel numbers previously stored, and the display positions of signal strengths of signals having a plurality of frequencies can be changed as shifted according to the change of the reception frequency. With the above-mentioned arrangement, the signal strengths of the signals having a plurality of reception frequencies displayed in the predetermined order can be simultaneously observed easily and substantially. Furthermore, there is such an advantage of allowing the unoccupied channels and occupied channels of adjacent frequencies to be easily found by the operator.

According to the preferred embodiments of the present invention, the signal strengths of signals having a plurality of reception frequencies are displayed around the predetermined center frequency on a plurality of display sections of the display apparatus or means according to the order when switching over a plurality of frequencies, and the display positions of the signal strengths of the signals having a plurality of reception frequencies can be changed as shifted according to the change of the reception frequency. With the above-mentioned arrangement, the signal strengths of the signals having a plurality of reception frequencies can be observed easily and substantially simultaneously around the predetermined center frequency. Furthermore, there is such an advantageous effect as allowing the unoccupied channels and occupied channels of adjacent frequencies to be easily found by the operator, According to the preferred embodiments of the present invention described as above, the signal strengths of the signals having a plurality of reception frequencies are displayed around the center reception frequency on a plurality of display sections of the display apparatus or means according to the order when switching over a plurality of frequencies, and the display positions of the signal strengths of the signals having a plurality of frequencies can be changed as shifted according to change of the reception frequency. With the above-mentioned arrangement, the signal strengths of the signals having a plurality of frequencies can be observed easily and substantially simultaneously around the predetermined center reception frequency while outputting from the demodulator or the demodulation means the low-frequency signal demodulated from the high-frequency signal having the reception frequency for a predetermined period of time or a predetermined time interval. Furthermore, there is such an advantageous effect as allowing the unoccupied channels and occupied channels of adjacent frequencies to be easily found by the operator.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A display apparatus for use in a receiver apparatus for receiving a high-frequency signal having a predetermined reception frequency, comprising:

detection storage means, having a plurality of storage addresses, for detecting signal strengths of signals having a plurality of reception frequencies received by selectively switching over among said plurality of reception frequencies according to a predetermined order of said switching around a predetermined center reception frequency, and storing data of the detected signal strengths of the signals in said plurality of storage addresses;

display means, having a plurality of display sections, for displaying on said plurality of display sections the signal strengths of the signals having said plurality of reception frequencies, around said center reception frequency according to said predetermined order of said switching, wherein the displayed signal strengths of the signals are said data of the signal strengths of the signals stored in said plurality of storage addresses of said detection storage means corresponding to said plurality of display sections;

first control means for shifting display positions of the signal strengths of the signals having said plurality of reception frequencies displayed on said display means, in a direction corresponding to a predetermined direction of change, by automatically changing said reception frequencies including said center reception frequency in said predetermined order of said switching and in a predetermined direction of said change of said reception frequencies, and shifting said data of the signal strengths of the signals stored in said plurality of storage addresses of said detection storage means according to said change of the reception frequencies; and second control means, after the process of said first control means is completed, for controlling said detection storage means to detect and store a signal strength of a signal having a reception frequency corresponding to the display section located at the end of said display means for which a signal strength has not yet been detected by said detection storage means when said first control means shifts said data of the signal strengths of the signals, and for controlling said display means to display said stored signal strength on the display section located at the end of said display means.

2. The display apparatus as claimed in claim 1, wherein said predetermined order of said switching is an order of switching over among said plurality of reception frequencies with a predetermined step frequency in a predetermined ascending or descending order of said plurality of reception frequencies.

3. The display apparatus as claimed in claim 1, further comprising channel storage means for storing a plurality of reception frequencies corresponding to predetermined channel numbers;

wherein said predetermined order of said switching is a predetermined ascending or descending order of said channel numbers of a plurality of reception frequencies stored in said channel storage means.

4. A receiver apparatus comprising said display apparatus as claimed in either of claims 1 to 3.

5. A radio receiver apparatus comprising said display apparatus as claimed in either of claims 1 to 3.

6. A transceiver comprising:

said display apparatus as claimed in either one of claims 1 to 3; and transmission means for transmitting a high-frequency signal having a transmission frequency which is the same as either one of said predetermined reception frequency, a center reception frequency predetermined among said plurality of reception frequencies, and a frequency shifted by a predetermined shift frequency from said predetermined reception frequency.

7. A radio transceiver comprising:

said display apparatus as claimed in either one of claims 1 to 3; and transmission means for transmitting through an antenna a high-frequency signal having a transmission frequency which is the same as either one of said predetermined reception frequency, a center reception frequency predetermined among said plurality of reception frequencies, and a frequency shifted by a predetermined shift frequency from said predetermined reception frequency.

8. A receiver apparatus comprising:

reception means for receiving a high-frequency signal having a predetermined reception frequency;

detection storage means, having a plurality of storage addresses, for detecting signal strengths of signals having a plurality of reception frequencies received, by selectively switching over among said plurality of reception frequencies around a predetermined center reception frequency according to a predetermined order of said switching, and storing data of the detected signal strengths of the signals in said plurality of storage addresses;

display means, having a plurality of display sections, for displaying on said plurality of display sections the signal strengths of the signals of said plurality of reception frequencies, around the predetermined center reception frequency according to said predetermined order of said switching, wherein the displayed signal strengths of the signals are said data of the signal strengths of the signals stored in said plurality of storage addresses of said detection storage means corresponding to said plurality of display sections;

first control means for shifting display positions of the signal strengths of the signals having said plurality of reception frequencies displayed on said display means in a direction corresponding to a predetermined direction of change, by automatically changing said reception frequencies including the center reception frequency in said predetermined order of said switching and in a predetermined direction of said change of said reception frequencies, and shifting said data of the signal strengths of the signals stored in said plurality of storage addresses of said detection storage means according to said change of the reception frequencies;

second control means, after the process of said first control means is completed, for controlling said detection storage means to detect and store a signal strength of a signal having a reception frequency corresponding to the display section located at the end of said display means for which a signal strength has not yet been detected by said detection storage means when said first control means shifts said data of the signal strengths of the signals, and for controlling said display means to display said stored signal strength on the display section located at the end of said display means; and demodulation means for demodulating said high-frequency signal received by said reception means and outputting the demodulated low-frequency signal.

9. The receiver apparatus as claimed in claim 8, wherein, in the process performed by the second control means, said demodulation means outputs said demodulated low-frequency signal when the level of the high-frequency signal to be demodulated is greater than a predetermined threshold level.

10. The receiver apparatus as claimed in claim 8, wherein, in the process performed by the second control means, said demodulation means outputs said demodulated low-frequency signal for a predetermined time interval when the level of the high-frequency signal to be demodulated is greater than a predetermined threshold level.

11. The receiver apparatus as claimed in claim 8, 9, or 10, wherein said predetermined order of said switching is an order of switching over among a plurality of reception frequencies with a predetermined step frequency in a predetermined ascending or descending order of said reception frequencies.

12. The receiver apparatus as claimed in claim 8, 9, or 10, further comprising channel storage means for storing a plurality of reception frequencies in correspondence with predetermined channel numbers, wherein said predetermined order of said switching is a predetermined ascending or descending order of said channel numbers of a plurality of reception frequencies stored in said channel storage means.

13. A transceiver comprising:

said receiver apparatus as claimed in claim 8; and transmission means for transmitting a high-frequency signal having a transmission frequency which is the same as either one of said predetermined reception frequency, center reception frequency predetermined among said plurality of reception frequencies, and a frequency shifted by a predetermined shift frequency from said predetermined reception frequency.

14. A radio transceiver comprising:

said receiver apparatus as claimed in claim 8; and transmission means for transmitting through an antenna a high-frequency signal having a transmission frequency which is the same as either one of said predetermined reception frequency, a center reception frequency predetermined among said plurality of reception frequencies, and a frequency shifted by a predetermined shift frequency from said predetermined reception frequency.

* * * * *